United States Patent
Harutyunyan et al.

(10) Patent No.: US 10,558,543 B2
(45) Date of Patent: Feb. 11, 2020

(54) METHODS AND SYSTEMS THAT EFFICIENTLY STORE AND ANALYZE MULTIDIMENSIONAL METRIC DATA

(71) Applicant: VMware, Inc., Palo Alto, CA (US)

(72) Inventors: Ashot Nshan Harutyunyan, Yerevan (AM); Arnak Poghosyan, Yerevan (AM); Naira Movses Grigoryan, Yerevan (AM); Vahe Khachikyan, Yerevan (AM); Nshan Sharoyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 275 days.

(21) Appl. No.: 15/806,187

(22) Filed: Nov. 7, 2017

(65) Prior Publication Data

US 2019/0138420 A1 May 9, 2019

(51) Int. Cl.
*G06F 15/173* (2006.01)
*G06F 11/30* (2006.01)

(52) U.S. Cl.
CPC ........ *G06F 11/3082* (2013.01); *G06F 11/301* (2013.01); *G06F 11/3006* (2013.01)

(58) Field of Classification Search
CPC . G06F 11/3082; G06F 11/3006; G06F 11/301
USPC ................................................. 709/224, 247
See application file for complete search history.

(56) References Cited

U.S. PATENT DOCUMENTS

| 8,811,156 B1* | 8/2014 | Jiang ................... H03M 7/3082 370/225 |
| 9,355,007 B1* | 5/2016 | Eicher ................. G06F 11/3428 |
| 2011/0274343 A1* | 11/2011 | Krishnaswamy .. G06K 9/00201 382/154 |
| 2016/0364467 A1* | 12/2016 | Gupta ..................... G06N 20/00 |
| 2018/0107716 A1* | 4/2018 | Clarkson ............... G06F 16/334 |
| 2018/0137224 A1* | 5/2018 | Hemmer ............... G06F 3/0673 |
| 2018/0365298 A1* | 12/2018 | Poghosyan ............. H03M 7/00 |

* cited by examiner

*Primary Examiner* — Philip B Tran

(57) ABSTRACT

The current document is directed to methods and systems that collect metric data within computing facilities, including large data centers and cloud-computing facilities. In a described implementation, two or more metric-data sets are combined to generate a multidimensional metric-data set. The multidimensional metric-data set is compressed for efficient storage by clustering the multidimensional data points within the multidimensional metric-data set to produce a covering subset of multidimensional data points and by then representing the multidimensional-data-point members of each cluster by a cluster identifier rather than by a set of floating-point values, integer values, or other types of data representations. The covering set is constructed to ensure that the compression does not result in greater than a specified level of distortion of the original data.

20 Claims, 45 Drawing Sheets

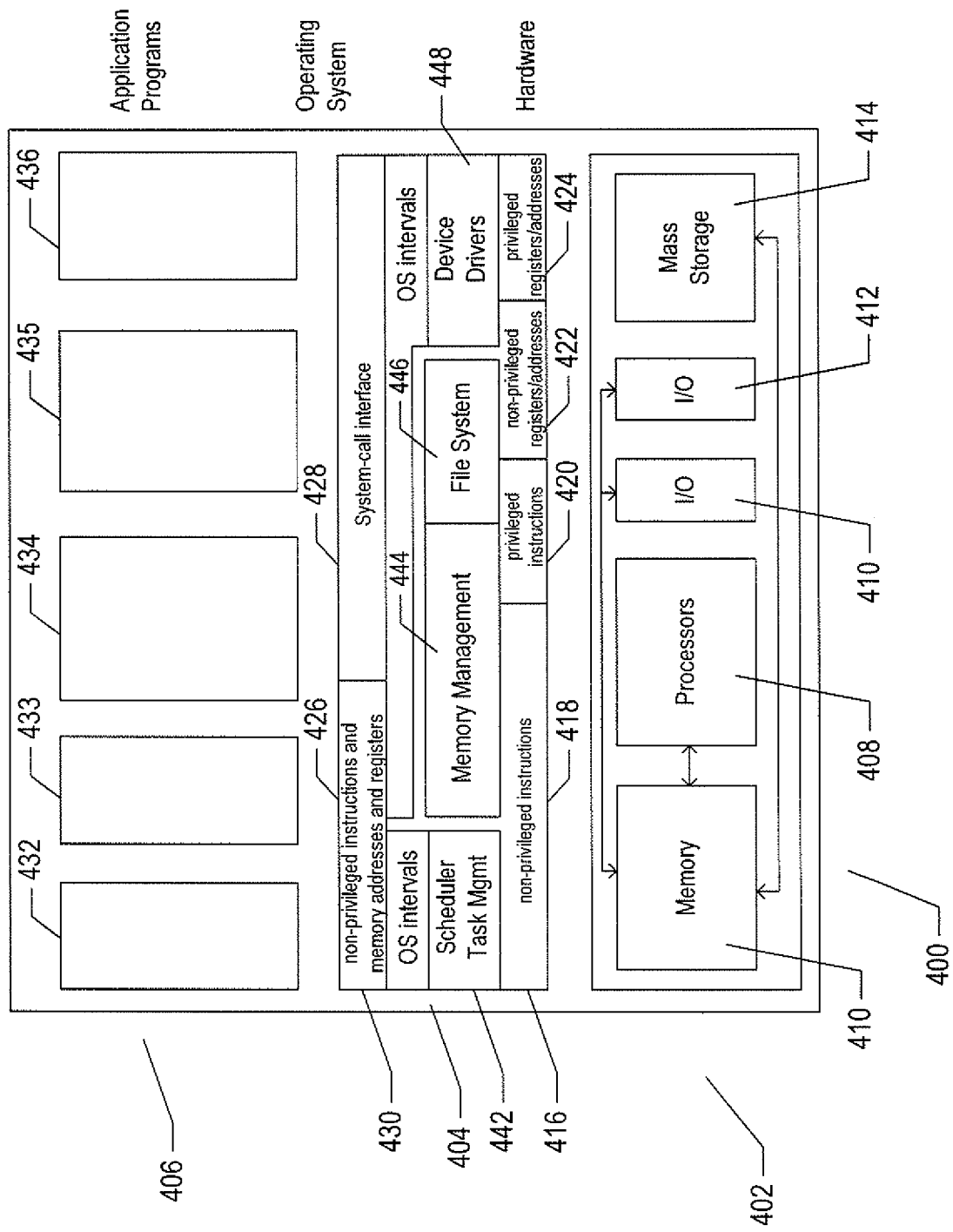

METHODS AND SYSTEMS THAT EFFICIENTLY STORE AND ANALYZE MULTIDIMENSIONAL METRIC DATA

TECHNICAL FIELD

The current document is directed to computer-system monitoring and management and, in particular, to collection, generation, and storage of multidimensional metric data used for monitoring, management, and administration of computer systems.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system monitoring, management, and administration. Currently, these needs have begun to be addressed by highly capable automated data-collection, data analysis, monitoring, management, and administration tools and facilities. Many different types of automated monitoring, management, and administration facilities have emerged, providing many different products with overlapping functionalities, but each also providing unique functionalities and capabilities. Owners, managers, and users of large-scale computer systems continue to seek methods, systems, and technologies to provide secure, efficient, and cost-effective data-collection and data analysis tools and subsystems to support monitoring, management, and administration of computing facilities, including cloud-computing facilities and other large-scale computer systems.

SUMMARY

The current document is directed to methods and systems that collect metric data within computing facilities, including large data centers and cloud-computing facilities. In a described implementation, two or more metric-data sets are combined to generate a multidimensional metric-data set. The multidimensional metric-data set is compressed for efficient storage by clustering the multidimensional data points within the multidimensional metric-data set to produce a covering subset of multidimensional data points and by then representing the multidimensional-data-point members of each cluster by a cluster identifier rather than by a set of floating-point values, integer values, or other types of data representations. The covering set is constructed to ensure that the compression does not result in greater than a specified level of distortion of the original data. The compressed multidimensional metric data is subsequently decompressed for data analysis, including statistical analyses that detect significant changes in time series of metric data, unexpected events, anomalies, and other events and trends that may result in automated corrective actions, automated generation of alerts, automated or semi-automated system reconfiguration, and other such automated and semi-automated responses by monitoring, management, and administration facilities within computer systems.

BRIEF DESCRIPTION OF THE DRAWINGS

FIG. 4 illustrates generalized hardware and software components of a general-purpose computer system, such as a general-purpose computer system having an architecture similar to that shown in FIG. 1.

DETAILED DESCRIPTION

Figure 1:
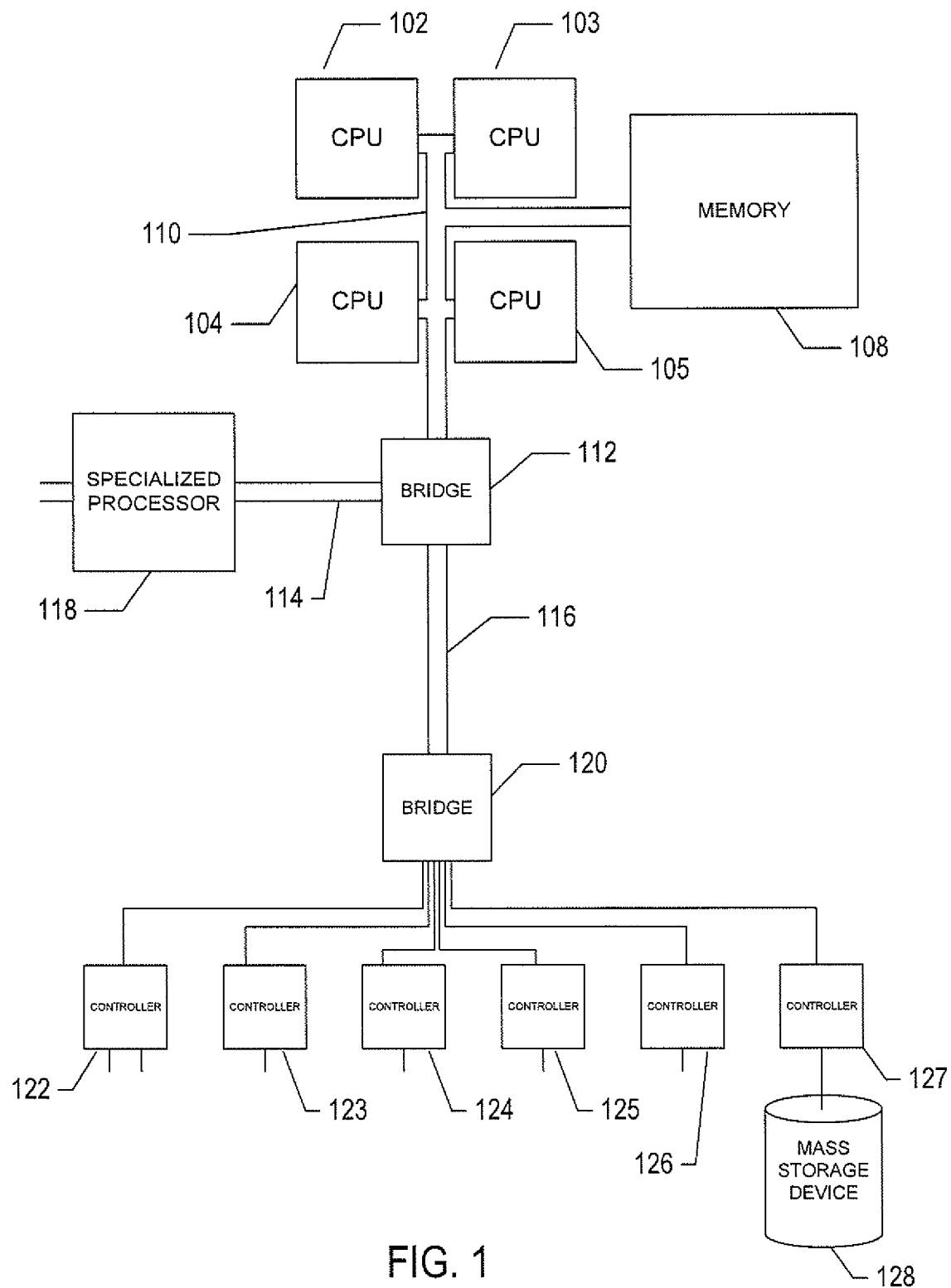
FIG. 1 provides a general architectural diagram for various types of computers.

The current document is directed to methods and systems that collect metric data within computing facilities, including large data centers and cloud-computing facilities, and that generate multidimensional metric-data sets from the collect metric data, compress the multidimensional metric-data sets for efficient storage, and subsequently decompress the compressed multidimensional metric-data sets for analysis and for management and administration purposes. In a first subsection, below, a detailed description of computer hardware, complex computational systems, and virtualization is provided with reference to FIGS. 1-10. In a second subsection, the currently disclosed methods and systems for collecting and exporting performance data are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
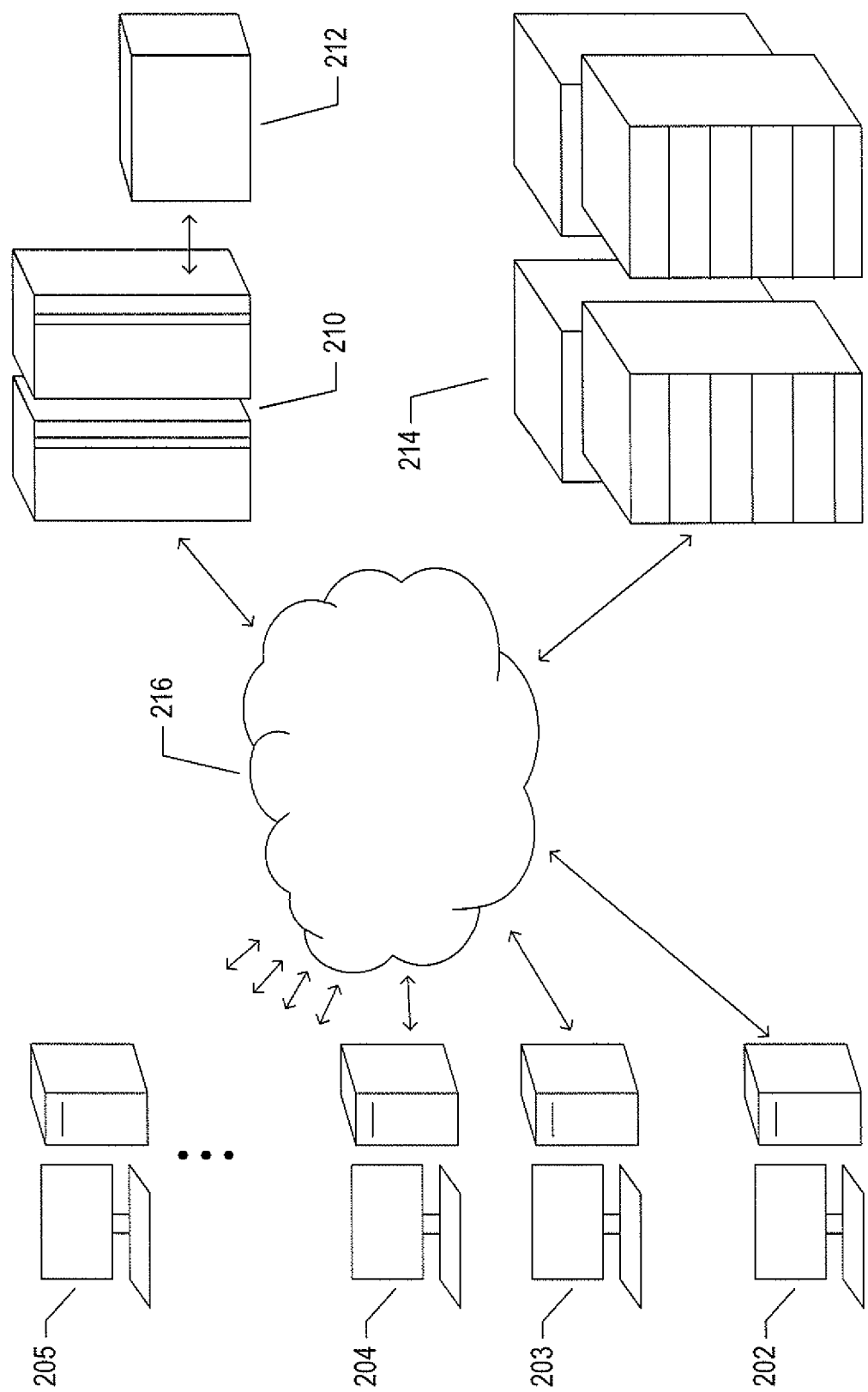
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
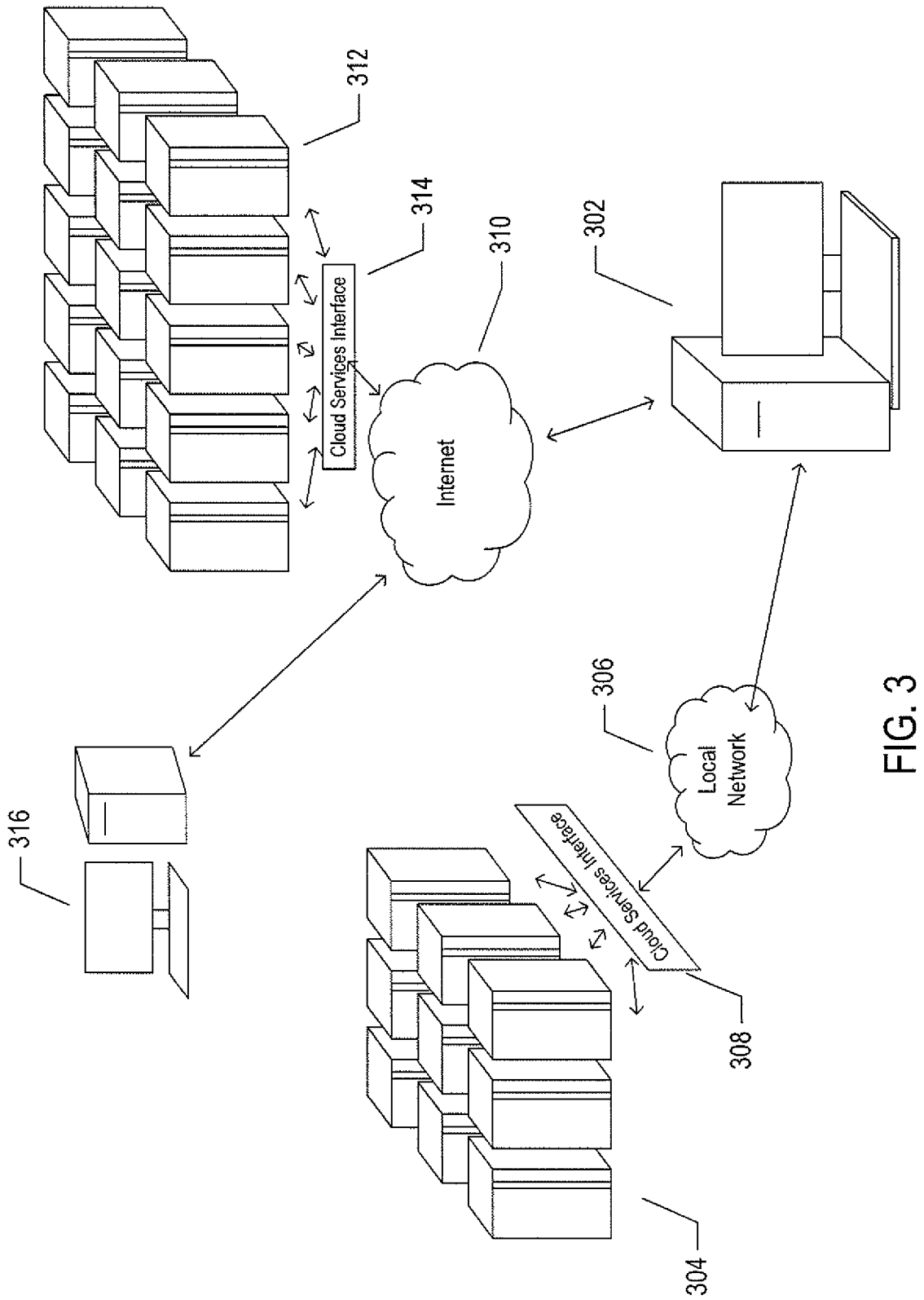
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
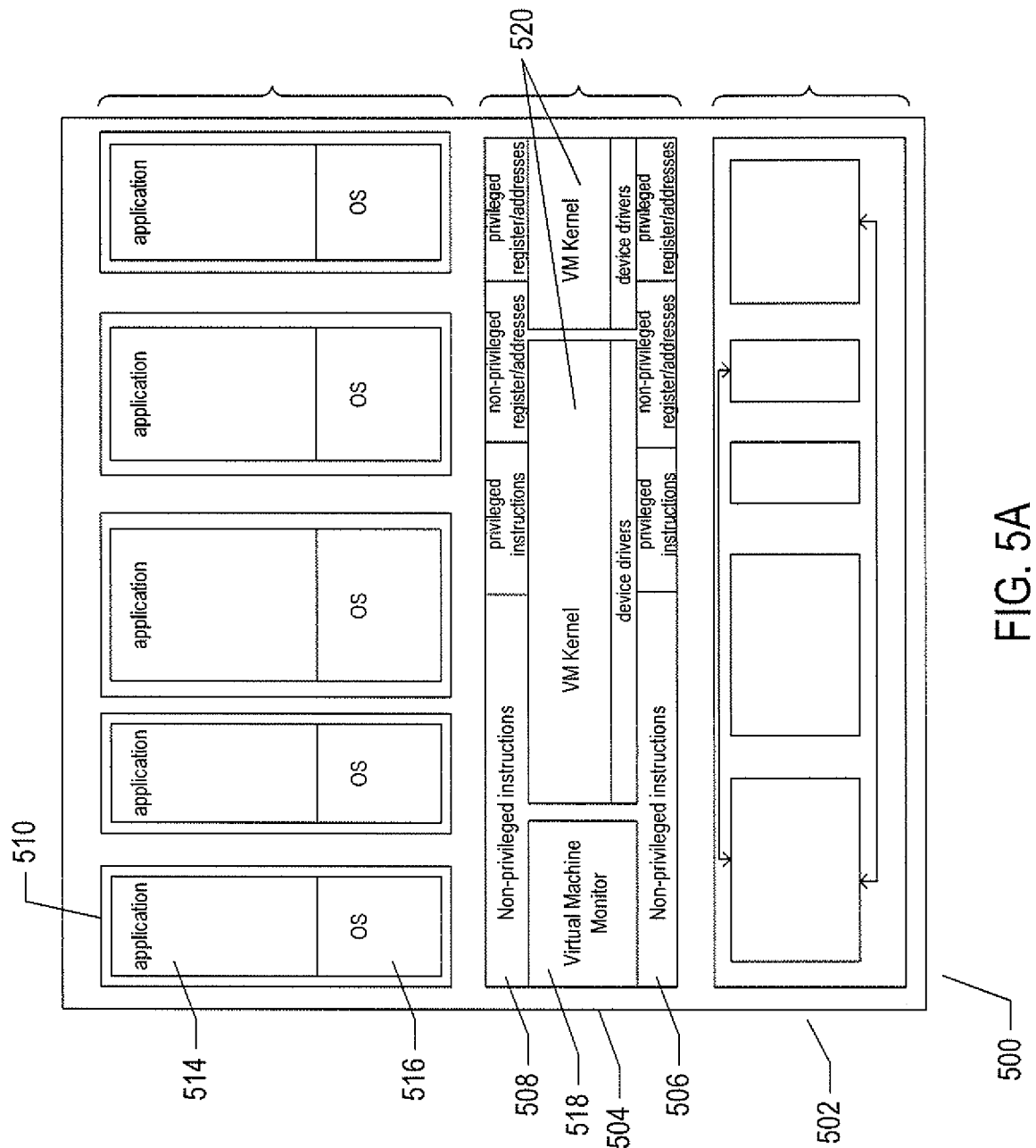
FIGS. 5A-D illustrate two types of virtual machine and virtual-machine execution environments.
Figure 5B:
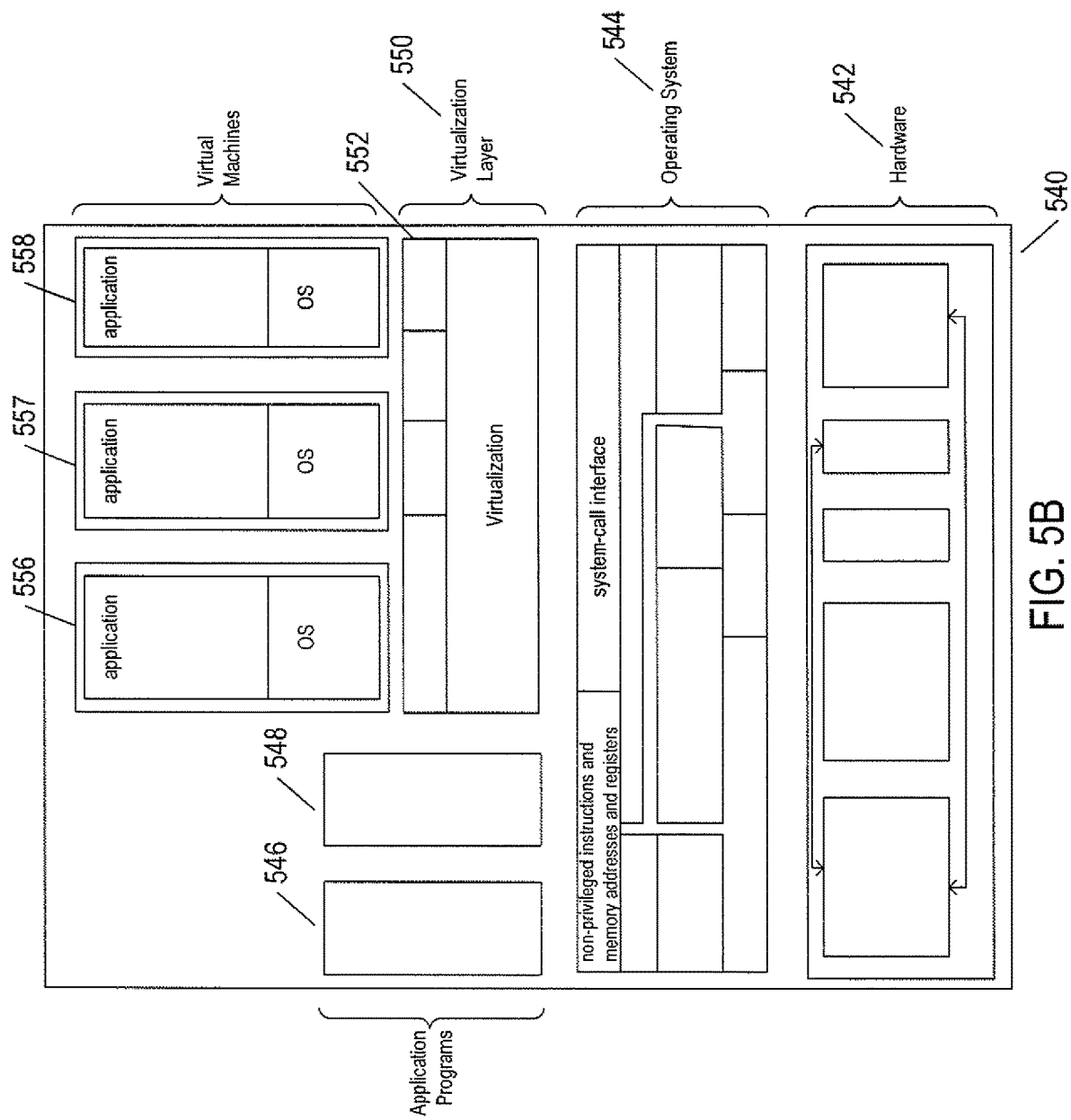

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
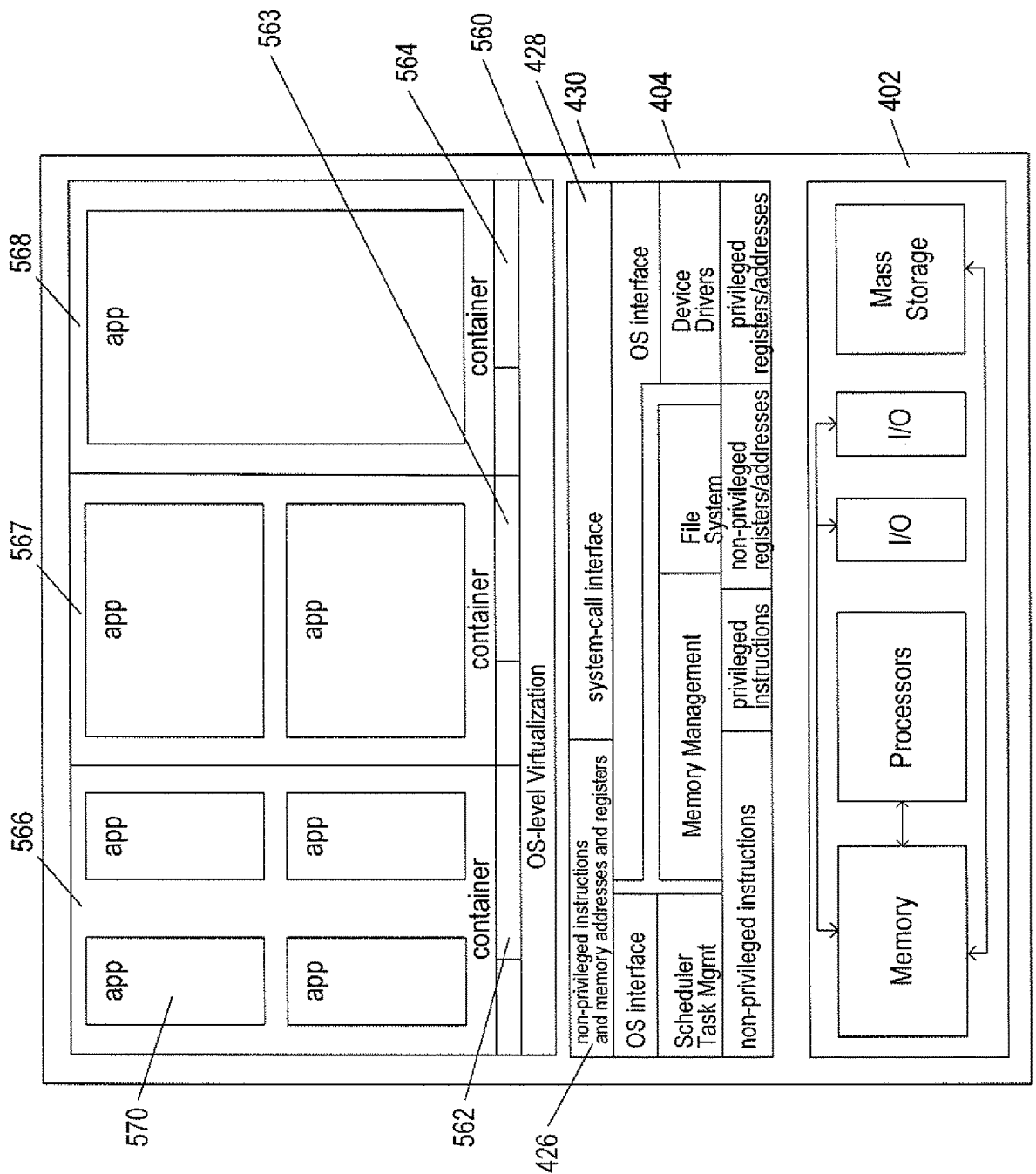

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
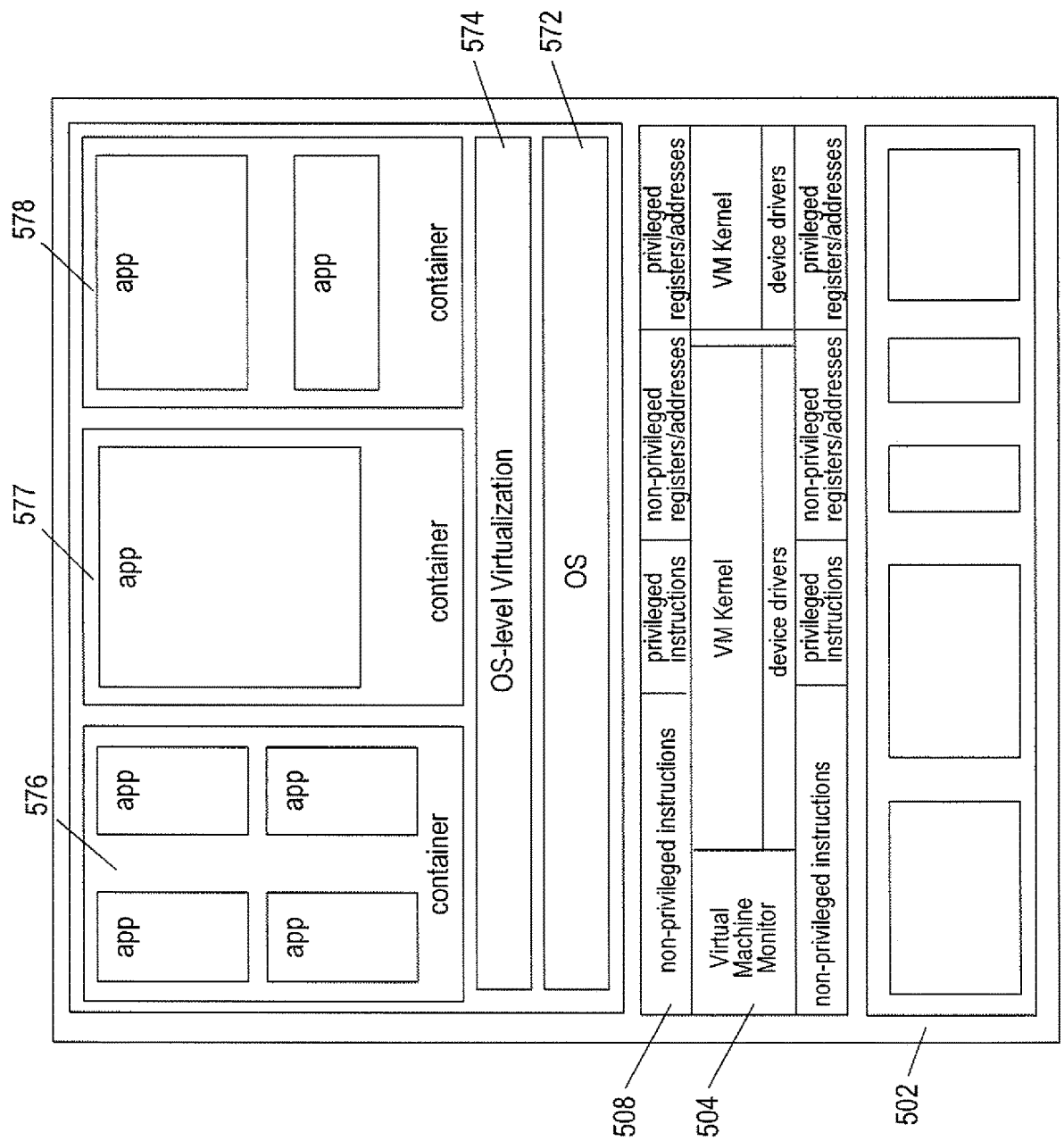

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
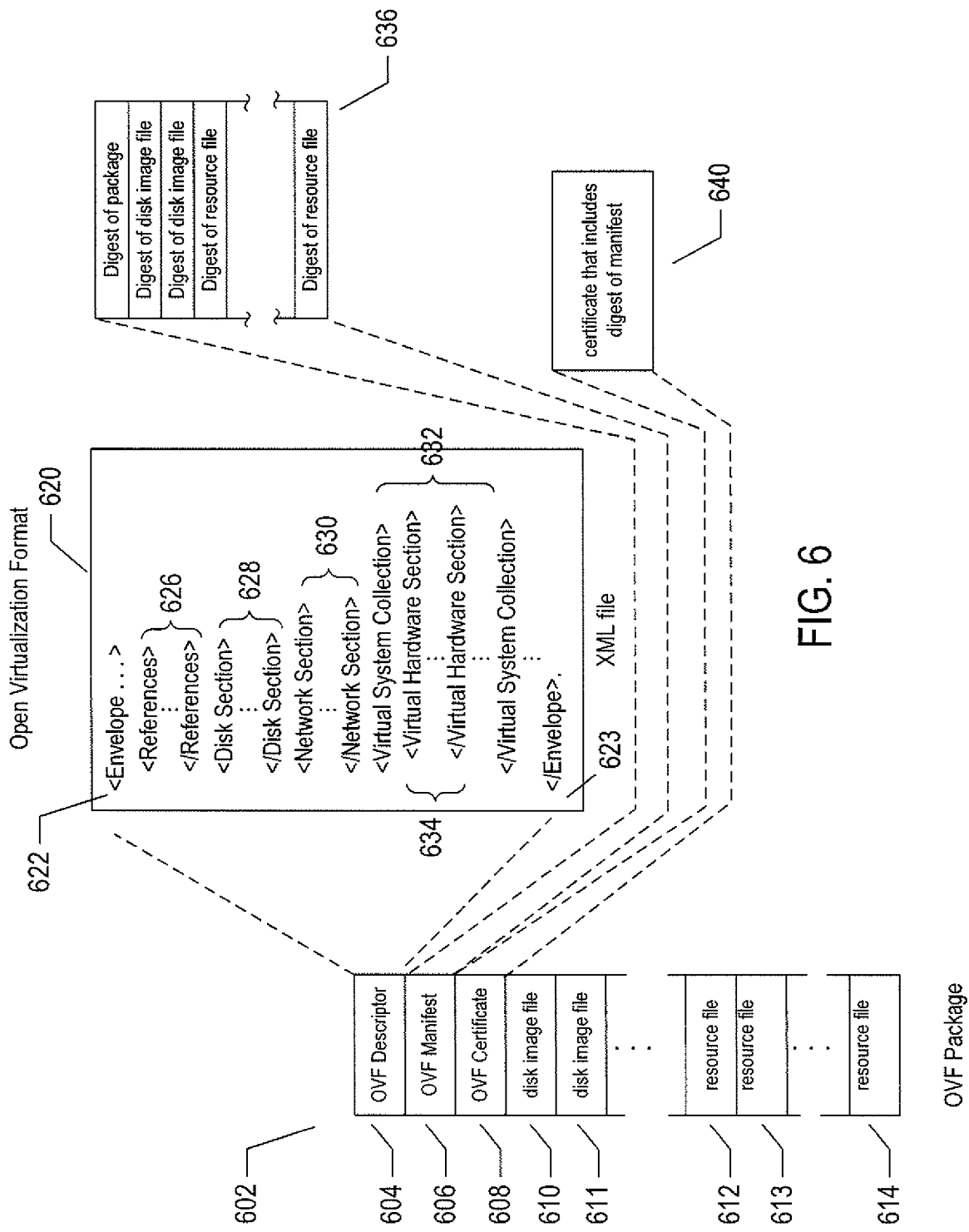
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
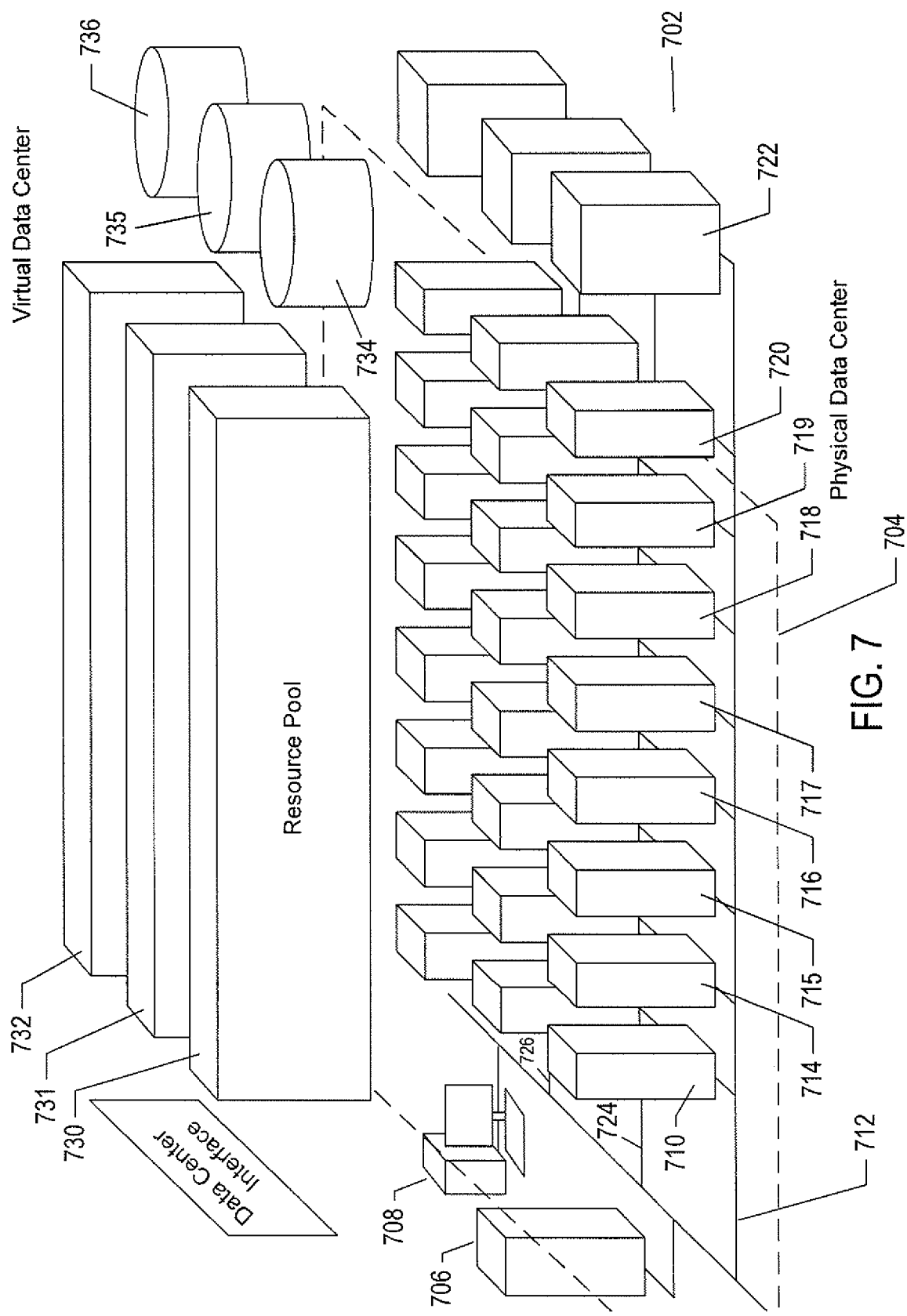
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
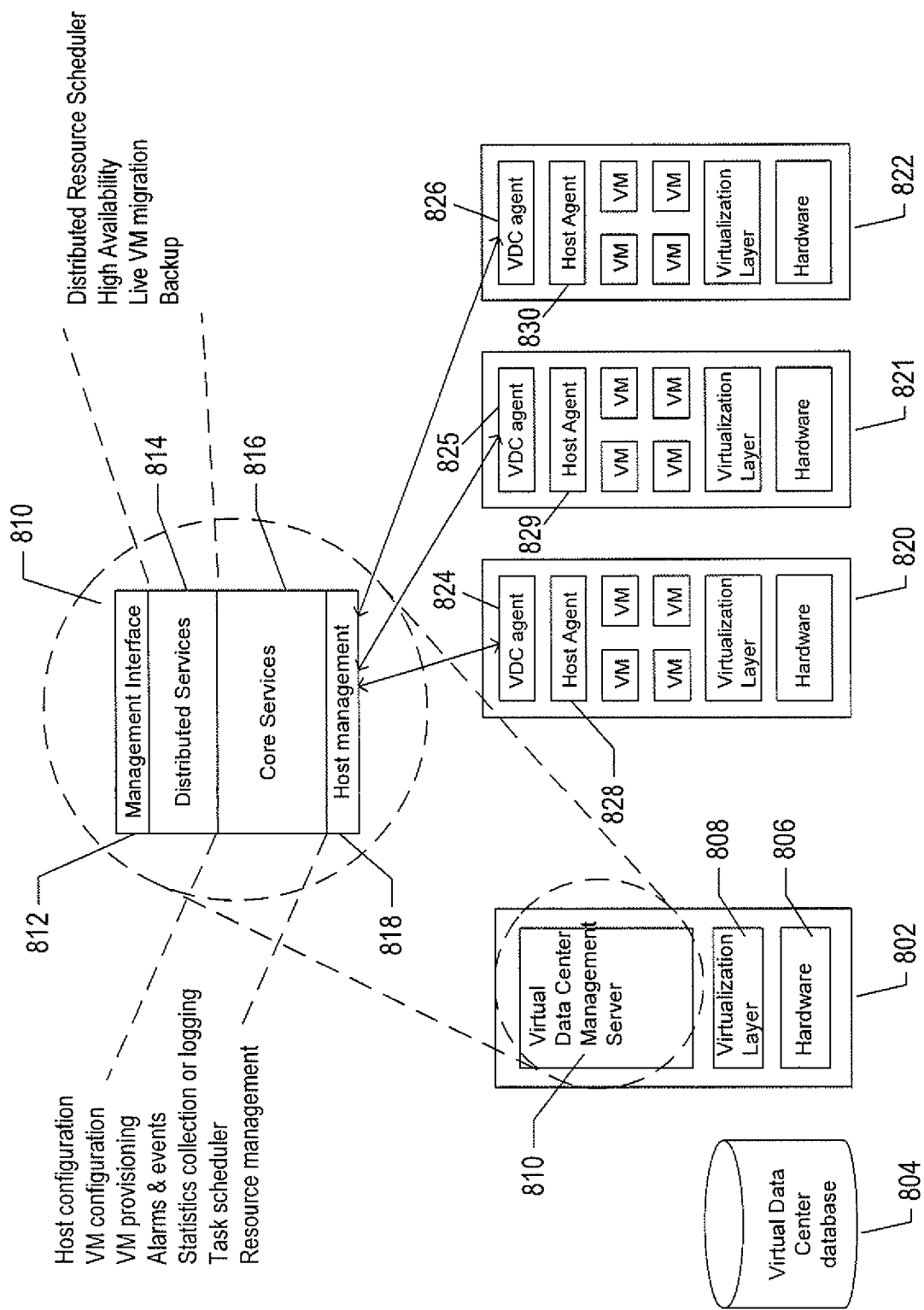
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
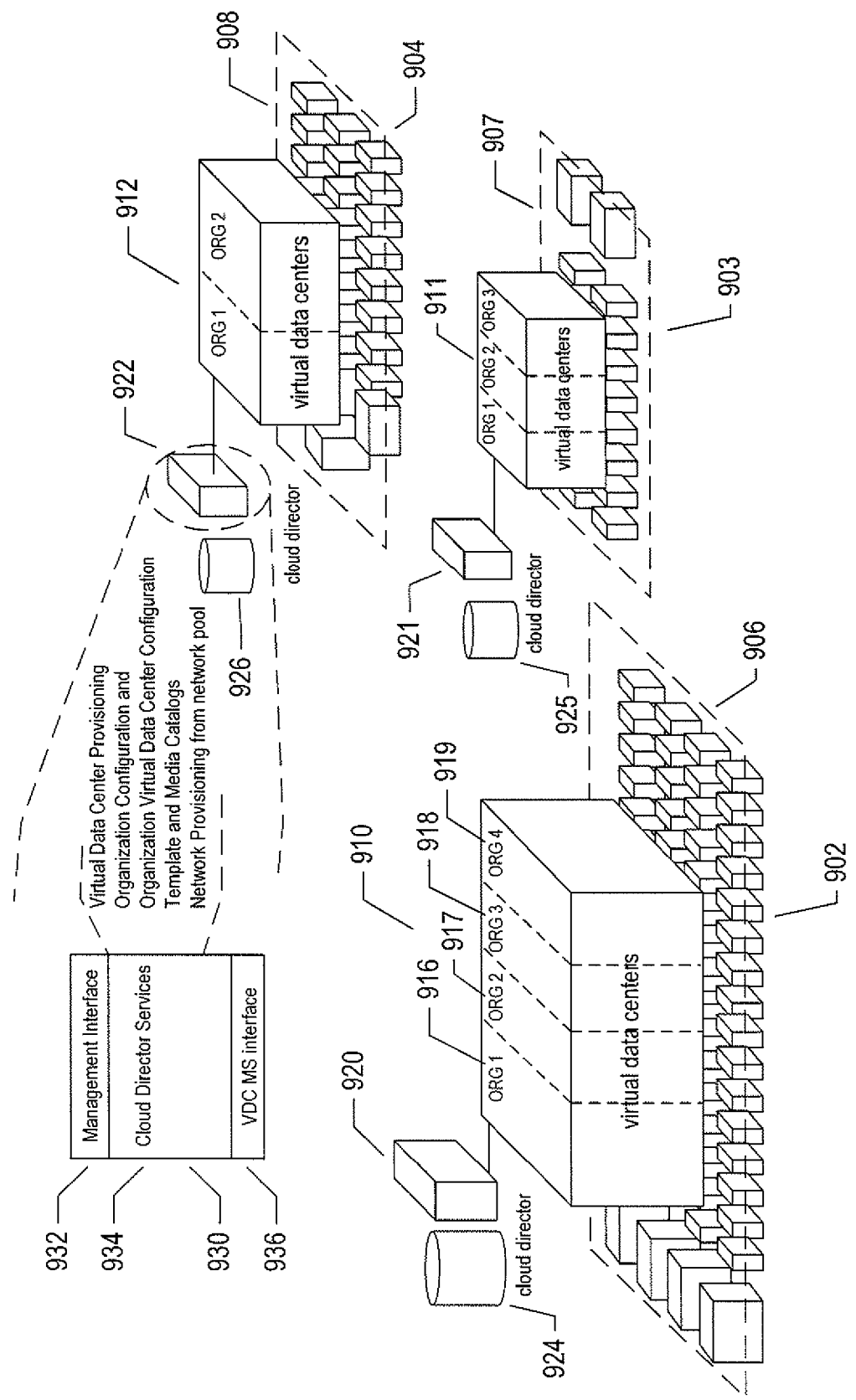
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
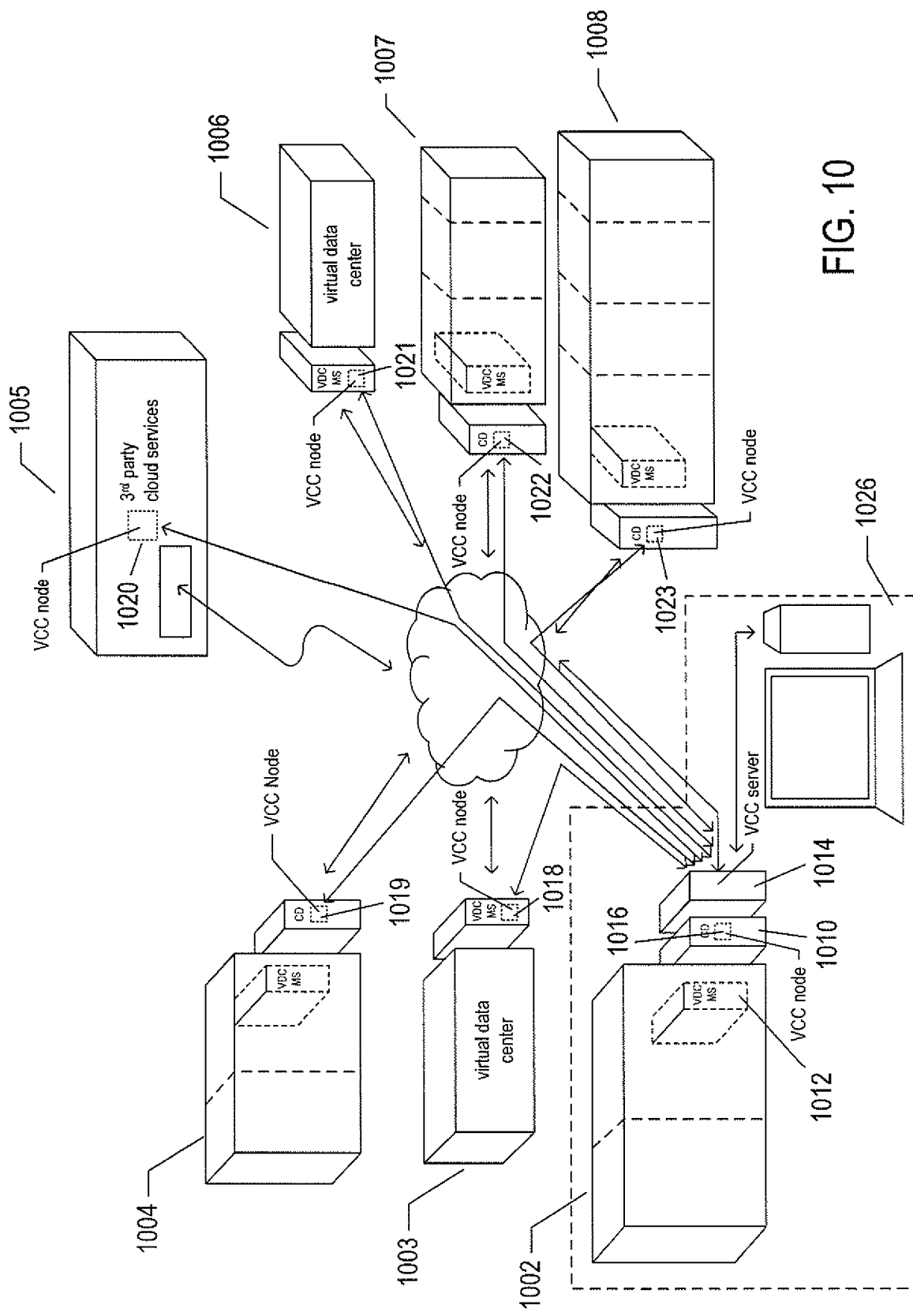
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11:
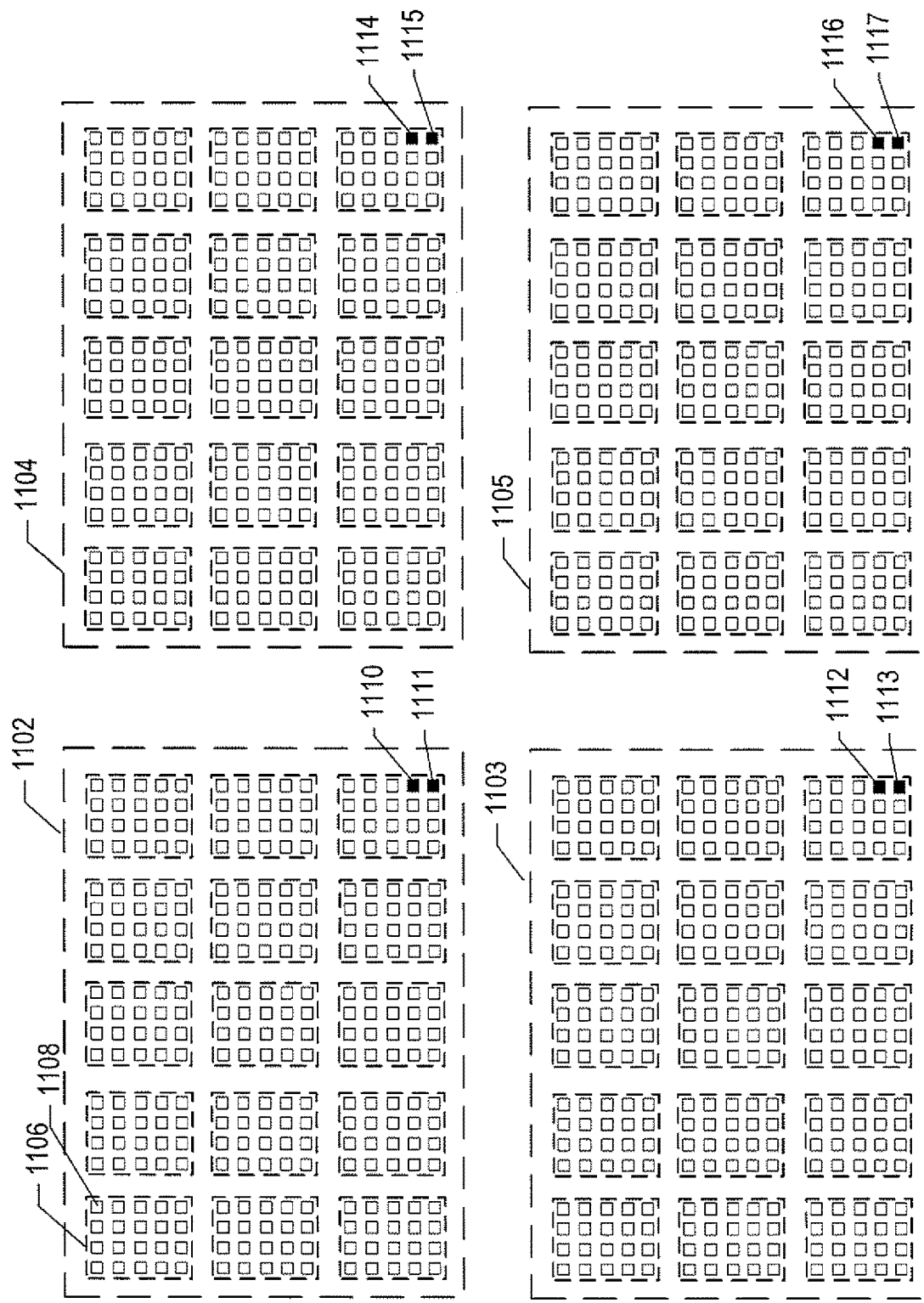
FIG. 11 illustrates a distributed data center or cloud-computing facility that includes a metric-data collection-and-storage subsystem.

FIG. 11 illustrates a distributed data center or cloud-computing facility that includes a metric-data collection-and-storage subsystem. The distributed data center includes four local data centers 1102-1105, each of which includes multiple computer systems, such as computer system 1106 in local data center 1102, with each computer system running multiple virtual machines, such as virtual machine 1108 within computer system 1106 of local data center 1102. Of course, in many cases, the computer systems and data centers are virtualized, as are networking facilities, data-storage facilities, and other physical components of the data center, as discussed above with reference to FIGS. 7-10. In general, local data centers may often contain hundreds or thousands of servers that each run multiple virtual machines. Several virtual machines, such as virtual machines 1110-

1111 in a local data center 1102, may provide execution environments that support execution of applications dedicated to collecting and storing metric data regularly generated by other virtual machines and additional virtual and physical components of the data center. Metric-data collection may be, in certain cases, carried out by event-logging subsystems. In other cases, metric-data collection may be carried out by metric-data collection subsystems separate from event-logging subsystems. The other local data centers 1103-1105 may similarly include one or more virtual machines that run metric-data-collection and storage applications 1112-1117.

The metric-data-collection and storage applications may cooperate as a distributed metric-data-collection-and-storage facility within a distributed monitoring, management, and administration component of the distributed computing facility. Other virtual machines within the distributed computing facility may provide execution environments for a variety of different data-analysis, management, and administration applications that use the collected metrics data to monitor, characterize, and diagnose problems within the distributed computing facility. While abstract and limited in scale, FIG. 11 provides an indication of the enormous amount metric data that may be generated and stored within a distributed computing facility, given that each virtual machine and other physical and virtual components of the distributed computing facility may generate hundreds or thousands of different metric data points at relatively short, regular intervals of time.

Figure 12:
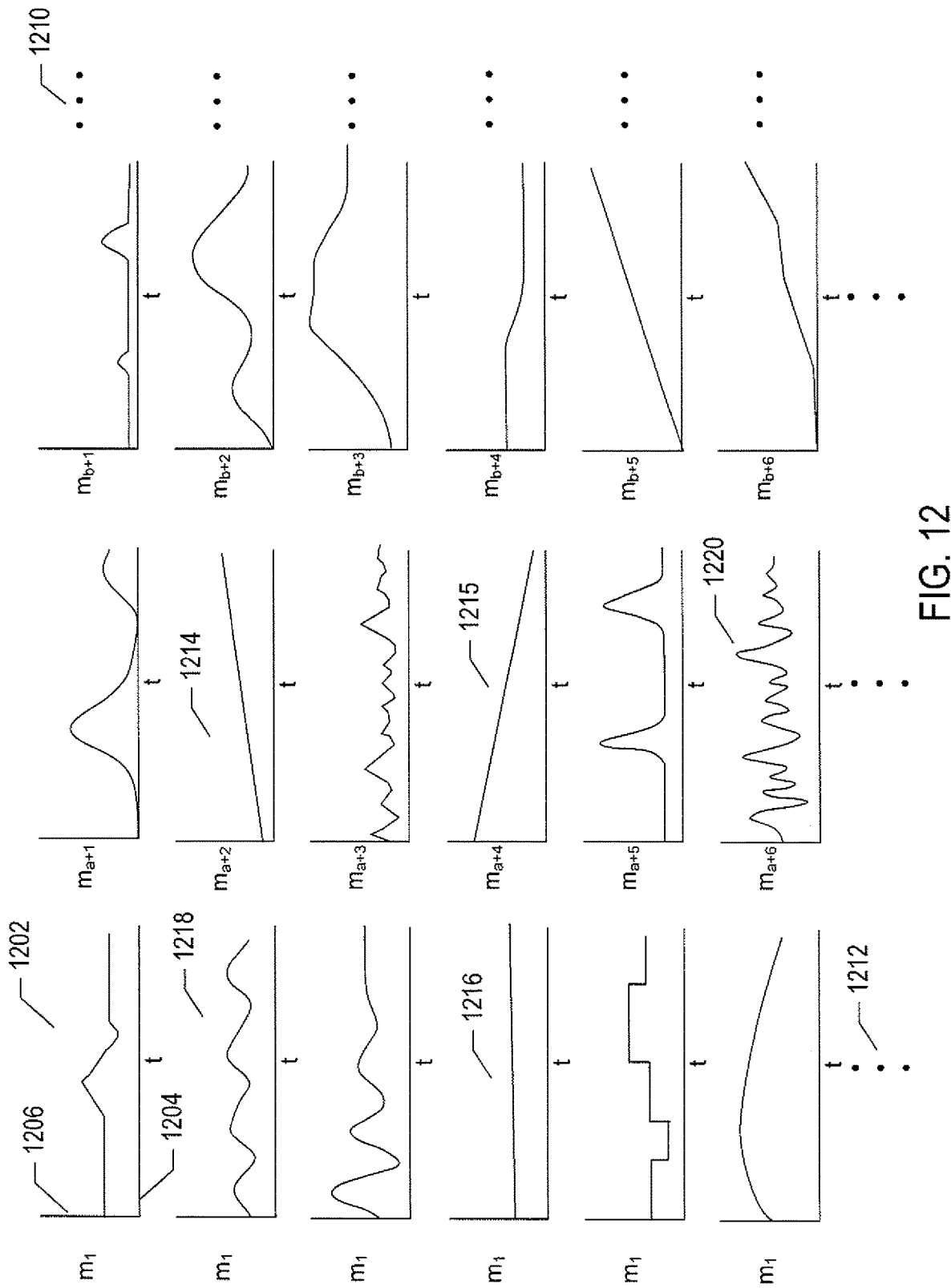
FIG. 12 illustrates the many different types of metric data that may be generated by virtual machines and other physical and virtual components of a data center, distributed computing facility, or cloud-computing facility.

FIG. 12 illustrates the many different types of metric data that may be generated by virtual machines and other physical and virtual components of a data center, distributed computing facility, or cloud-computing facility. In FIG. 12, each metric is represented as 2-dimensional plot, such as plot 1202, with a horizontal axis 1204 representing time, a vertical axis 1206 representing a range of metric values, and a continuous curve representing a sequence of metric-data points, each metric-data point representable as a timestamp/metric-data-value pair, collected at regular intervals. Although the plots show continuous curves, metric data is generally discrete, produced at regular intervals within a computing facility by a virtual or physical computing-facility component. A given type of component may produce different metric data than another type of component. For purposes of the present discussion, it is assumed that the metric data is a sequence of timestamp/floating-point-value pairs. Of course, data values for particular types of metrics may be represented as integers rather than floating-point values or may employ other types of representations. As indicated by the many ellipses in FIG. 12, such as ellipses 1210 and 1212, the set of metric-data types collected within a distributed computing facility may include a very large number of different metric types. The metric-data-type representations shown in FIG. 12 can be considered to be a small, upper, left-hand corner of a large matrix of metric types that may include many hundreds or thousands of different metric types. As shown in FIG. 12, certain metric types have linear or near-linear representations 1214-1216, other metric types may be represented by periodic or oscillating curves 1218, and others may have more complex forms 1220.

Figure 13:
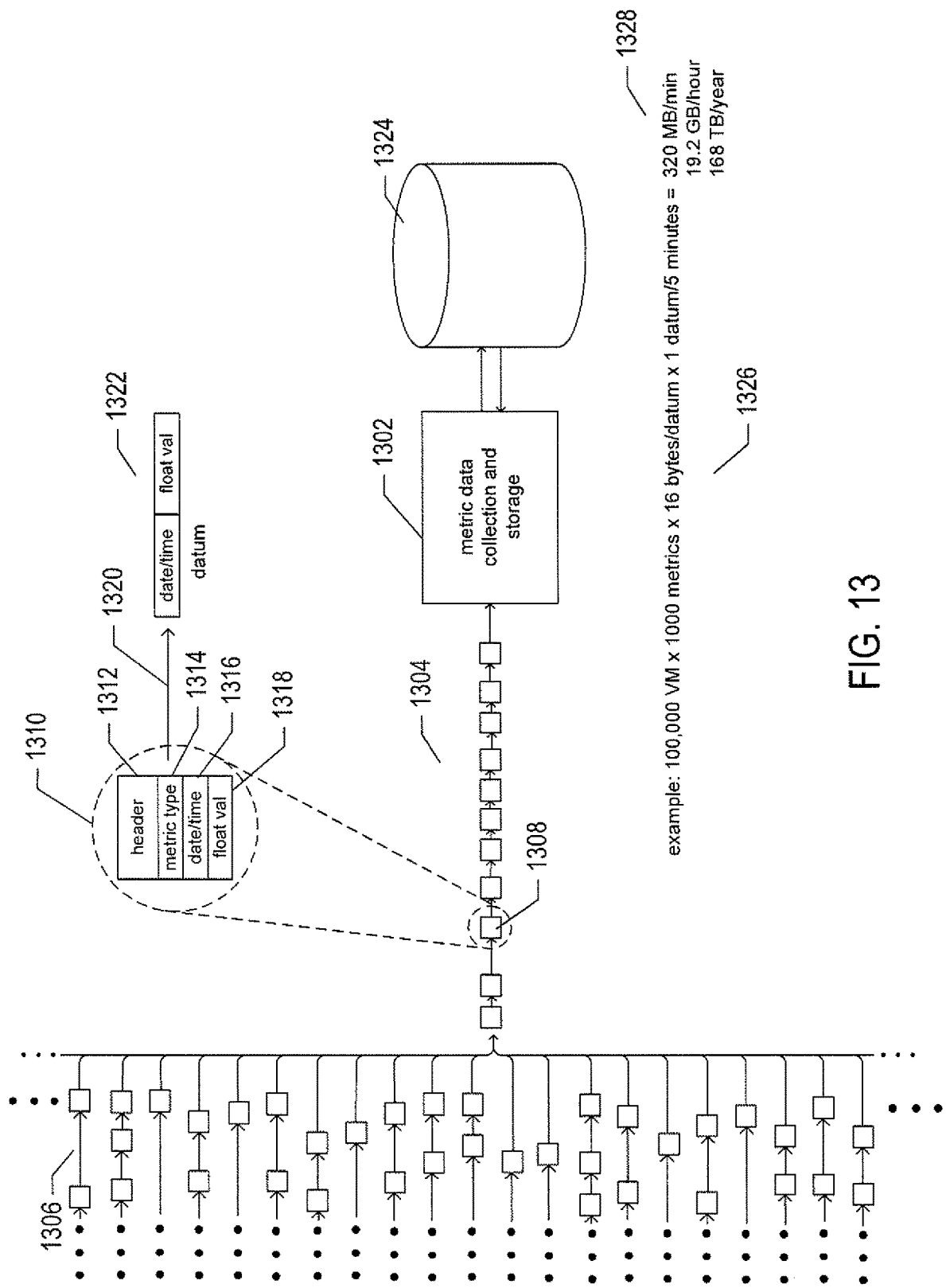
FIG. 13 illustrates metric-data collection within a distributed computing system.

FIG. 13 illustrates metric-data collection within a distributed computing system. As discussed above with reference to FIG. 11, a distributed computing system may include numerous virtual machines that provide execution environments for dedicated applications that collect and store metric data on behalf of various data-analysis, monitoring, management, and administration subsystems. In FIG. 13, rectangle 1302 represents a metric-data-collection application. The metric-data-collection application receives a continuous stream of messages 1304 from a very large number of metric-data sources, each represented by a separate message stream, such as message stream 1306, in the left-hand portion of FIG. 13. Each metric-data message, such as metric-data message 1308 shown in greater detail in inset 1310, generally includes a header 1312, an indication of the metric-data type 1314, a timestamp, or date/time indication 1316, and a floating-point value 1318 representing the value of the metric at the point in time represented by the timestamp 1316. In general, the metric-data collection-and-storage subsystem 1302 processes the received messages, as indicated by arrow 1320, to extract a timestamp/metric-data-value pair 1322 that is stored in a mass-storage device or data-storage appliance 1324 in a container associated with the metric-data type and metric-data source. Alternatively, the timestamp/metric-data-value pair may be stored along with additional information indicating the type of data and data source in a common metric-data container or may be stored more concisely in multiple containers, each associated with a particular data source or a particular type of metric data, such as, for example, storing timestamp/metric-data-value pairs associated with indications of a metric-datatype in a container associated with a particular metric-data source.

As indicated by expression 1326 in FIG. 13, assuming a distributed cloud-computing facility running 100,000 virtual machines, each generating 1000 different types of metric-data values every 5 minutes, and assuming that each timestamp/metric-data-value pair comprises two 64-bit values, or 16 bytes, the distributed cloud-computing facility may generate 320 MB of metric data per minute 1328, equivalent to 19.2 GB of metric data per hour or 168 TB of metric data per year. When additional metric-data-type identifiers and data-source identifiers are stored along with the timestamp/metric-data-value pair, the volume of stored metric data collected per period of time may increase by a factor of 2 or more. Thus, physical storage of metric data collected within a distributed computer system may represent an extremely burdensome data-storage overhead. Of course, that data-storage overhead also translates into a very high computational-bandwidth overhead, since the stored metric data is generally retrieved from the data-storage appliance or appliances and processed by data-analysis, monitoring, management, and administration subsystems. The volume of metric data generated and stored within a distributed computing facility thus represents a significant problem with respect to physical data-storage overheads and computational-bandwidth overheads for distributed computing systems, and this problem tends to increase over time as distributed computing facilities include ever greater numbers of physical and virtual components and as additional types of metric data are collected and processed by increasingly sophisticated monitoring, management, and administration subsystems.

A second problem related to metric-data collection and processing within distributed computing systems is that, currently, most systems separately collect and store each different type of metric data and separately process each different type of metric data. As one example, monitoring subsystems may often monitor the temporal behavior of particular types of metric data to identify anomalies, such as a spike or significant pattern shift that may correspond to some type of significant state change for the physical-or-virtual-component source of the metric data. The anomalies or outlying data points discovered by this process may then be processed, at a higher level, within a monitoring subsystem in order to attempt to map the anomalies and changes to particular types of events with different priority levels. A disk failure, for example, might be reflected in anomalies detected in various different metrics generated within the distributed computing facility, including operational-status metrics generated by a data-storage subsystem as well as operational-status metrics generated by virtual-memory subsystems or guest operating systems within affected virtual machines. However, current data analysis may often overlook anomalies and changes reflected in combinations of metric data for which the individual metric data do not individually exhibit significant pattern changes or significant numbers of outlying data values. In other words, current data-analysis and monitoring subsystems may fail to detect departures from normal behavior that might not be reflected in anomalies detected in individual types of metric data, but that would only emerge were multiple types of metric data analyzed concurrently. However, because of the enormous volumes of metric data collected within distributed computing systems, attempts to detect such anomalies by considering various different combinations of collected types of metric data would quickly lead to an exponential increase in the computational-bandwidth overheads associated with metric-data analysis and with monitoring of the operational status of the distributed computing system.

The currently disclosed methods and systems have been developed to address the two problems discussed above, in the preceding paragraph, as well as additional problems associated with the collection, storage, and analysis of metric data within distributed computing systems. The currently disclosed methods and systems generate multidimensional metric-data sets in which each multidimensional data point includes component values for each of multiple single-dimensional metric-data sets. The multidimensional metric-data sets are compressed for efficient storage using multidimensional metric-data-point clustering, as explained below. Multidimensional metric-data sets are efficiently analyzed to identify anomalous and significant multidimensional metric data points that are difficult to identify using single-dimensional metric data sets, and cluster compression of multidimensional metric-data sets can provide efficient storage for the data that would otherwise be stored as multiple single-dimensional metric-data sets.

Figure 14:
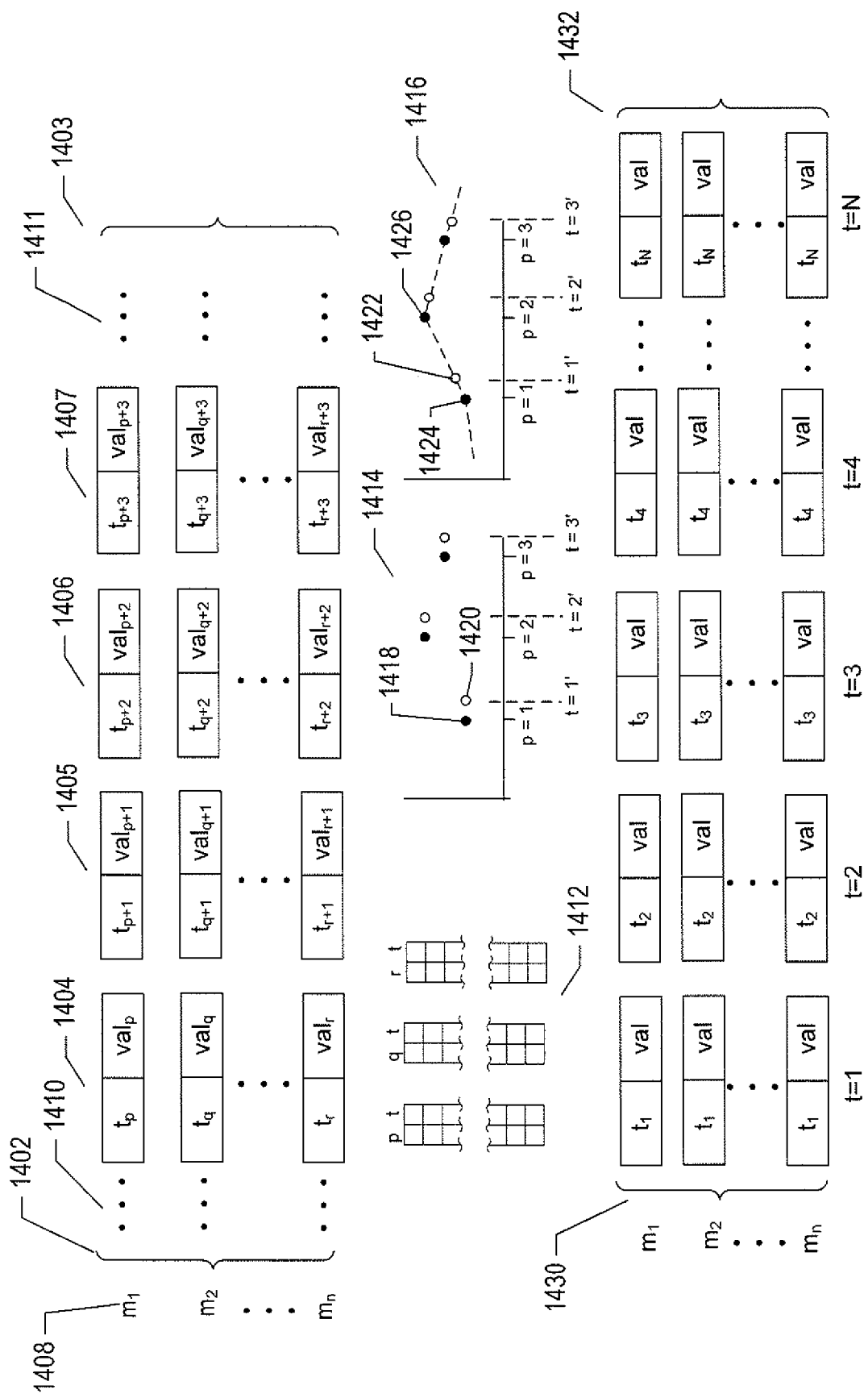
FIG. 14 illustrates generation of a multidimensional metric-data set from multiple individual metric-data sets.

FIG. 14 illustrates generation of a multidimensional metric-data set from multiple individual metric-data sets. At the top of FIG. 14, a set of metric-data sets $m_1$, $m_2$, . . . , $m_n$ is shown within brackets 1402-1403. Each metric-data set consists of a time series of timestamp/metric-data-value pairs, such as the timestamp/metric-data-value pairs 1404-1407 that together compose a portion of the $m_1$ metric-data set 1408. Ellipses 1410-1411 indicate that the time series continues in both directions in time. The horizontal position of each timestamp/metric-data-value pair reflects the time indicated by the timestamp in the timestamp/metric-data-value pair. In this example, the timestamp/metric-data-value pairs are generated at a regular time interval, but as indicated by the misalignment in time between the timestamp/metric-data-value pairs of adjacent metrics, the times at which values are generated for a given metric-data set made the different from the times for which values are generated for another metric-data set.

As indicated by the set of tables 1412 and by plots 1414 and 1416, a number of different approaches can be taken in order to temporally align timestamp/metric-data-value pairs of multiple separate metric-data sets. As indicated by tables 1412, a correspondence or map can be generated to map each of the timestamps for each metric-data set to a common time t. This mapping can be accomplished, as one example, by selecting time points in the metric-data set closest to common time points and assigning the timestamps in each timestamp/metric-data-value pair to reflect the closest common-time timepoint, as shown in plot 1414. In this plot, the shaded disks, such as shaded disk 1418, represent the original timestamp/metric-data-value pairs in the metric-data set and the unshaded disks, such as shaded disk 1420, represent timestamp/metric-data-value pairs shifted to the common time interval. Alternatively, as shown in plot 1416, linear interpolation can be used in order to adjust the values of the metric-data set as the timestamps are shifted to a common time interval. For example, the timestamp/metric-data-value pair represented by the unshaded disc 1422 represents an interpolation based on the original metric-data-set timestamp/metric-data-value pairs represented by shaded disks 1424 and 1426. There are a variety of additional methods that can be used to shift the timestamp/metric-data-value pairs of a metric-data set to a different time interval, including various types of nonlinear interpolation. The result of the minor time adjustments of the metric-data sets is, as shown in the lower portion of FIG. 14, an equivalent set of metric-data sets in which the timestamp/metric-data-value pairs within the different metric-data sets are aligned with respect to a common time interval, as indicated by the vertical alignment of the timestamp/metric-data-value pairs for all of the n metric-data sets into vertical columns. In certain systems, time shifting may not be necessary when metric-data sets that are to b, combined to form a multidimensional metric-data set share a common reporting interval, as in the case in which virtual machines report the values of multiple metric-data sets together at a regular time interval, such as every 5 minutes. In other systems, the types of data analysis carried out on multidimensional metric data may be insensitive to small discrepancies in time intervals between metric-data sets, as a result of which interpolation of time-shifted values is unnecessary. However, when this is not the case, or when metric data from two different metric-data sources with different reporting intervals are combined to form a multidimensional metric-data set, any of various types of time shifting may be applied in order to produce multiple temporarily aligned metric-data sets, such as those shown between brackets 1430 and 1432 at the bottom of FIG. 14.

As discussed below, in certain implementations, null entries may be included in a sequence of multidimensional data points that together comprise a multidimensional metric-data set to represent missing multidimensional data points and incomplete multidimensional data points. For example, when a metric-data set includes data points generally collected at a regular interval, but the time difference between a particular pair of data points is twice that interval, absent any other contradictory evidence, it may be reasonable to infer that there is a missing data point between the two data points of the pair, and to therefore represent the missing data point by a null entry. Similarly, when cone component of a multidimensional data point is missing, it may be reasonable to represent that multidimensional data point as a null entry in a sequence of multidimensional data points that together comprise a multidimensional metric-data set.

Figure 15:
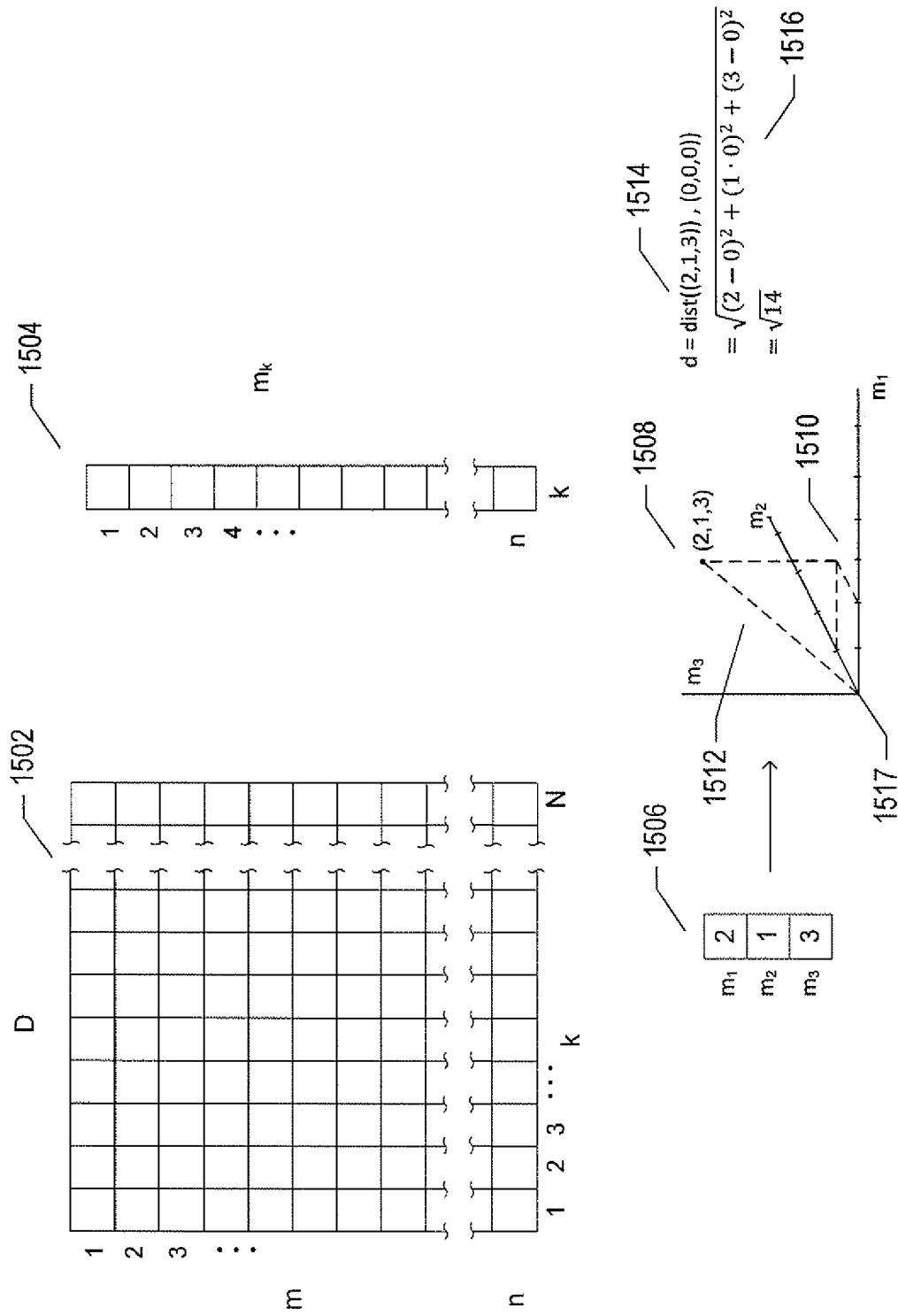
FIG. 15 illustrates a view of a temporarily aligned set of metric-data sets as a multidimensional data set.

FIG. 15 illustrates a view of a temporarily aligned set of metric-data sets as a multidimensional data set. The two-dimensional matrix D 1502 represents a set of temporarily aligned metric-data sets. Each row in the matrix contains metric values for a particular metric and each column in the matrix represents all of the metric values for the set of metric-data sets at a common time point. When viewed as a multidimensional metric-data set, each column of the matrix, such as the case column 1504, can be viewed as a single point in a multidimensional space. For example, when three metric-data sets $m_1$, $m_2$, and $m_3$ are combined to form a single multidimensional metric-data set, a particular column 1506 can be viewed as containing the coordinates of a point 1508 in a three-dimensional space 1510. Alternatively, the column can be viewed as a vector 1512 in three-dimensional space. The dimensionality of the space is equal to the number of metric-data sets combined together to form the multidimensional metric-data set. In this view, a distance d can be assigned 1514 to any two points in the multidimensional space by any of various different distance metrics. A common distance metric is the Euclidean distance metric, the computation for which, in 3 dimensions, is shown by expression 1516 for the point 1508 with coordinates (2, 1, 3) and the origin 1517 with coordinates (0, 0, 0). Other types of distance metrics can be used in alternative implementations.

Figure 16A:
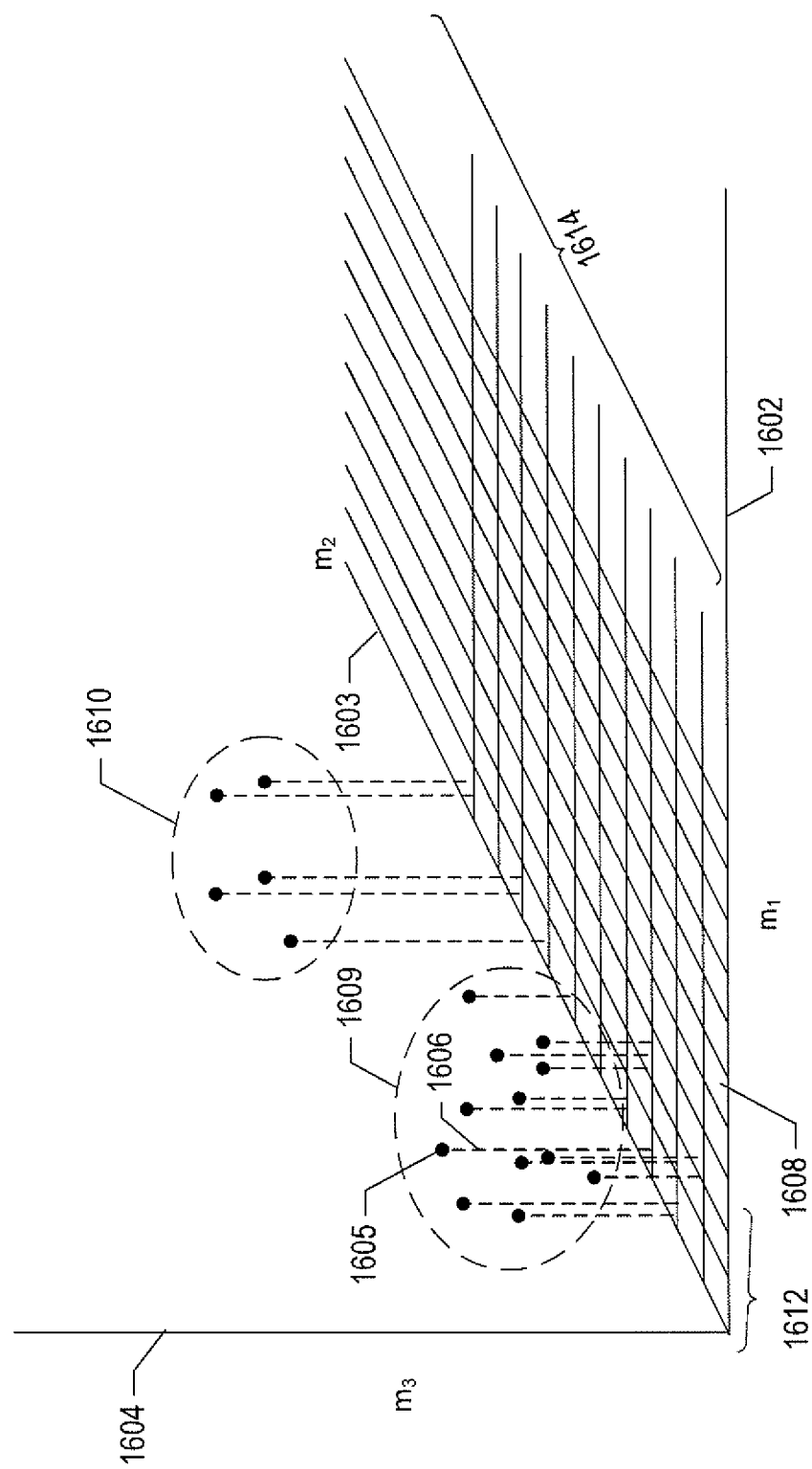
FIGS. 16A-H illustrate clustering of multidimensional data points. As mentioned above, clustering of multidimensional data points provides for cluster-based data compression for efficient storage of multidimensional metric data sets.
Figure 16B:
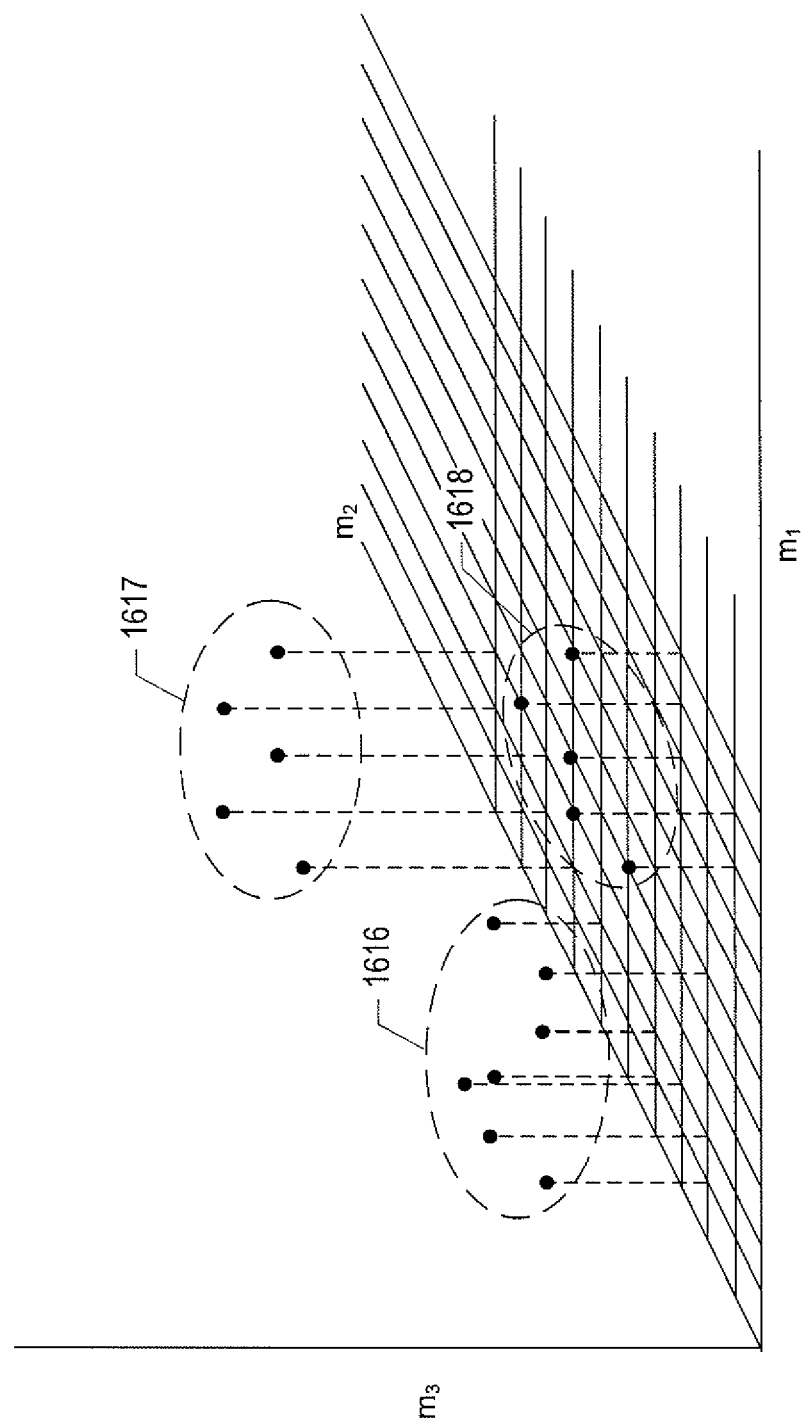

FIGS. 16A-H illustrate clustering of multidimensional data points. As mentioned above, clustering of multidimensional data points provides for cluster-based data compression for efficient storage of multidimensional metric data sets. FIG. 16A shows a plot of a three-dimensional metric-data set. The 3 Cartesian axes 1602-1604 corresponds to 3 different metric-data sets which are combined, as discussed above with reference to FIGS. 14-15, to produce three-dimensional vectors or data points, such as data point 1605, plotted within the three-dimensional plot shown in FIG. 16A. Each multidimensional data point is represented by a shaded disk, with a vertical dashed line, such as vertical dashed line 1606, indicating where the multidimensional data point would be projected vertically downward onto the $m_1/m_2$ horizontal plane 1608. Based on cursory visual inspection, it appears that the multidimensional data points can be partitioned into a first cluster, surrounded by dashed curve 1609, and a second cluster, surrounded by dashed curve 1610. However, it is clear that the range of values of the $m_1$ component of the three-dimensional data points are vectors is much narrower 1612 than the range of the $m_2$ components 1614, which compresses the three-dimensional data points along a narrow strip adjacent to, and parallel to, the $m_2$ axis. As shown in FIG. 16B, renormalizing the $m_1$ component values by multiplying the original $m_1$ component values by 4 produces a set of three-dimensional data points with approximately equal $m_1$ and $m_2$ component-value ranges. Moreover, cursory inspection of the normalized plot reveals an apparent clustering of the multidimensional data points into 3 distinct clusters 1616-1618. Thus, a normalization procedure may facilitate multidimensional-data-point clustering.

Figure 16C:
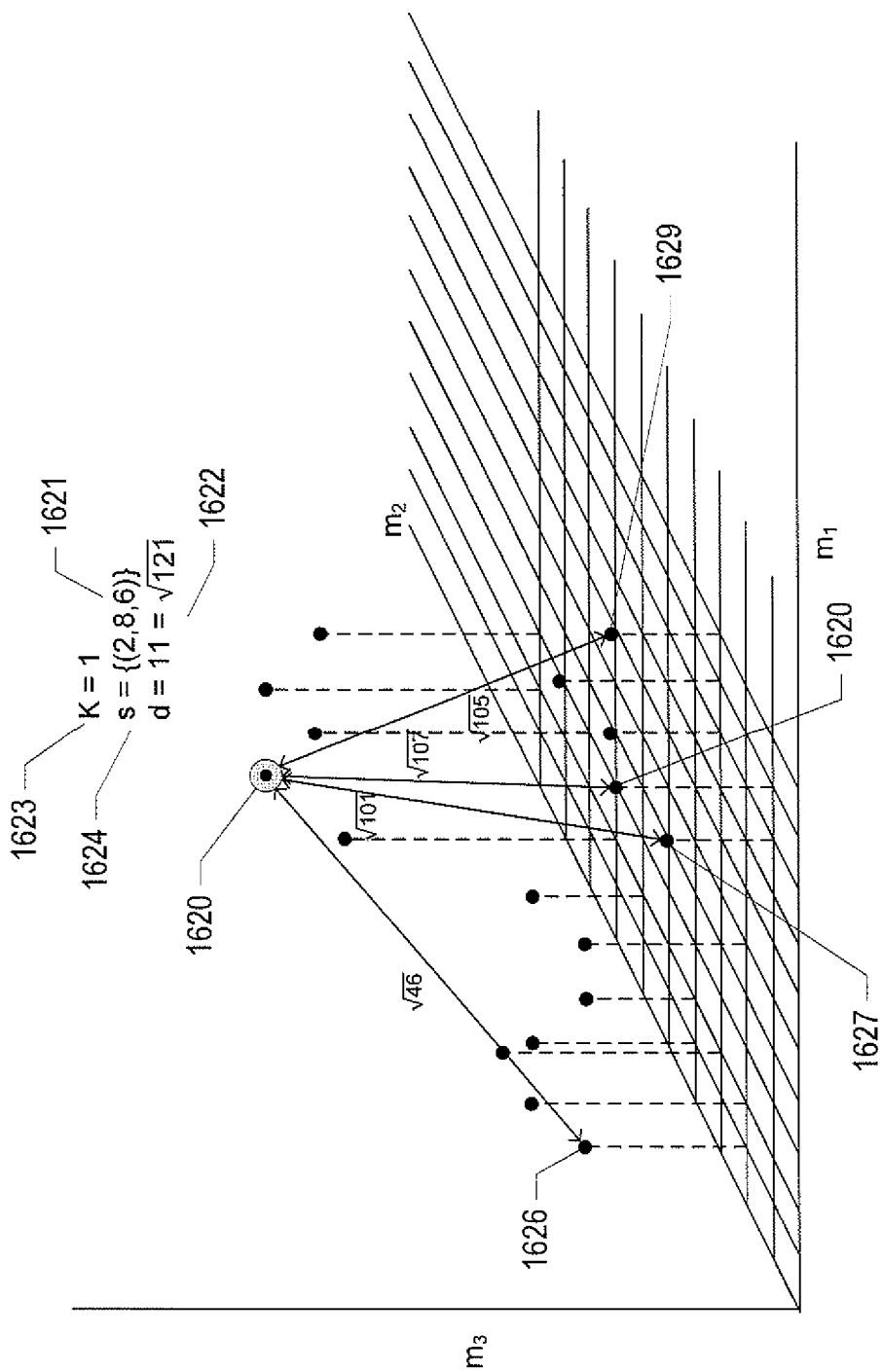
Figure 16D:
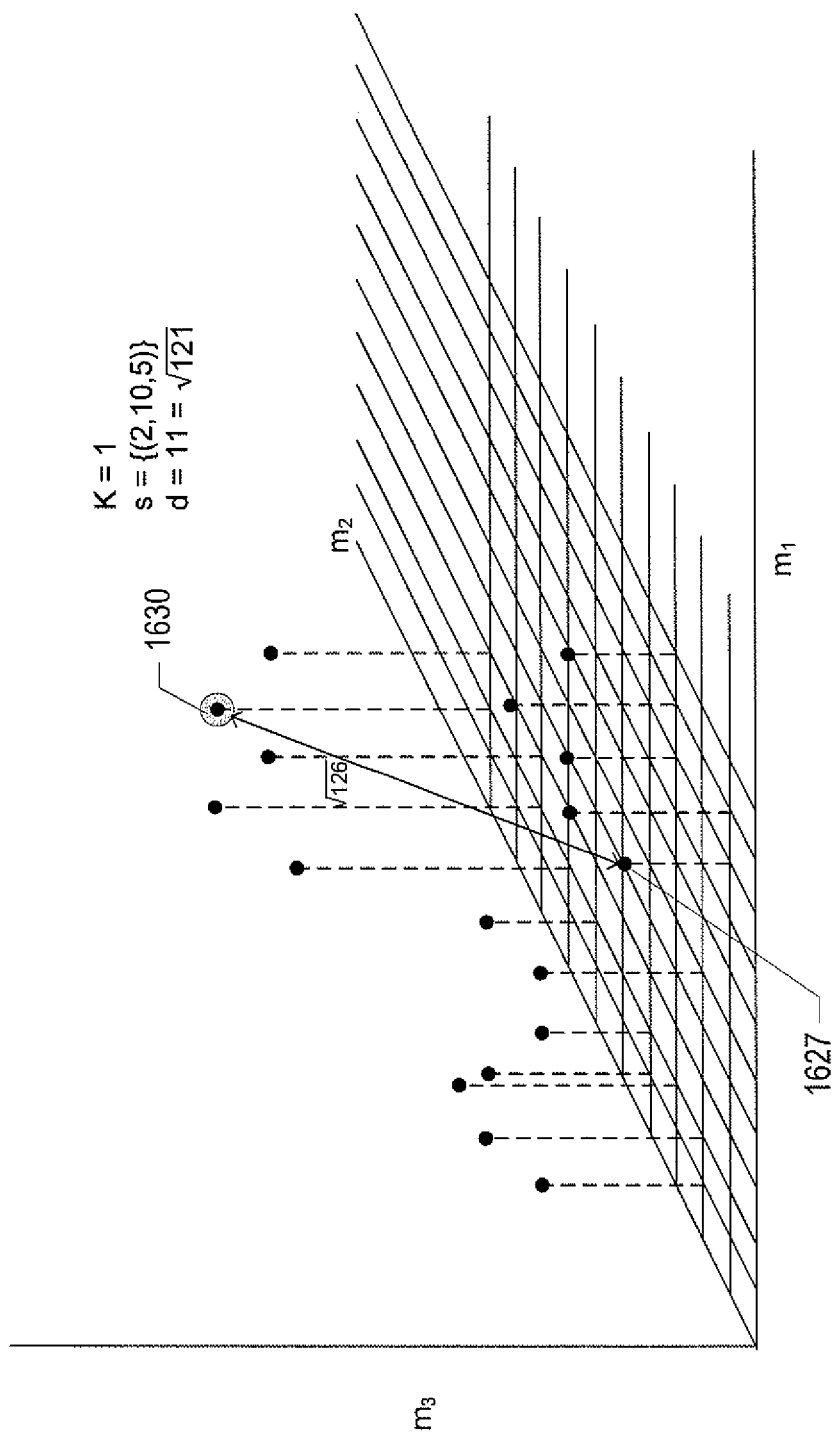

FIG. 16C, and subsequent FIGS. 16D-H, illustrate an approach to clustering the normalized multidimensional data points shown in FIG. 16B. In this clustering approach, one or more multidimensional data points are selected as cluster centers and a maximum distance is selected as a radius of a spherical volume around each center that defines the cluster volume. Multidimensional data points within a spherical volume about a cluster center are considered to belong to the cluster defined by the cluster center and cluster volume, or, equivalently, the corresponding cluster radius or diameter, while multidimensional data points outside of the spherical volume either belong to another cluster or are considered to be outliers that belong to no cluster. In one approach to clustering a multidimensional metric-data set, discussed below, a covering vector subset or covering multidimensional-data-point subset of the multidimensional metric-data set is sought. Each multidimensional data point or vector in a covering subset represents a cluster center and every multidimensional data point in the multidimensional metric-data belongs to at least one cluster. In FIG. 16C, a single multidimensional data point 1620 with coordinates (2, 8, 6) 1621 has been selected as the center of a single cluster. The radius d defining the volume of space around the center is specified as 11, or $\sqrt{121}$ (1622 in FIG. 16C). The value K 1623 is set to 1, indicating the number of clusters and the set S 1624 includes the single cluster center with coordinates (2, 8, 6) 1621. In FIG. 16C, a number of the distances between the cluster center 1620 and the most distant multidimensional data points from the cluster 1626-1629 has been computed and displayed next to line segments joining the distant multidimensional data points in the cluster center. As can be seen by these distances, all of the most distant multidimensional points from the cluster center are well within the specified radius d 1622. Thus, the parameter values K=1, S={(2, 8, 6)}, d=11 specify a covering subset S of multidimensional data points for the multidimensional metric-data set plotted in FIG. 16C. However, as shown in FIG. 16D, when a different multidimensional data point 1630 is chosen as the cluster center, while maintaining the same parameters K=1 and d=11, the parameter values K=1, S={(2, 10, 5)}, d=11 do not specify a covering subset of multidimensional data points since multidimensional data point 1627 is further from the cluster center 1630 that the distance d=11.

Figure 16E:
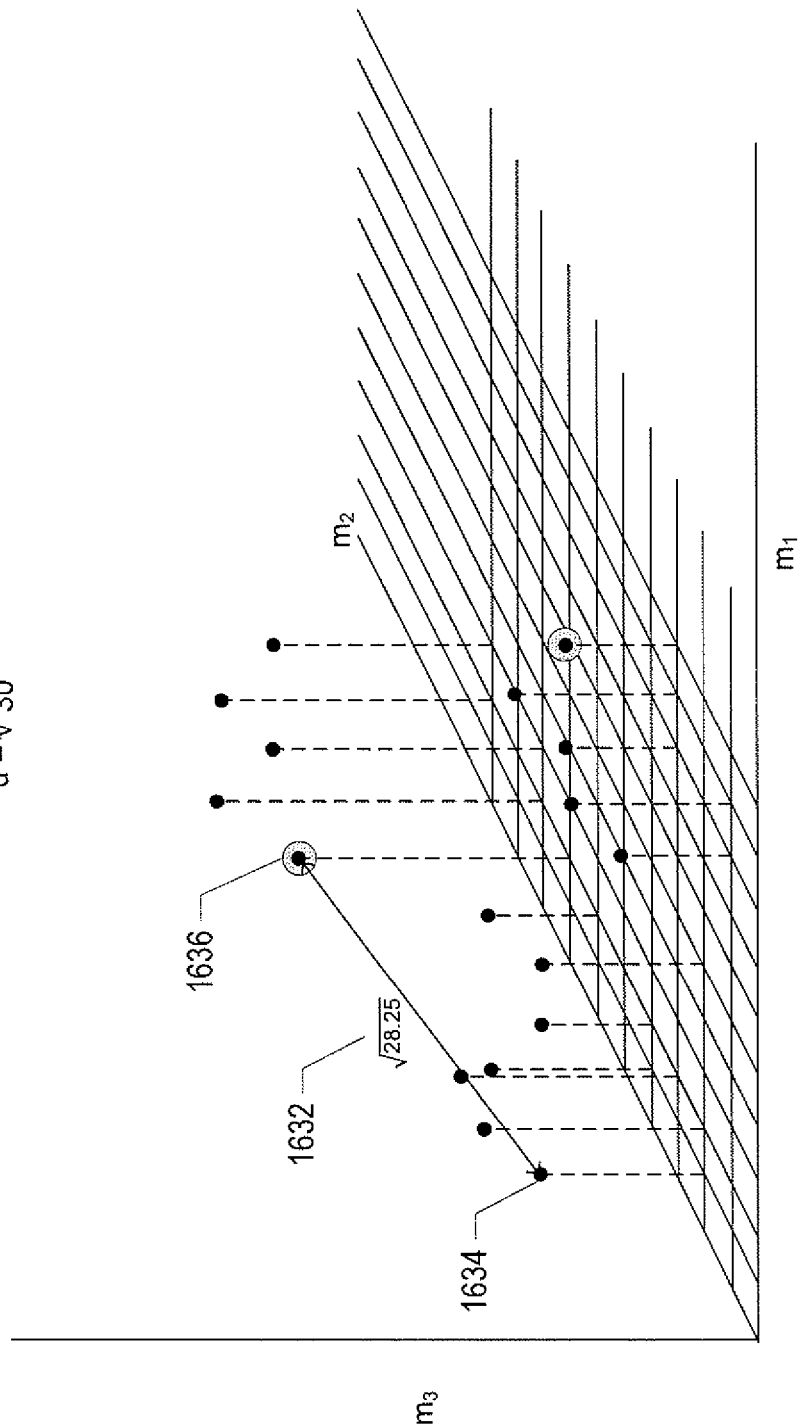
Figure 16F:
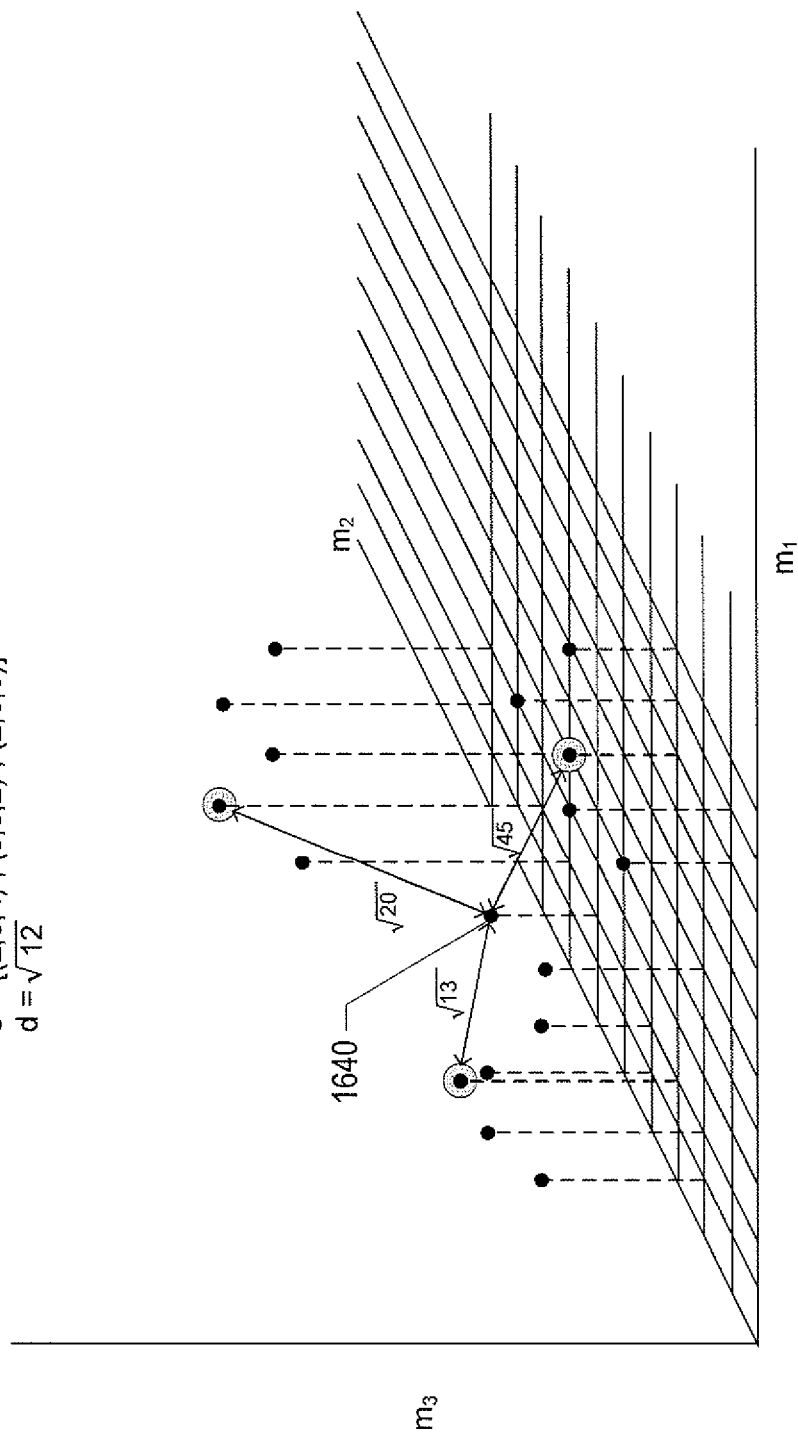
Figure 16G:
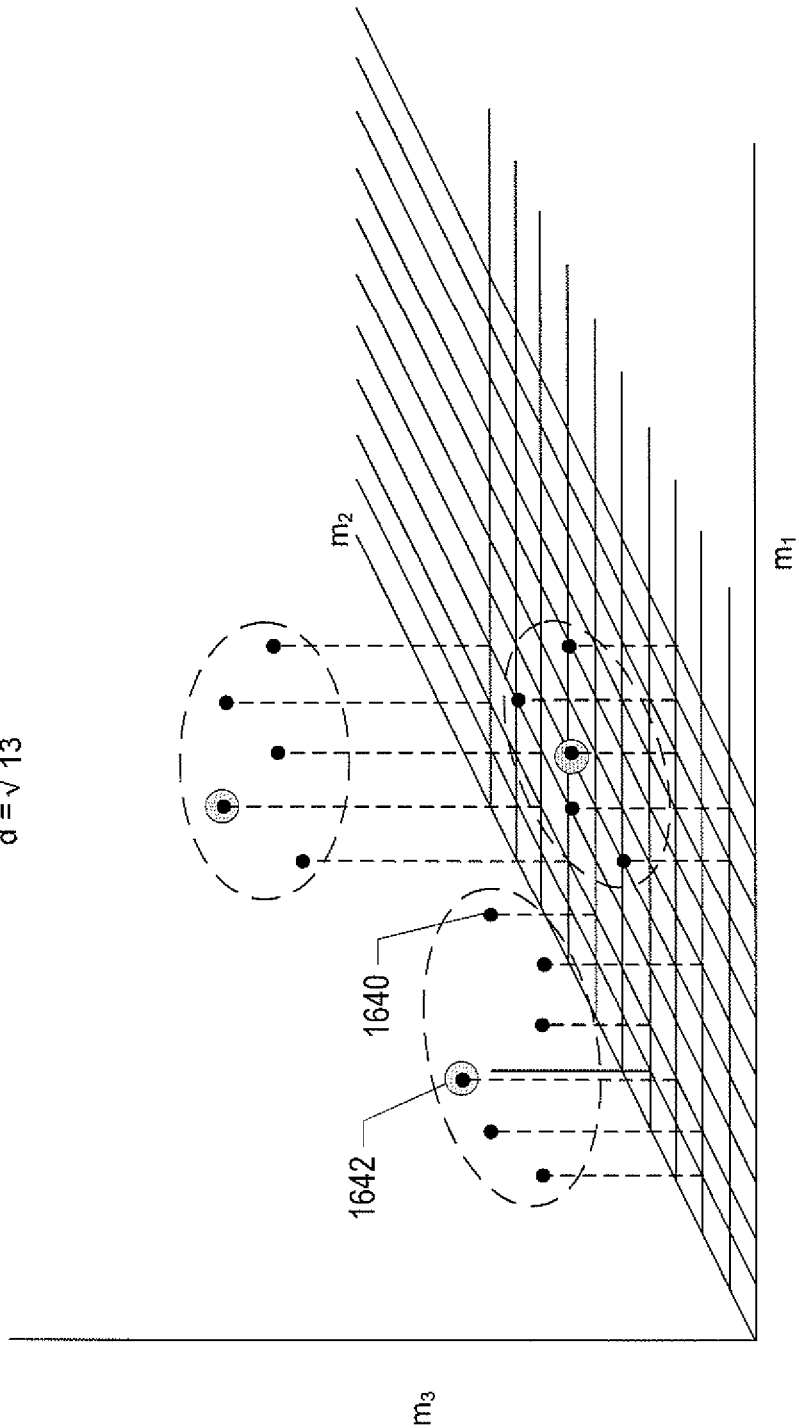
Figure 16H:
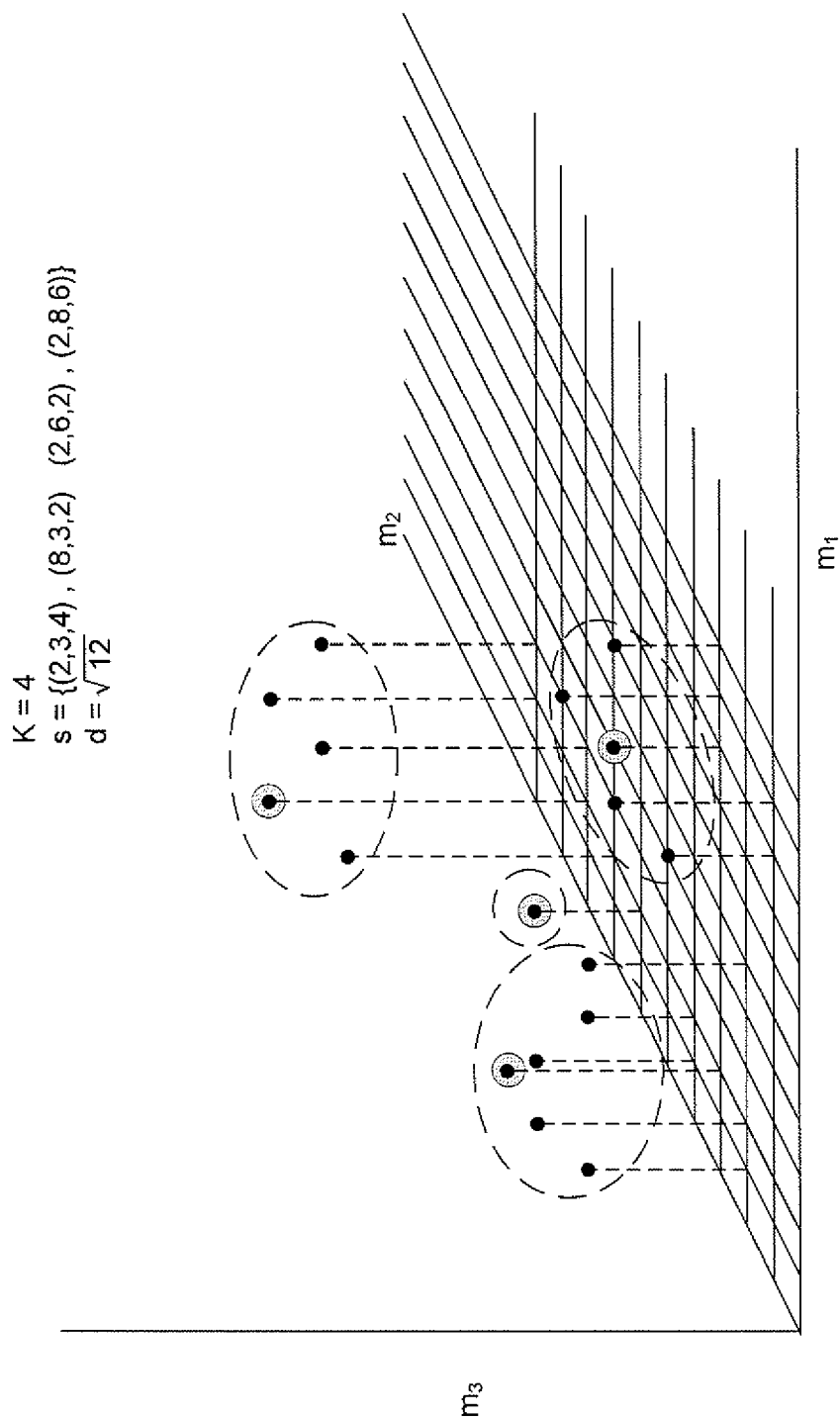

FIG. 16E illustrates a 2-multidimensional-data-point covering set with parameters values K=2, S={(2, 7, 4.5), (10, 3, 2)}, d=11. As shown by computed distance 1632, the point 1634 most distant from the first cluster center 1636 is well within the radius d. FIG. 16F illustrates that the parameters K=3, S={(2, 3, 4), (8, 3, 2), (2, 8, 6)}, d=$\sqrt{12}$ do not specify a covering subset of the multidimensional data point plotted in FIG. 16F, since data point 1640 lies at a distance of more than $\sqrt{12}$ from all 3 cluster centers. However, as shown in FIG. 16G, by slightly changing the value of the radius parameter d, the parameters K=3, S={(2, 3, 4), (8, 3, 2), (2, 8, 6)}, d=$\sqrt{13}$ do specify a covering subset of the multidimensional data point plotted in FIG. 16G. Multidimensional data point 1640, for example, lies at the farthest distance from any of the cluster centers but is within the specified radius from cluster center 1642. Finally, FIG. 16H shows that by changing the value of the parameter K rather than the parameter d, a different covering subset of multidimensional data points is found with parameter values K=4, S={(2, 3, 4), (8, 3, 2), (2, 8, 6)}, d=$\sqrt{12}$. Thus, by varying the selected cluster centers, the number of cluster centers, and the maximum distance from a cluster center for a cluster member, various different covering sets of multidimensional data points are obtained for the multidimensional data points of the multidimensional metric-data set originally plotted in FIG. 16B.

Figure 17:
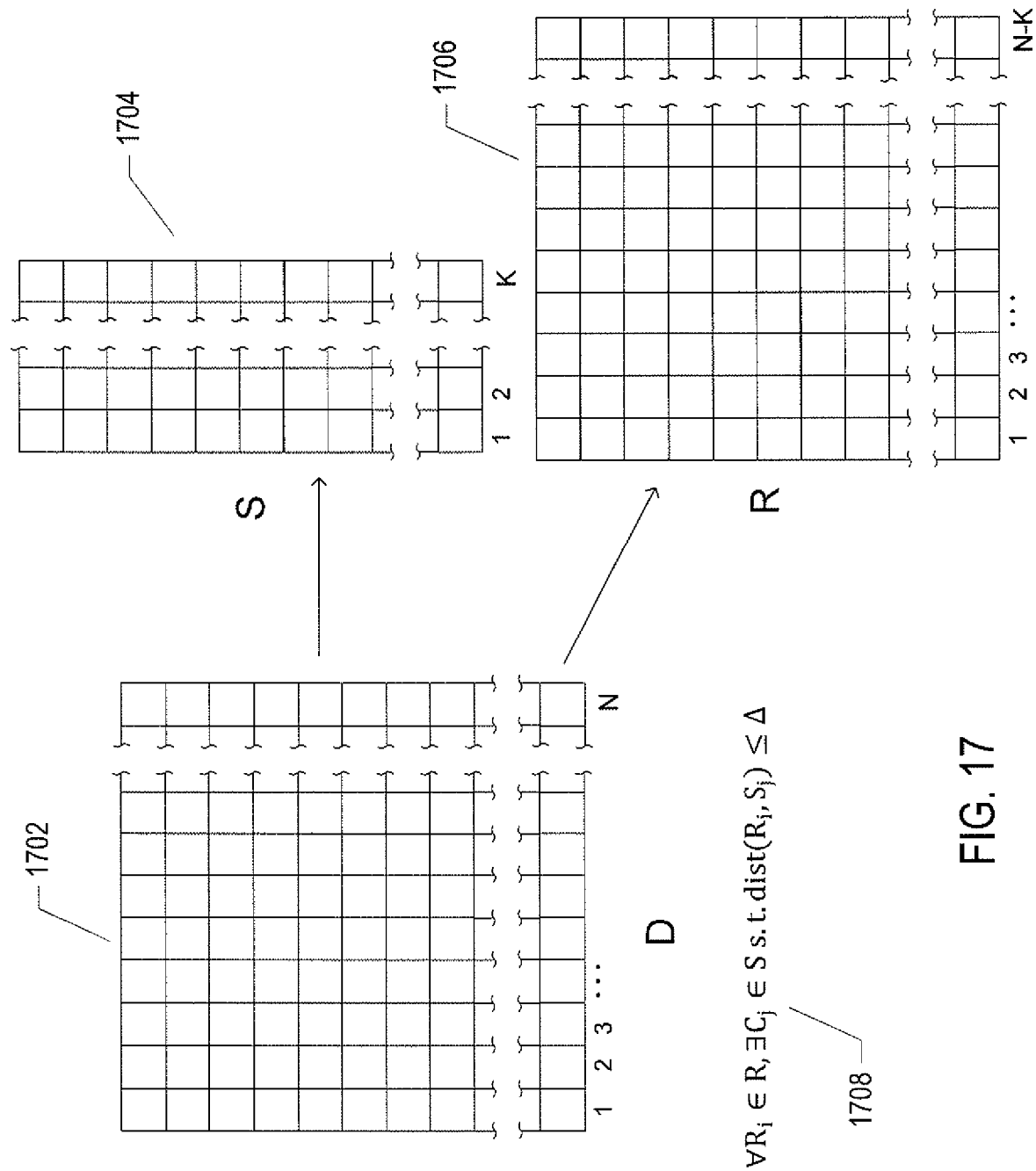
FIG. 17 summarizes clustering a multidimensional metric-data set to generate a covering subset.

FIG. 17 summarizes clustering a multidimensional metric-data set to generate a covering subset. The multidimensional metric-data set 1702 is partitioned into a covering subset S 1704 and a remaining subset 1706 so that, as represented by expression 1708, each multidimensional data point in the remaining subset R 1706 is within the specified radius $\Delta$ of at least one vector or multidimensional data point in the covering set S 1704.

Next, clustering and cluster coverage are formally described. Consider a set of single-dimension metric data points with a common timestamp, M(t), with cardinality |n|:

$$M(t)=\{m_1(t), m_2(t), \ldots, m_n(t)\}$$

The n of single-dimension metric data points can be aggregated into a multi-dimensional metric data point:

$$m(t)=(m_1(t), m_2(t), \ldots, m_n(t)) \in R^{n+1}$$

where m(t) is a multidimensional data point in an n+1-dimensional space, where one of the dimensions is time. In many cases, time can be excluded, resulting in a multi-dimensional data point $m_k$ in an n-dimensional space, where k is an index into a time-ordered series of N multi-dimensional data points:

$$M=\{m_k\}_{k=1}^N, m_k=(m_{1,k}, m_{2,k}, \ldots, m_{n,k}) \in R^n$$

An optimal clustering can be obtained using a Δ-coverage metric. Each of L clusters is defined by a multi-dimensional data point in a subset C of M:

$$C=\{m_{1,l}, m_{2,l}, \ldots, m_{n,l}\}, l=1, \ldots, L$$

For encoding purposes, the metric-data values of the data points in a cluster are all represented by a common value. The Δ-coverage metric provides an upper bound Δ for the distortion resulting from representing each data point in the set M by the metric-data value of a closest cluster-defining data point selected from the subset C. The upper bound Δ means that, for every multi-dimensional data point $m_k$ in M, there is a point $m_l$, $1 \leq l \leq L$ in C satisfying the following condition:

$$d(m_k, m_l) \leq \Delta,$$

where d( ) is a distance measure between two multi-dimensional data points. An outlier-Δ-coverage upper bound for a set M of multi-dimensional data points is defined as the Δ-coverage upper bound for the non-outlier multi-dimensional data points in the set M. The outlier multi-dimensional data points, a subset O of M with cardinality |O|, are exactly represented by their metric-data values rather than by a value common to the multi-dimensional data points in a cluster. An optimal clustering involves minimizing one or more parameters associated with clustering, including the parameters Δ, |C|=L, and |O|. For example, one type of optimal clustering involves minimizing |C| for a given upper bound Δ. Another type of optimal clustering involves minimizing |C|+x|O| for a given upper bound Δ, where x is scalar weighting factor. Another type of optimal clustering involves minimizing the upper bound Δ for a given upper bound on |C|, and still another type of optimal clustering involves minimizing |C|+yNΔ, where y is scalar weighting factor.

Figure 18A:
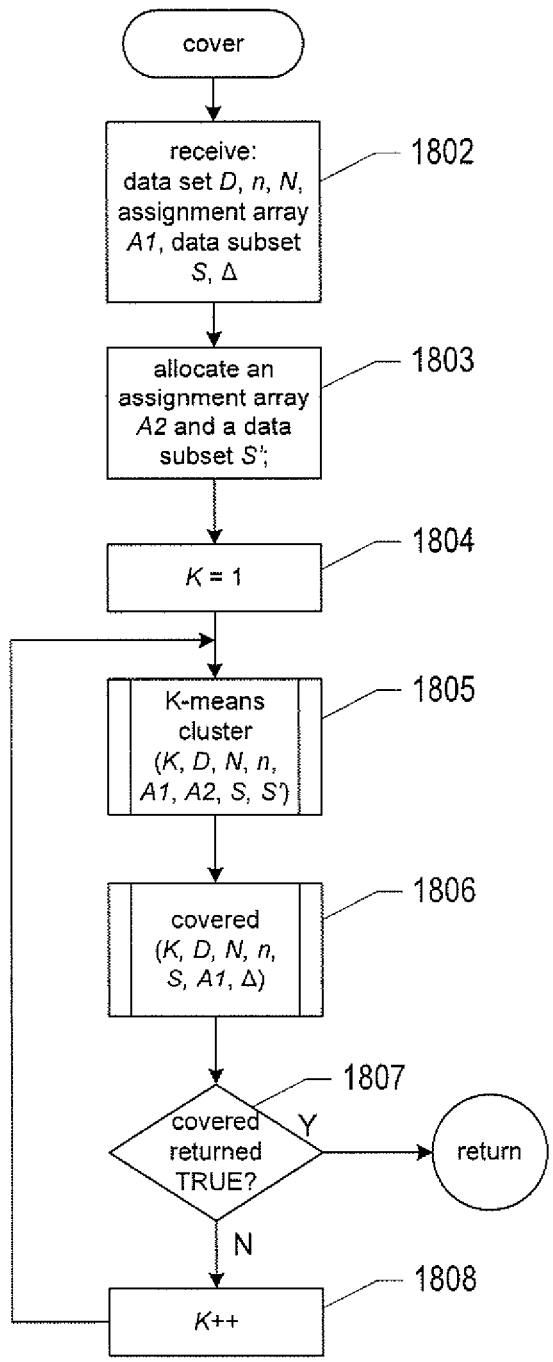
FIGS. 18A-H provide control-flow diagrams that illustrate generation of a covering set for a multidimensional metric-data set.

FIGS. 18A-H provide control-flow diagrams that illustrate generation of a covering set for a multidimensional metric-data set. FIG. 18A provides a control-flow diagram for a routine "cover," which returns the covering set with a minimal number of clusters K. In step 1802, the routine "cover" receives a reference to a multidimensional metric-data set D, a number n of multidimensional data points in in the multidimensional metric-data set D, an assignment array A1 that stores integer identifiers of clusters with which the multidimensional data points are associated when a covering subset of multidimensional data points is determined, a data subset S that stores the multidimensional data points in a covering set determined by the routine "cover," and the maximum distance Δ of a cluster member from the center of the cluster with which it is associated. In step 1803, the routine "cover" allocates a second assignment array A2 and a second data subset S'. In the loop of steps 1804-1808, the routine "cover" iteratively attempts to generate a covering set with increasing numbers of cluster centers, beginning with a single cluster center, until a covering set has been generated. Thus, the number of cluster centers K is initialized to 1 in step 1804 and is incremented, in step 1808, in preparation for each next iteration of the loop. During each iteration of the loop, the routine "cover" first calls the routine "K-means cluster," in step 1805, and then calls the routine teen "covered," in step 1806, to determine whether or not the clustering of multidimensional data points with K centers generated by the routine "K-means cluster" represents a covering subset. When a covering subset has been generated, as determined in step 1807, the routine "cover" returns, with the covering subset contained in the data subset argument S and the assignment of multidimensional data points to clusters returned in the assignment array A1. Otherwise, a next iteration of the loop of steps 1804-1808 is carried out. The loop of steps 1804-1808 is guaranteed to terminate, since, eventually, a clustering in which all multidimensional data points in the multidimensional metric-data set are cluster centers will be generated, and that clustering represents a covering subset. Note that, in the control-flow diagrams discussed in the current document, it is assumed that arguments, such as the data subset S and the assignment array A1, that are used to return results to the calling routine, are assumed to be passed by reference, as are arrays and other large data structures.

Figure 18B:
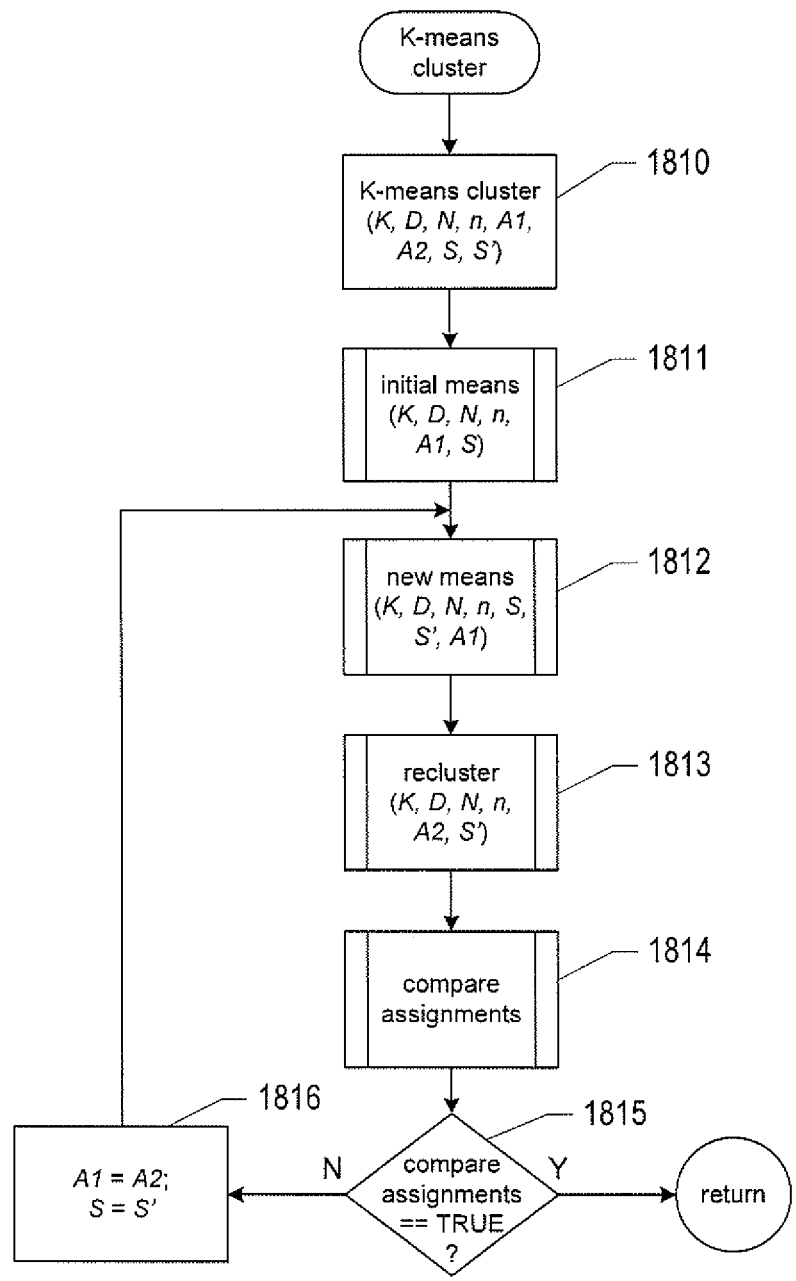

FIG. 18B provides a control-flow diagram for the routine "K-means cluster," called in step 1805 of FIG. 18A. In step 1810, the routine "K-means cluster" receives the arguments received by the routine "cover," in step 1802 of FIG. 18A, as well as references to the additional assignment array A2 and data subset S' allocated in step 1803 of FIG. 18A. In step 1811, the routine "K-means cluster" calls a routine "initial means" to select an initial set of K cluster centers from the multidimensional metric-data set. In step 1812, the routine "K-means cluster" calls a routine "new means" to select new cluster centers for the clusters defined by the previous clustering. In step 1813, the routine "K-means cluster" calls a routine "recluster," in step 1813, in order to carry out a new clustering with respect to the new cluster centers selected in step 1812. In step 1814, the routine "K-means cluster" calls a routine "compare assignments" to compare the previous cluster assignments and the assignments generated following reclustering in order to determine whether the assignments of multidimensional data points to clusters has changed. When the cluster assignments have changed, as determined in step 1815, then, in step 1816, the assignments stored in assignment array A2 are transferred to the array A1 and the data subset stored in data subset S' are transferred to data subset Sin preparation of carrying out a next iteration of steps 1812-1815. The routine "K-means cluster" thus selects an initial set of cluster centers and then iteratively readjusts those centers and reclusters the multidimensional data points until the assignments of the multidimensional data points to clusters do not change.

Figure 18C:
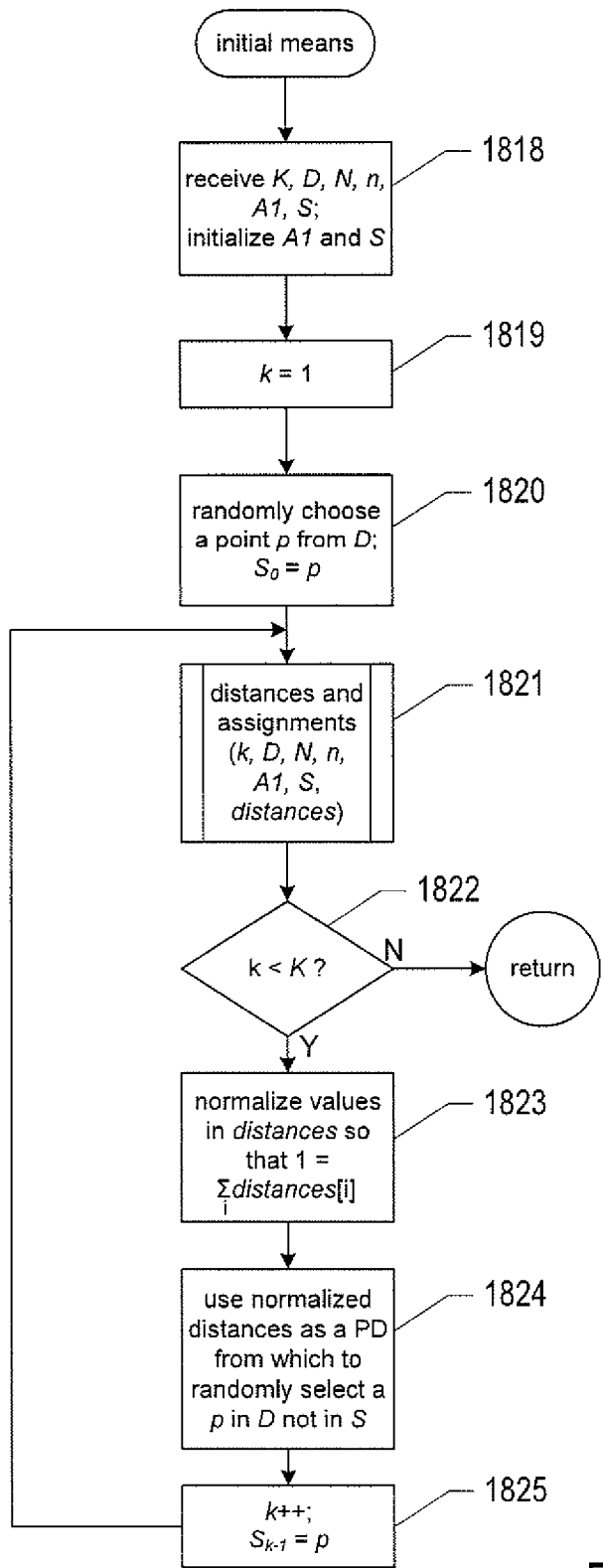

FIG. 18C provides a control-flow diagram for the routine "initial means," called in step 1811 of FIG. 18B. In step 1818, the routine "initial means" receives various of the arguments received by the routine "K-means cluster" in step 1810 of FIG. 18B. In step 1819, the local variable k is set to 1. In step 1820, the routine "initial means" randomly chooses a point p from the multidimensional metric-data set D and enters the selected data point p into the data subset S as the first entry in the data subset S. Then, in the loop of steps 1821-1825, the routine "initial means" iteratively selects K-1 additional multidimensional data points as cluster centers. In step 1821, the routine "initial means" calls the routine "distances and assignments" to determine cluster assignments for the multidimensional data points in the multidimensional metric-data set and squared distances from each multidimensional data point to its cluster center. When k is less than K, as determined in step 1822, the squared distances determined in step 1821 are normalized so that the sum of the squared distances for all the multidimensional data points is equal to 1. Then, in step 1824, is normalized squared distances are used as a probability distribution in order to randomly select a next point p that is not already in S in accordance with the probabilities associated with the multidimensional data points in the probability distribution. Thus, multidimensional data points at greater distance from the cluster center have a significantly higher probability of being selected as new centers. In step 1825, local variable k is incremented and the randomly selected data point p is added to the subset S.

Figure 18D:
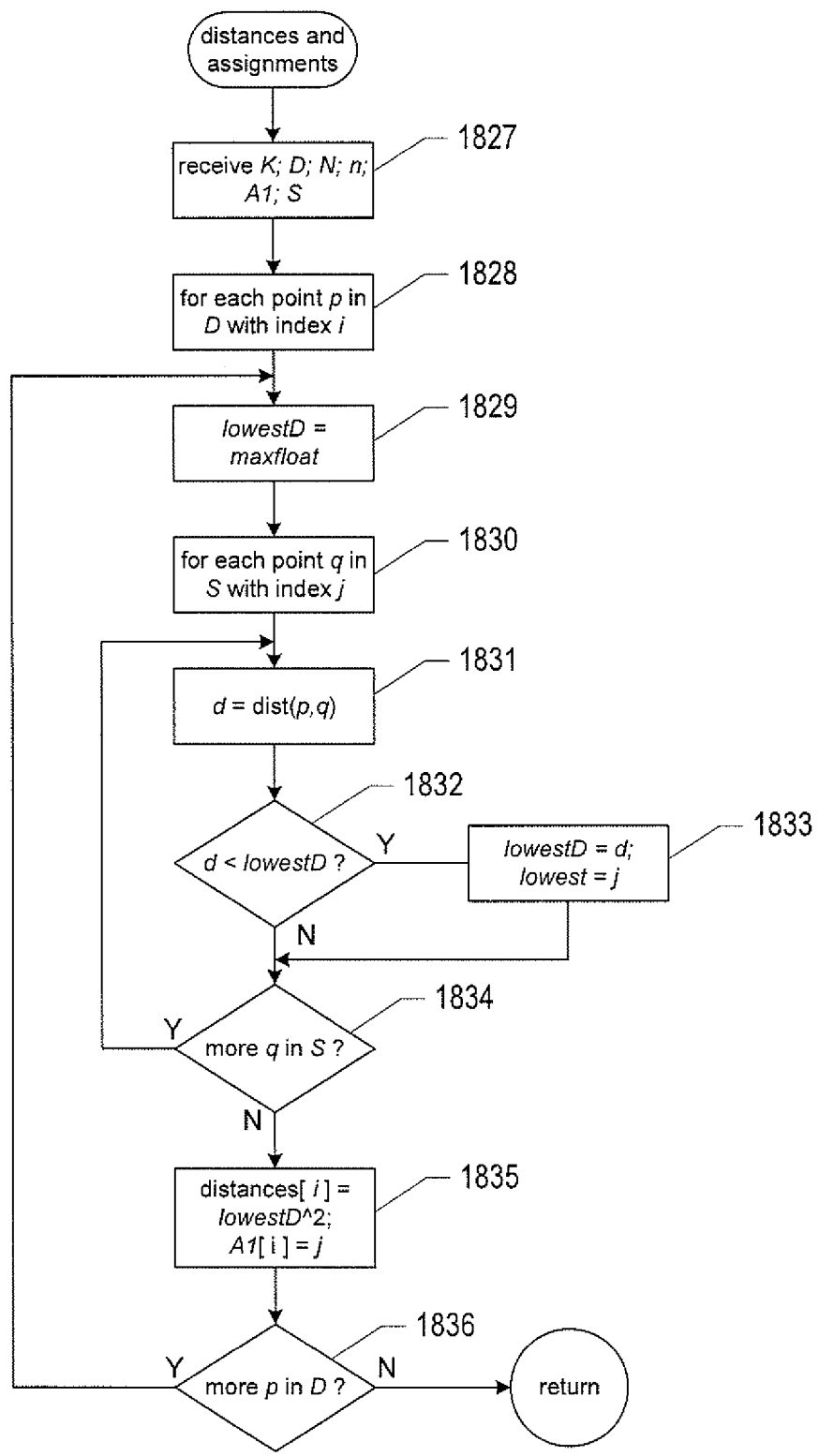

FIG. 18D provides a control-flow diagram for the routine "distances and assignments," called in step 1821 of FIG. 18C. In step 1827, various arguments received in step 1818 of FIG. 18C are received by the routine "distances and assignments." In the outer for-loop of steps 1828-1836, each multidimensional data point p in the multidimensional metric-data set D with index i is processed, where i is the column index when the multidimensional metric-data set is viewed as a two-dimensional matrix, as discussed above with reference to FIG. 15. In step 1829, the local variable lowestD is set to a large floating-point value. In the inner for-loop of steps 1830-1834, the distance d between point p and each point q in the set S is computed, in step 1831, and when the computed distance is smaller than the value currently stored in the local variable lowestD, as determined in step 1832, lowestD is set to the computed distance and the local variable lowest is set to the index j of the point q in the data subset S. Thus, in the inner for-loop of steps 1830-1834, the smallest distance between the point p and a cluster center is computed. In step 1835, the element in the array distances corresponding to point p is set to the square of the distance lowestD and the element in the assignment array A1 corresponding to point p is set to the index of the center in subset S that is closest to point p. Thus, the routine "distances and assignments" generates values for elements of the array distances containing the squared distance from each multidimensional data point and the center of the cluster to which it belongs and generates values for the assignment array A1 that indicate the cluster assignments of the multidimensional data points.

Figure 18E:
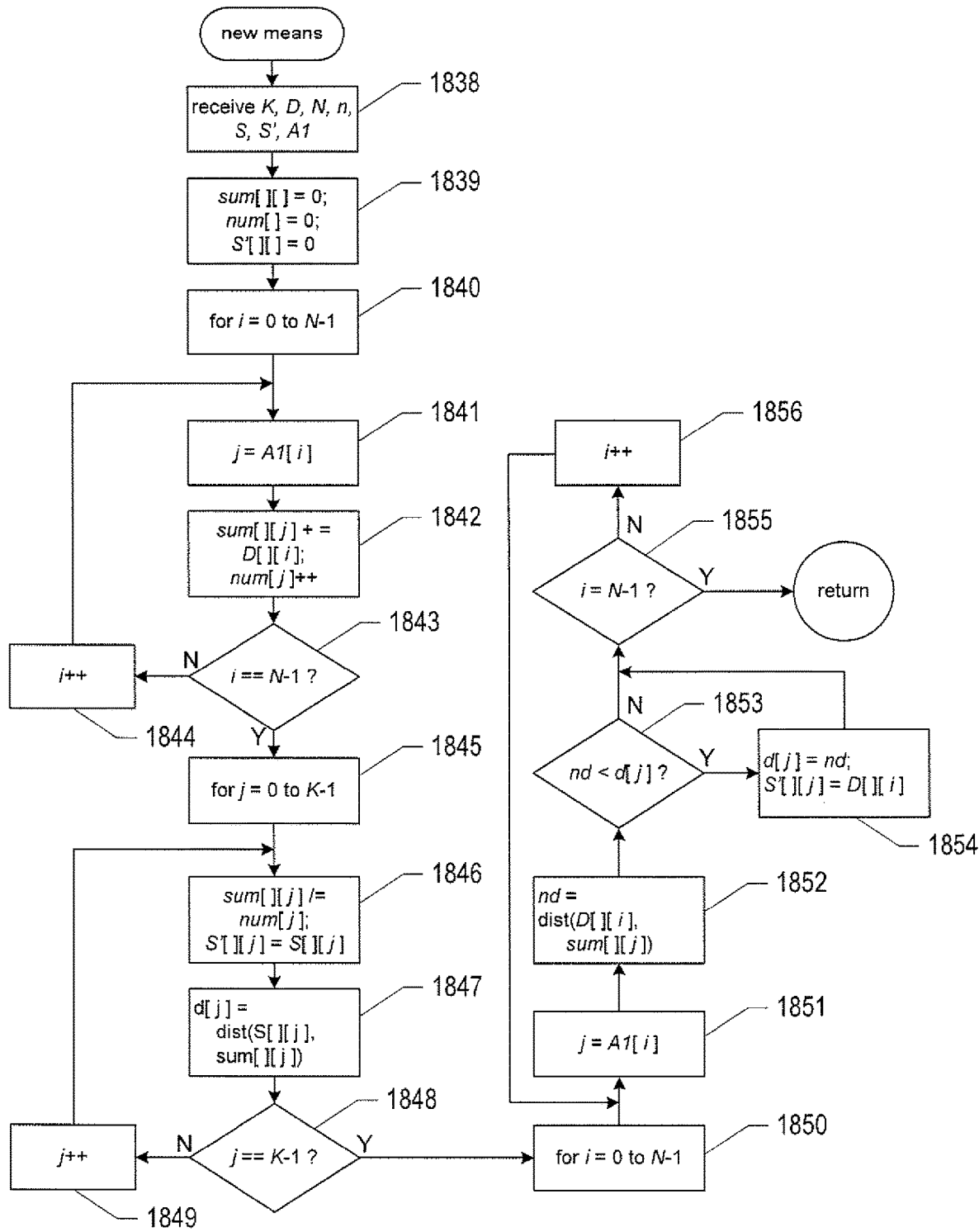

FIG. 18E shows a control-flow diagram for the routine "new means," called in step 1812 of FIG. 18B. In step 1838, arguments similar to the arguments received by previously discussed routines are received. In step 1839, a two-dimensional array sum, a one-dimensional array num, and the second data subset S' are initialized to contain all-0 entries. In the for-loop of steps 1840-1844, each multidimensional data point i is considered. In step 1841, the index j of the cluster center for the multidimensional data point is obtained from the assignment array A1. In step 1842, the multidimensional data point is added to a sum of multidimensional data points associated with the cluster and the number of multidimensional data points added to that sum for the cluster center, stored in the array num, is incremented. The sum is carried out for each of the components of the multidimensional data points. Then, in the for-loop of steps 1845-1849, the sum of multidimensional data points for each cluster is divided by the number of multidimensional data points used to compute the sum, in step 1846, and the resulting new cluster center coordinates are stored in the two-dimensional array sum. Also, the previous cluster center coordinates are copied from data subset S to data subset S' in step 1846. The multidimensional data points in data subset S' are initial candidates for new cluster centers. In step 1847, the distance between the new cluster center, coordinates for which are computed in step 1846, and the previous cluster center with index j is computed and stored in the distance array d. Then, in the for-loop of steps 1850-1866, each multidimensional data point i is again considered. In step 1851, the index j of the cluster in which the multidimensional data point resides is obtained from the assignment array A1. In step 1852, the distance nd between the multidimensional data point i and the new cluster center coordinates is computed. When the computed distance is less than the distance to the current cluster-center candidate, as determined in step 1853, the currently considered multidimensional data point i is selected as a new cluster-center candidate, in step 1854. Thus, the routine "new means" computes the centroids for each of the current clusters, in the for-loops of steps 1840-1844 and 1845-1849, and then selects a member of the cluster closest to the centroid as the new center of the cluster, in the for-loop of steps 1850-1866.

Figure 18F:
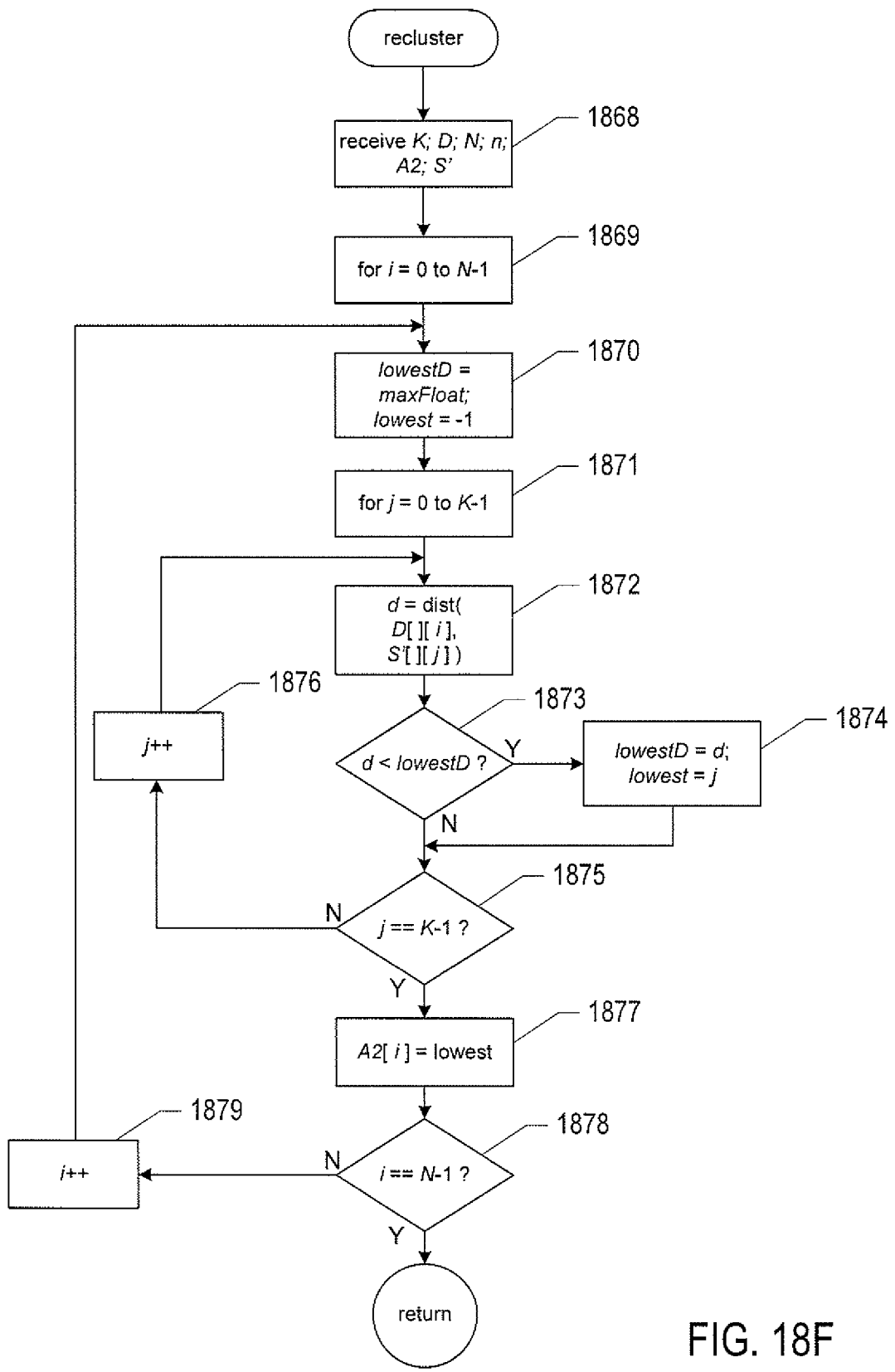

FIG. 18F provides a control-flow diagram for the routine "recluster," called in step 1813 of FIG. 18B. In step 1868, arguments received by previously discussed routines are received by the routine "recluster." Then, in the for-loop of steps 1869-1879, each multidimensional data point is considered. In step 1870, the local variable lowestD is set to a large number and a local variable lowest is set to the value −1. In the inner for-loop of steps 1871-1876, each cluster center in the data subset S' is considered. In step 1872, the distance between the currently considered multidimensional data point and the currently considered cluster center is computed. When the computed distance is lower than the value stored in the local variable lowestD, as determined in step 1873, the local variable lowestD is set to the computed distance and the local variable lowest is set to the index of the currently considered cluster center in step 1874. In step 1877, the element of the assignment array A2 corresponding to the currently considered multidimensional data point is set to the index of the cluster center for the cluster to which the multidimensional data point is now assigned.

Figure 18G:
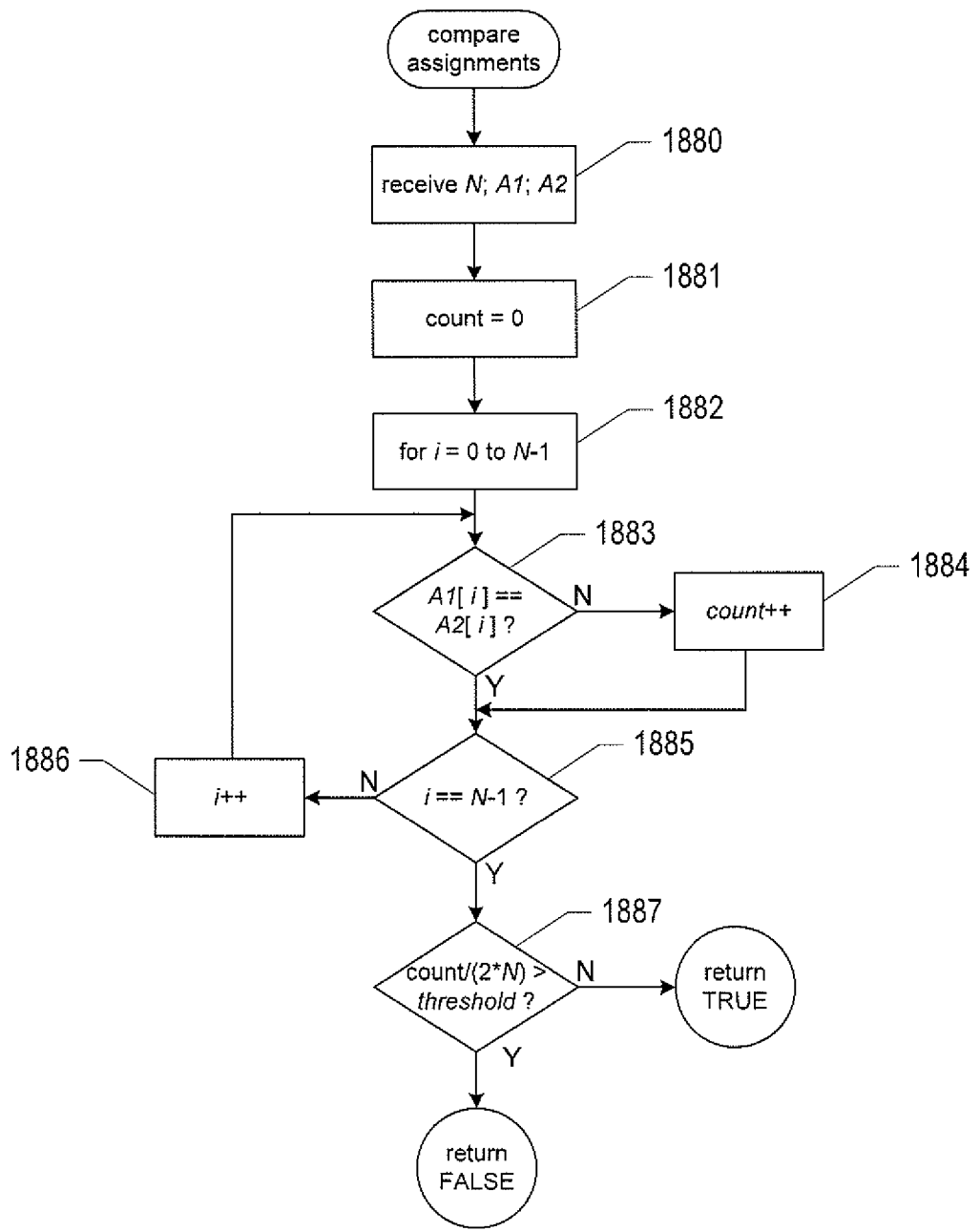

FIG. 18G provides a control-flow diagram for the routine "compare assignments," called in step 1814 of FIG. 18B. In step 1880, the routine "compare assignments" receives the arguments N, the number of multidimensional data points in the multidimensional metric-data set, and A1 and A2, references to the two assignment arrays. In step 1881, the local variable count is set to 0. In the for-loop of steps 1882-1886, the number of entries in the assignment arrays that do not match is counted. When the value stored in count divided by 2 times the number of multidimensional data points exceeds a threshold value, as determined in step 1887, the routine "compare assignments" returns the Boolean value FALSE. Otherwise, the routine "compare assignments" returns the Boolean value TRUE.

Figure 18H:
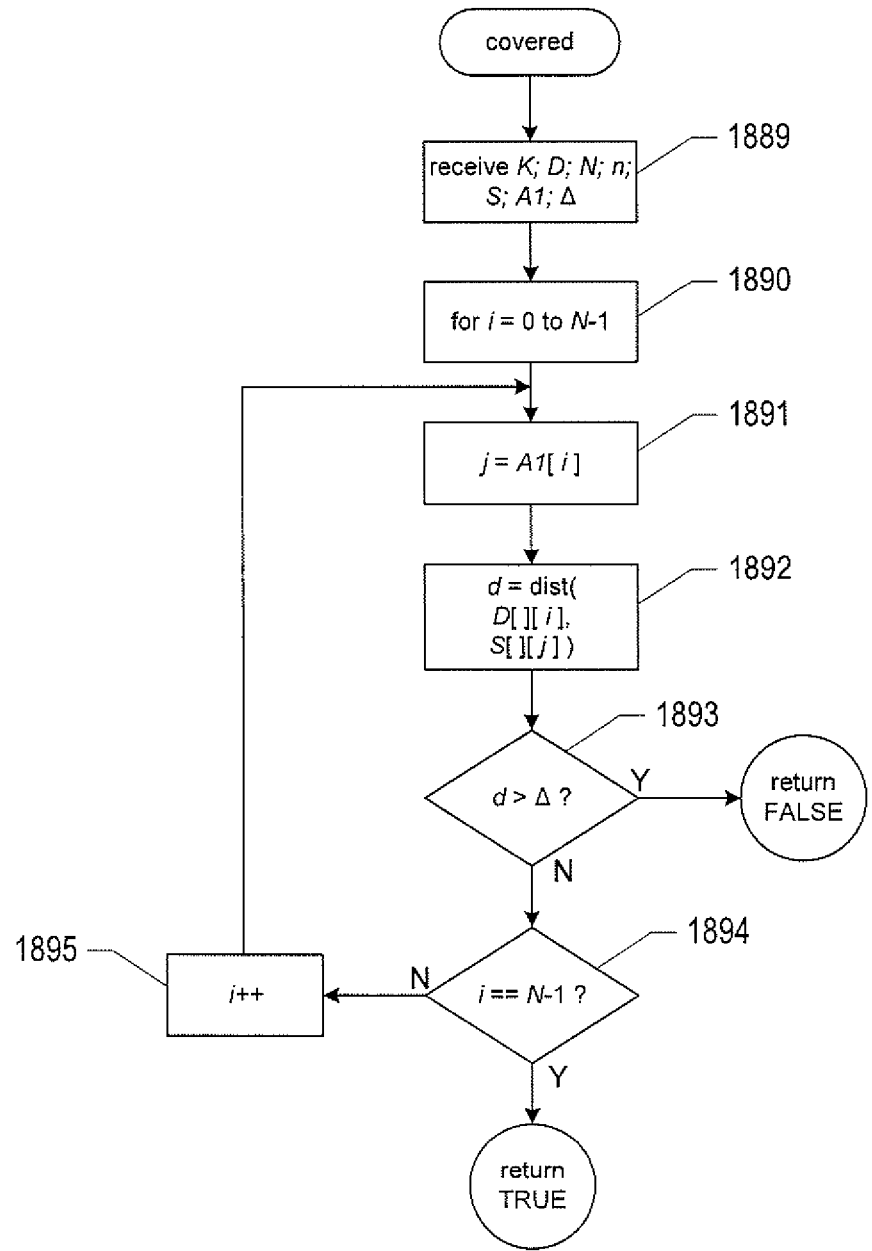

FIG. 18H provides a control-flow diagram for the routine "covered," called in step 1806 of FIG. 18A. In step 1889, the routine "covered" receives various arguments received by previously discussed routines. Then, in the for-loop of steps 1890-1895, the routine "covered" loops are all of the multidimensional data points and computes the distance between each multidimensional data point and its corresponding cluster center. When that distance exceeds the maximum specified distance Δ, as determined in step 1893, the routine "covered" returns false. Otherwise, when all of the multidimensional data points are within the maximum specified distance of their corresponding cluster centers, the routine "covered" returns a true value.

Figure 19A:
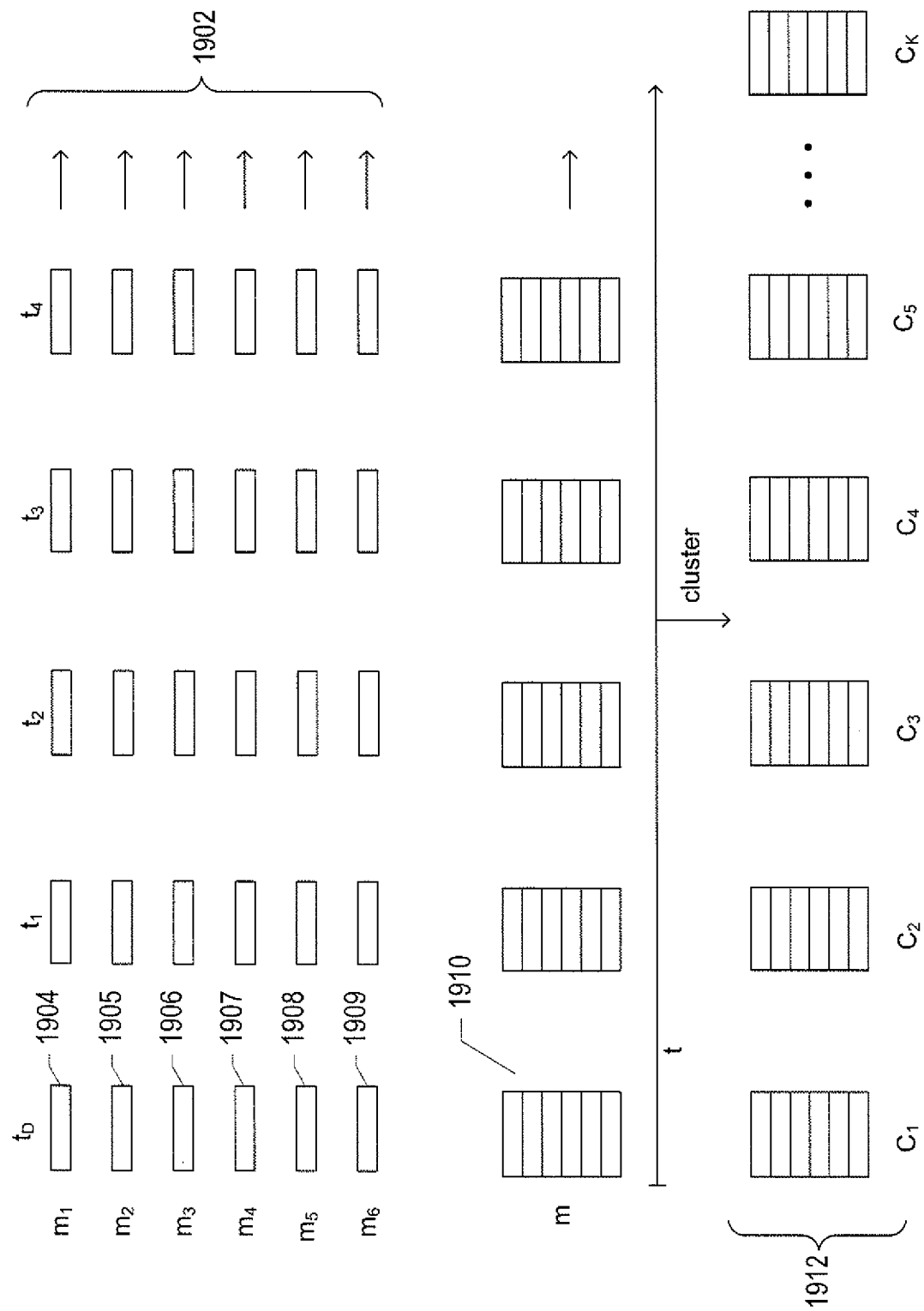
FIGS. 19A-D illustrate the use of a covering set for a multidimensional metric-data set to compress a multidimensional metric-data set for storage within a distributed computing system.
Figure 19B:
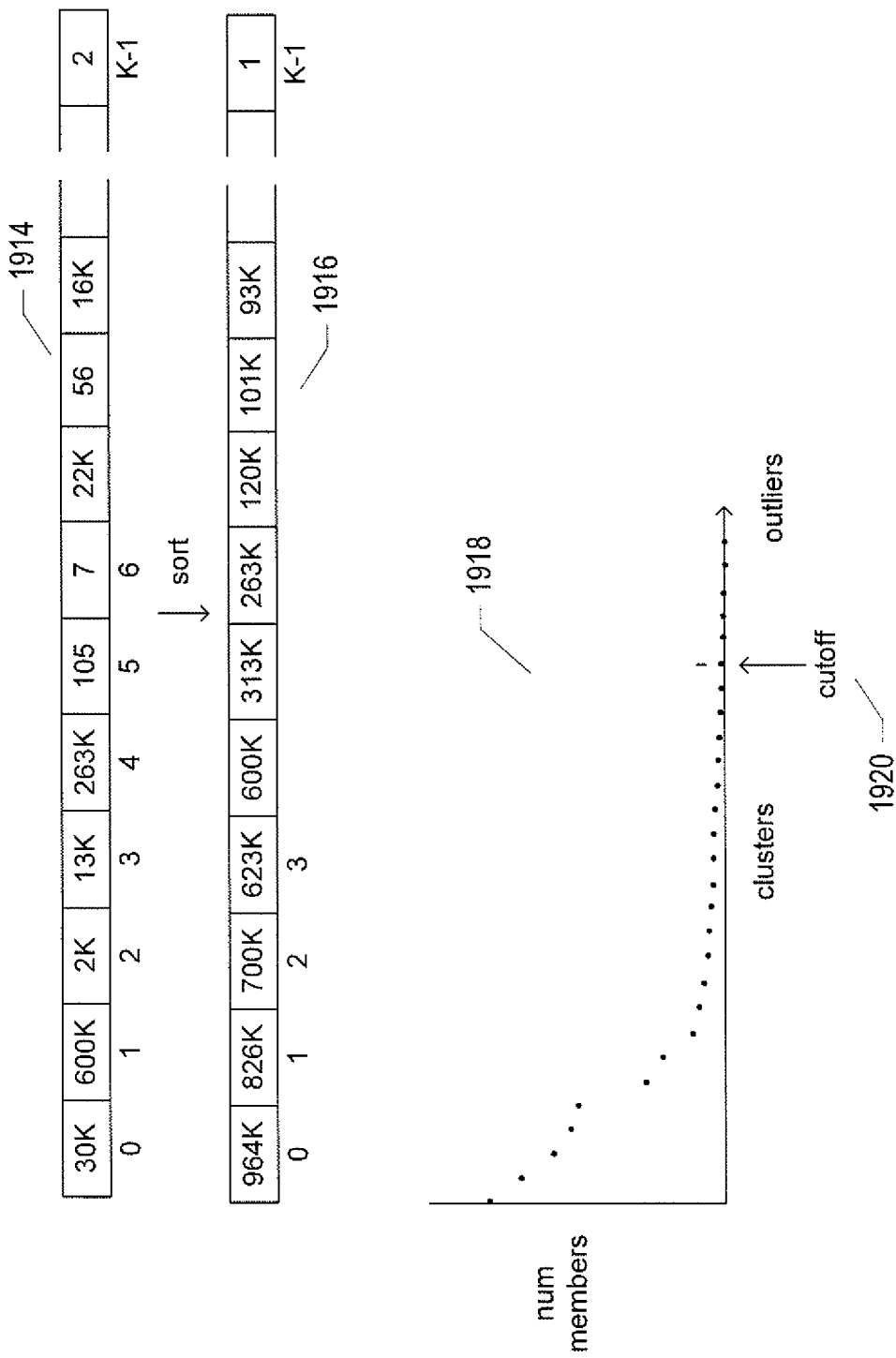
Figure 19C:
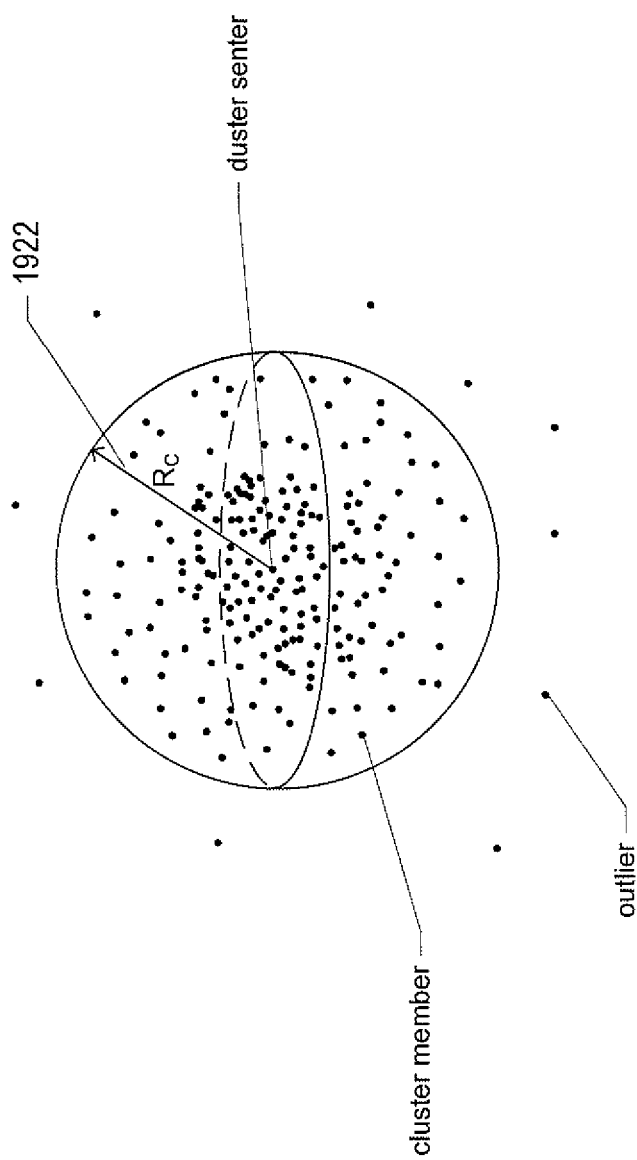

FIGS. 19A-D illustrate the use of a covering set for a multidimensional metric-data set to compress a multidimensional metric-data set for storage within a distributed computing system. As previously discussed with reference to FIGS. 14-15, a set of metric-data sets 1902 is selected for generation of a multidimensional metric-data set. The timestamp/metric-data-value pairs in the set of metric-data sets 1902 may be time shifted, as discussed above, in order to temporarily align the timestamp/metric-data-value pairs. Then, each temporarily aligned column of data values in the set of metric-data sets is considered to be a multidimensional data point in the multidimensional metric-data set. For example, values 1904-1909 together comprise the components of the multidimensional-metric-data-set point or vector 1910. As discussed above with reference to FIGS. 17-18, the multidimensional data points of the multidimensional metric-data set are clustered in order to obtain a set of cluster centers, or covering subset 1912. As shown in FIG. 19B, the number of members of each of the clusters corresponding to the cluster centers in the covering subset is computed and stored in an array 1914 indexed by cluster-center number. This array is then sorted to produce a sorted array 1916. The sorted numbers of cluster members are plotted in plot 1918. A cutoff value 1920 is determined for the number of members of a cluster, with multidimensional data points in any clusters with member numbers lower than the cutoff value considered to be outlier multidimensional data points. In other words, only the cutoff number of clusters are used for data compression. The cutoff number may be determined to coincide with a desired number of bits or bytes needed to encode cluster identifiers, which, in turn, partly determines the cluster-encoding compression ratio. Furthermore, as shown in FIG. 19C, a cluster-volume-specifying radius 1922 different from the parameter $\Delta$ may be selected to differentiate outlier multidimensional data points from inlier multidimensional data points. When an approach based on a cluster-volume-specifying radius is used, the values of the cluster-volume-specifying radius and the parameter $\Delta$ may be adjusted to allow a smaller number of clusters to form a covering set for a given multidimensional metric-data set. Consider again the example shown in FIGS. 16F-H. The three data points selected as centers in FIG. 16F do not form a covering set, because data point 1640 is not within a distance $\sqrt{12}$ to any of the three centers. However, by adding a fourth center, data point 1640, as shown in FIG. 16H, a covering set is produced. Alternatively, as shown in FIG. 16G, a covering set is obtained by increasing the value of parameter $\Delta$ to $\sqrt{13}$. Another approach is to expand the cluster-volume radius of the center corresponding to data point 1642 to $\sqrt{13}$, while leaving the value of parameter $\Delta$ and the cluster-volume radii of the other centers at $\sqrt{12}$. In this approach, the three centers shown in FIG. 16F become a covering set, since data point 1642 is now within the cluster-volume radius of center data point 1642. Cluster-volume-specifying radii may be selected from a plot of the decrease in multidimensional-data-point density with increasing distance from the cluster center or may be based on a threshold percentage of final cluster members to initial cluster members. This approach is particularly useful during continuous compression metric data by metric-data-collection-and-storage applications. Each cluster may be associated with a cluster-specific cluster-volume-specifying radius that can be continuously tuned to adjust the ratio of outliers to inliers.

Figure 19D:
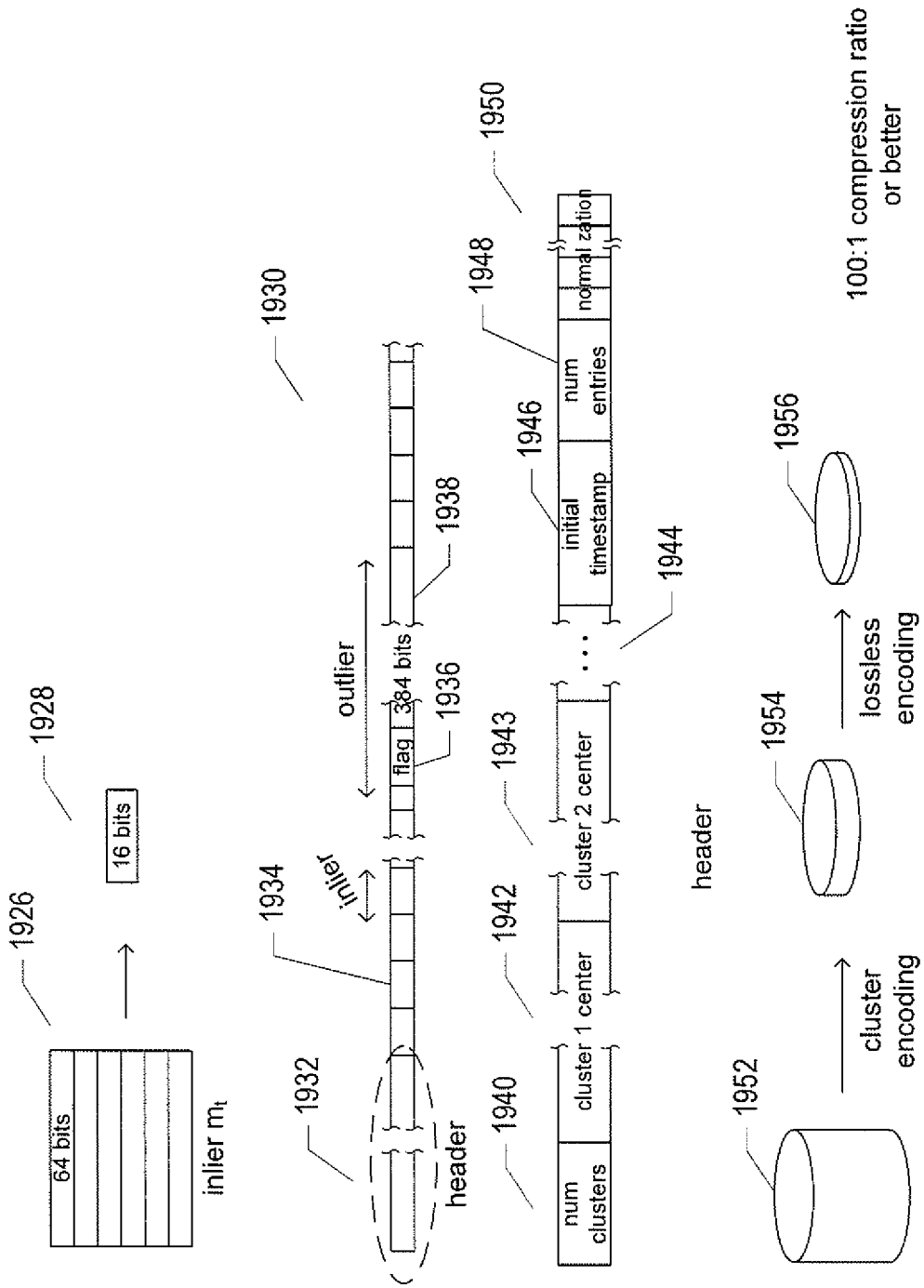

FIG. 19D illustrates one approach to compressing multidimensional metric data for storage by the metric-data-collection-and-storage applications. An inlier multidimensional data point 1926 generated from n metric-data-set values, initially represented by n 64-bit floating-point values, is more efficiently represented by, for example, a 16-bit integer 1928 that identifies the cluster to which the inlier multidimensional data point belongs. A 16-bit cluster identifier allows for 65,534 clusters as well as null-entry and outlier-flag identifiers, discussed below, for certain cluster-encoding methods. Because the cover set ensures that each member of a cluster is within a specified distance of the cluster center, the distortion produced by representing all the members of the cluster by the central data point of the cluster does not exceed, for each represented multidimensional data point, a distortion corresponding to the maximum specified distance $\Delta$ or the cluster-specific radius (1922 in FIG. 19C). Outlier multidimensional data points are represented exactly by n component float values. A file containing compressed multidimensional metric data 1930 includes, in one implementation, a header 1932 followed by integers, such as integer 1934, representing inlier multidimensional data points and representations of outlier multidimensional data points that each includes a flag integer 1936 followed by n 64-bit floating-point values 1938. In one implementation, the header 1932 includes an indication of the number of clusters 1940, the n floating-point-value representations of each cluster center 1942-1943, with the ellipses 1944 indicating additional cluster centers, a timestamp 1946 for the initial multidimensional data point in the encoded multidimensional metric-data set, an indication of the number of multidimensional data points in the multidimensional metric-data set 1948, and one or more normalization factors 1950 when the multidimensional data points are normalized. Thus, the clustering-based representation of inlier multidimensional data points is a lossy compression, referred to as "cluster encoding," and provides compression ratios on the order of 20:1, depending on the percentage of outlier multidimensional data points and the number of clusters. As shown in the lower portion of FIG. 19D, the raw multidimensional metric-data set 1952 is first cluster encoded to produce a cluster-encoded data set 1954. The cluster-encoded data set is further compressed using lossless compression, such as Huffman encoding, ran-length encoding, and other types of lossless encoding to produce a final fully compressed multidimensional metric-data set 1956. The overall compression ratio may be 100:1 or better, depending on the distribution of multidimensional metric data, the percentage of outliers, and the particular types of lossless compression employed. In alternative implementations, outlier multidimensional data points may be compressed by using 32-bit component representations rather than 64-bit representations.

Figure 20A:
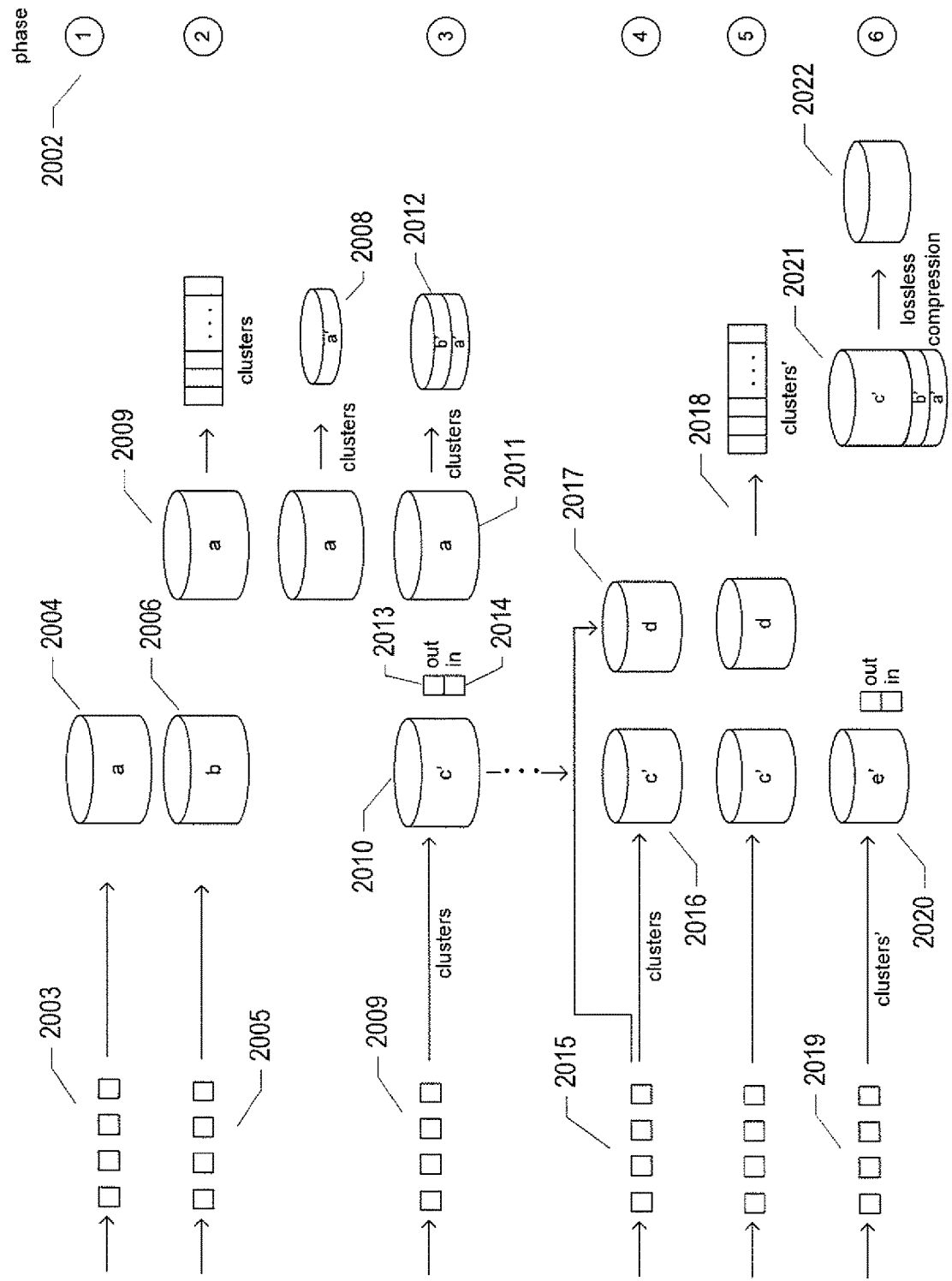
FIGS. 20A-F illustrates one implementation of a metric-data collection-and-storage subsystem within a distributed computing system that collects, compresses, and stores a multidimensional metric-data set for subsequent analysis and use in monitoring, managing, and administrating the distributed computing system.

FIGS. 20A-F illustrates one implementation of a metric-data collection-and-storage subsystem within a distributed computing system that collects, compresses, and stores a multidimensional metric-data set for subsequent analysis and use in monitoring, managing, and administrating the distributed computing system. FIG. 20A illustrates, at a high-level, various phases of data collection, compression, and storage for a multidimensional metric-data set. In FIG. 20A, phases are indicated by circled integers at the right-hand edge of the figure, such as the circled integer "1" 2002 indicating the first phase of multidimensional metric-data set collection, compression, and storage. During the first phase, multidimensional data points 2003 are received and stored 2004 without compression. In a second phase, when a sufficient number of multidimensional data points have been collected to undertake generation of covering set, received multidimensional data points 2005 are stored in a second container 2006 while clustering and covering-set generation is carried out on the initially stored multidimensional data points 2007. Once a covering set has been generated, the initially stored multidimensional data points are compressed via clustering to Ruin a cluster-compressed initial set of multidimensional data points 2008. In a third phase, once continuous clustering compression is possible, subsequently received multidimensional data points 2009 are continuously cluster compressed for initial storage 2010 while, concurrently, the remaining uncompressed multidimensional data points 2011 are cluster compressed 2012.During continuous cluster compression, the subsystem keeps track of the number of outlier multidimensional data points 2013 and the number of inlier multidimensional data points 2014. When the ratio of outlier multidimensional data points to inlier multidimensional data points increases above a threshold value, a fourth phase is entered in which subsequently received multidimensional data points 2015 continue to be cluster compressed and stored 2016 but are also stored without compression in a separate container 2017. This dual storage continues until a sufficient number of new multidimensional data points have been received to undertake reclustering, in a fifth phase 2018. Once reclustering is finished, subsequently received multidimensional data points 2019 are cluster compressed according to the new clustering 2020 while all of the multidimensional data points clustered according to the previous clustering 2021 are additionally compressed by a lossless compression method to generate a container 2022 containing fully compressed multidimensional data points. Phase 6 continues until the ratio of outliers to inliers rises above the threshold value, when the subsystem transitions again to phase four. The process produces a series of containers containing fully compressed multidimensional data points for a multidimensional metric-data set. Of course, the process can be concurrently carried out for multiple multidimensional metric-data sets by a data collection, compression, and storage subsystem.

Figure 20B:
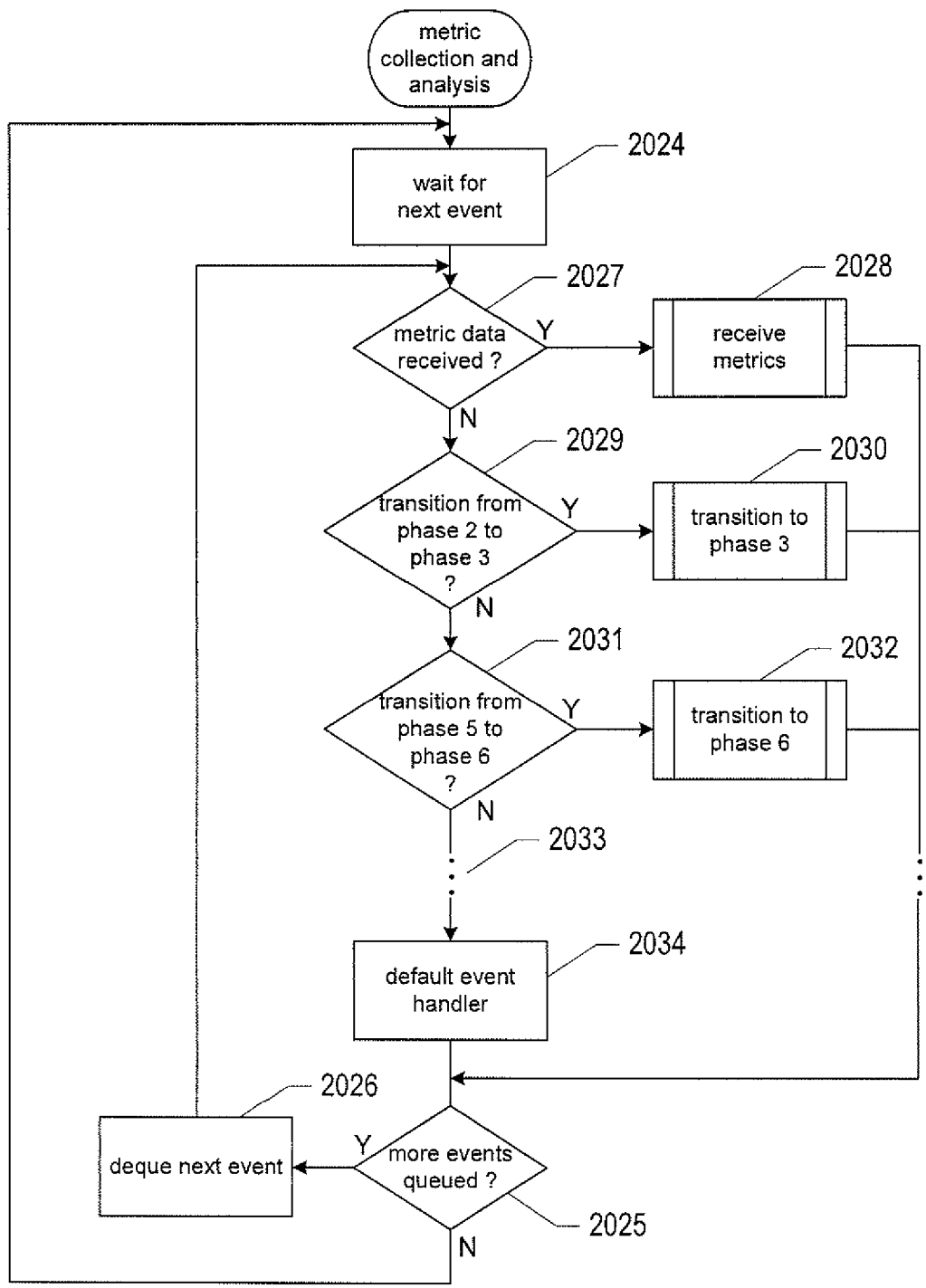

FIG. 20B illustrates an event-handling loop within the metric-data collection-and-storage subsystem. The metric-data collection-and-storage subsystem continuously waits for a next event to occur, in step 2024 and, when a next event occurs, carries out a determination of the event type in order to handle the event. Once the event has been handled, and when there are more events queued for handling, as determined in step 2025, a next event is dequeued, in step 2026, and the event handling process continues. Otherwise, control flows to step 2024 where the metric-data collection-and-storage subsystem waits for a next event. When the currently considered event is a metric-data-received event, as determined in step 2027, a "receive metrics" handler is called, in step 2028, to handle reception of the metric data. When the next occurring event is a phase-2-to-phase-3 transition event, as determined in step 2029, then a "transition to phase 3" handler is called, in step 2030. When the currently considered event is a transition-from-phase-5-to-phase-6 event, as determined in step 2031, a "transition to phase 6" handler is called, in step 2032. Ellipses 2033 indicate that many different additional types of events are handled by the event loop illustrated in FIG. 20B. A default handler 2034 handles rare and unexpected events.

Figure 20C:
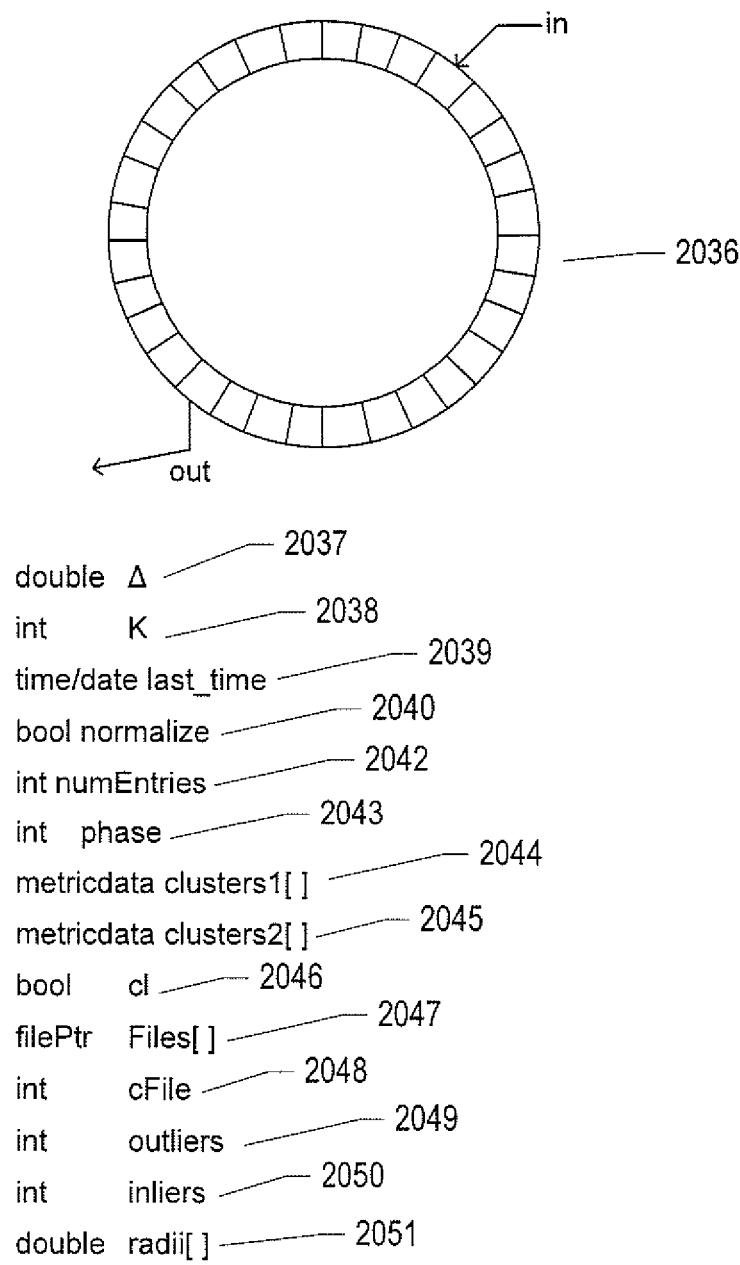

FIG. 20C illustrates various variables and data structures employed in the subsequently described implementation of the "receive metrics" handler called in step 2028 of FIG. 20B. Received metric data is initially stored in a circular buffer 2036 within the metric-data collection-and-storage subsystem, and a "metric data received" event is generated when new metric data is queued to the queue. In this implementation, any temporal aligning of metric-data sets and combining of metric-data sets is carried out at a lower level, prior to queuing of metric data to the input queue. The variable $\Delta$ 2037 stores the maximum distance of a cluster member to a cluster center, discussed above. The variable K 2038 stores the number of clusters and cluster centers of a covering set. The variable last_time 2039 indicates the timestamp of the last received multidimensional metric data point. The variable normalized 2040 indicates whether or not normalization is being carried out on the multidimensional metric data points. The variable numEntries 2042 indicates the number of entries or multidimensional data points that have been received for compression and storage. The variable phase 2043 indicates the current phase of metric-data reception, compression, and storage, discussed above with reference to FIG. 20A. The arrays clusters1 and clusters2 2044-2045 contain the cluster centers for two different clusterings. The variable cl 2046 indicates which of the two arrays clusters1 and clusters2 is currently being used. The array Files 2047 contains file pointers for various containers currently being used to store uncompressed, cluster compressed, and fully compressed multidimensional metric data points. The integer cFile 2048 is an index into files array. The integers outliers 2049 and inliers 2050 store the number of outliers and inliers that have been received during streaming compression. The array radii 2051 stores the cluster-specific radius for each cluster.

Figure 20D:
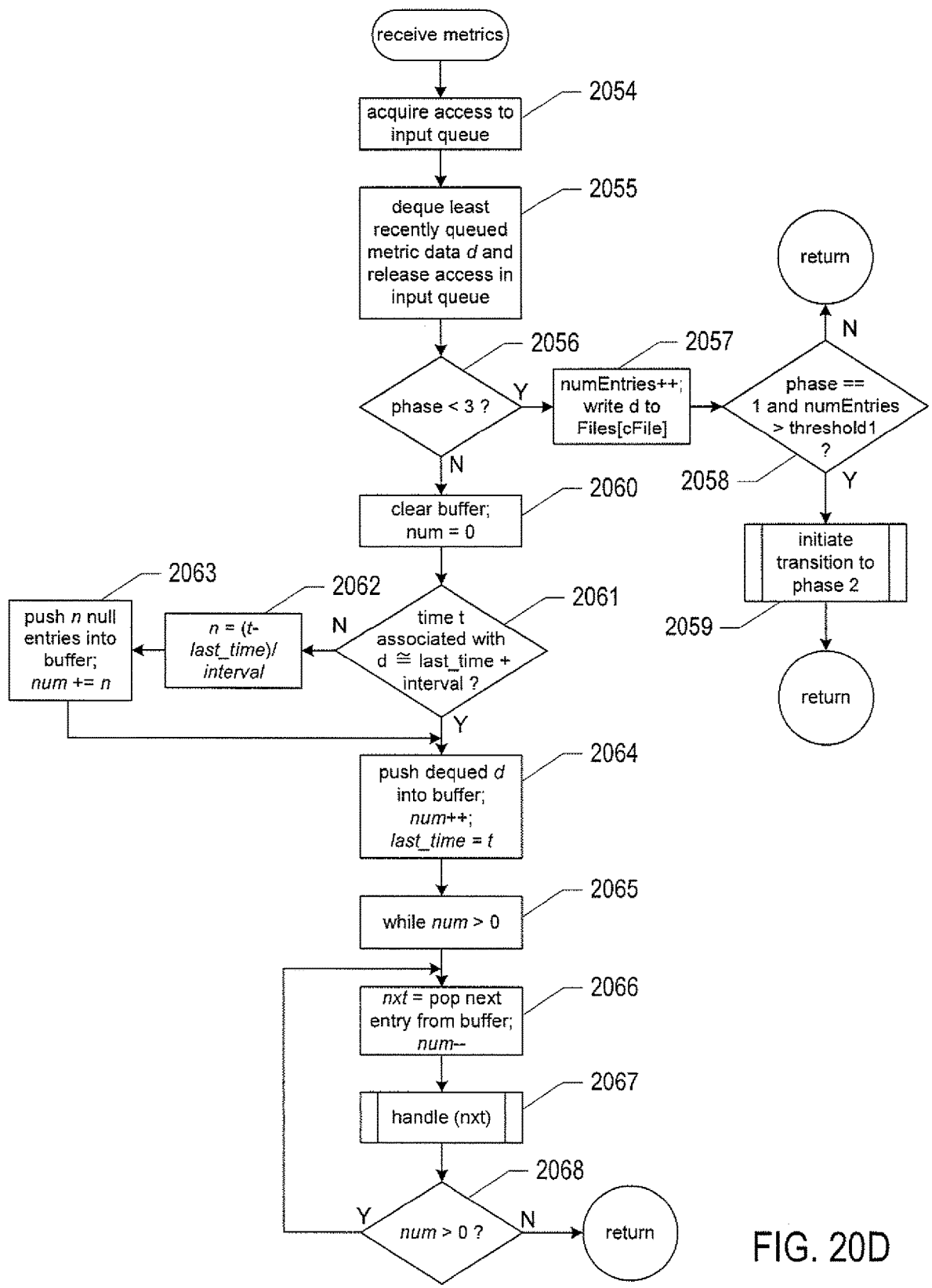

FIG. 20D provides a control-flow diagram for the handler "receive metrics," called in step 2028 of FIG. 20B. In step 2054, the handler "receive metrics" acquires access to the input queue (2036 in FIG. 20C). This may involve a semaphore operation or other such operation that provides exclusive access to the input queue pointers. In step 2055, the routine "receive metrics" dequeues the least recently queued metric data d from the input queue and releases access to the input queue to enable subsequently received metric data to be queued to the input queue. When the current phase is phase 1 or phase 2, as determined in step 2056, then, in step 2057, the number of entries is incremented and the received metric data d is written, without compression, to a current container (2004 in FIG. 20A). Then, when the current phase is phase 1 and the number of entries has increased above a threshold value, as determined in step 2058, a call is made, in step 2059, to an "initiate transition to phase 2" routine which undertakes a concurrent clustering and cluster compression of the initially stored metric data, as discussed above with reference to FIG. 20A. Otherwise, a local buffer is cleared and a local variable num is set to 0, in step 2060. When the timestamp associated with the received metric data d is not equal to the timestamp associated with the previously received metric data, as determined in step 2061, a number of null entries indicating missing metric data at the intervening intervals is pushed into the local buffer in steps 2062 and 2063. In step 2064, the currently received metric data d is pushed into the buffer, the local variable num is incremented, and the variable last_time is set to the time associated with the current metric data. Then, in the while-loop of steps 2065-2068, the local variable next is set to the next entry in the local buffer and the local variable num is decremented, in step 2066, following which the dequeued entry is handled by a call to the routine "handle," in step 2067.

FIG. 20B provides a control-flow diagram for the routine "handle," called in step 2067 of FIG. 20D. In step 2070, the routine "handle" received an entry from the local buffer popped in step 2066 of FIG. 20D. When the received entry is a null entry, as determined in step 2071, a null entry is written to the current container in step 2072. In step 2073, the variable numEntries is incremented. When normalization is being carried out, as determined in step 2074, a routine "normalize" is called, in step 2075, to normalize the data, as discussed above with reference to FIGS. 14-15. In step 2076, a routine "process data" is called in order to characterize the metric data d as an inlier or outlier and to compress the metric data in the case that it represents an inlier. When the metric data is an inlier, as determined in step 2077, then an inlier entry is written to the current container, in step 2078. When the current phase is phase 4, as determined in step 2079, an uncompressed inlier entry is written to a container receiving uncompressed data (2017 in FIG. 28) in step 2080. Otherwise, when the received metric data is an outlier, an outlier entry is written to the current container in step 2081 and, when the current phase is phase 4, as determined in step 2082, an outlier entry is additionally written to the additional container step 2083. When the current phase is either phase 3 or phase 6, as determined in step 2084, and when the ratio of outliers to inliers exceeds a threshold value, as determined in step 2085, a routine "initiate transition to phase 4" is called, in step 2086, to initiate storage of both compressed and uncompressed data, as discussed above with reference to FIG. 20A. Similarly, when the current phase is phase 4, as determined in step 2087, and when the number of entries is greater than a threshold value, as determined in step 2088, a routine "initiate transition to phase 5" is called, in step 2089, to initiate reclustering and lossless compression, as discussed above with reference to FIG. 20A. The routines "initiate transition to phase 4" and "initiate transition to phase 5" update various variables, including numEntries, outliers, inliers, Files, and cFile, as needed.

Figure 20E:
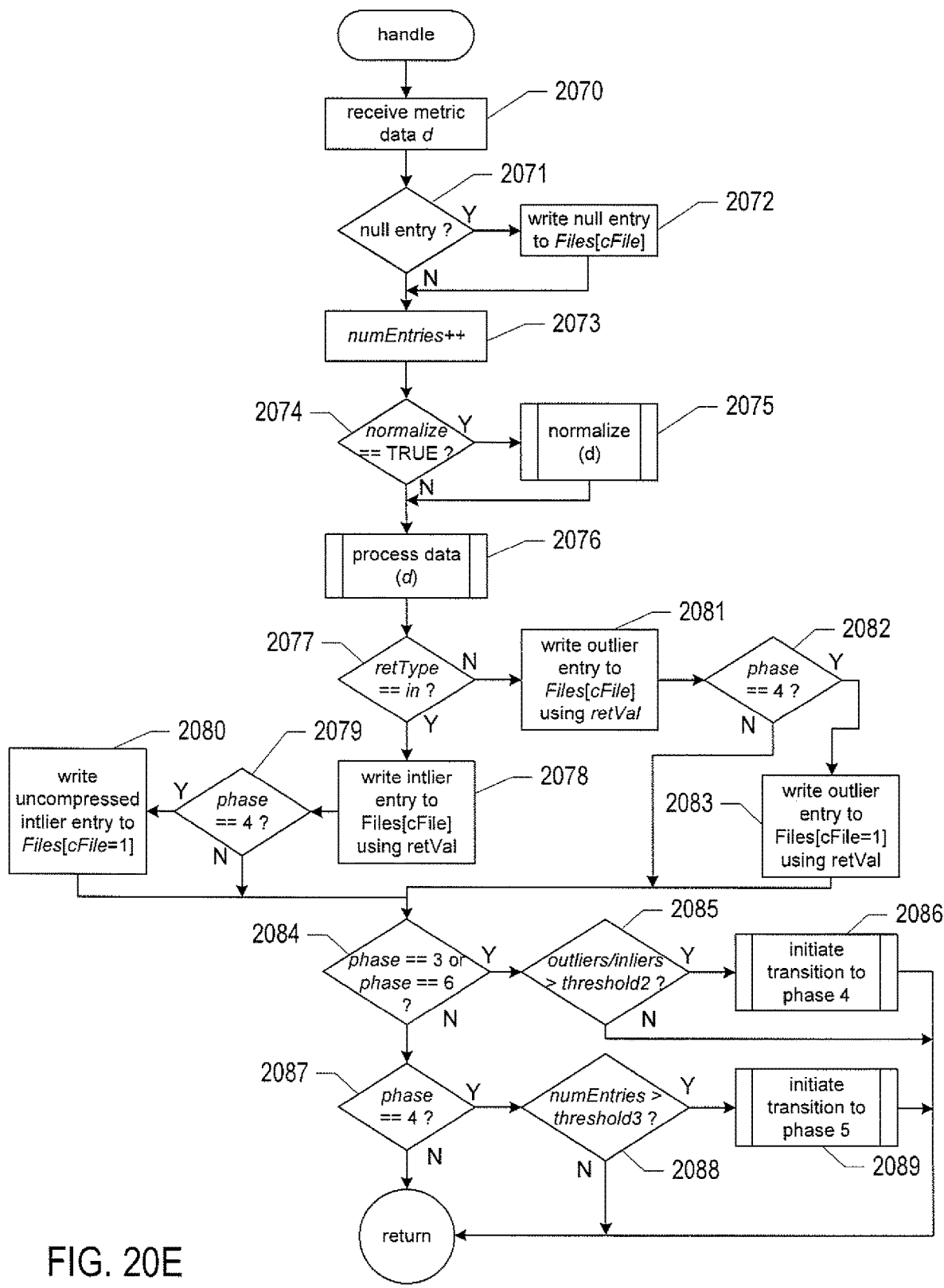
Figure 20F:
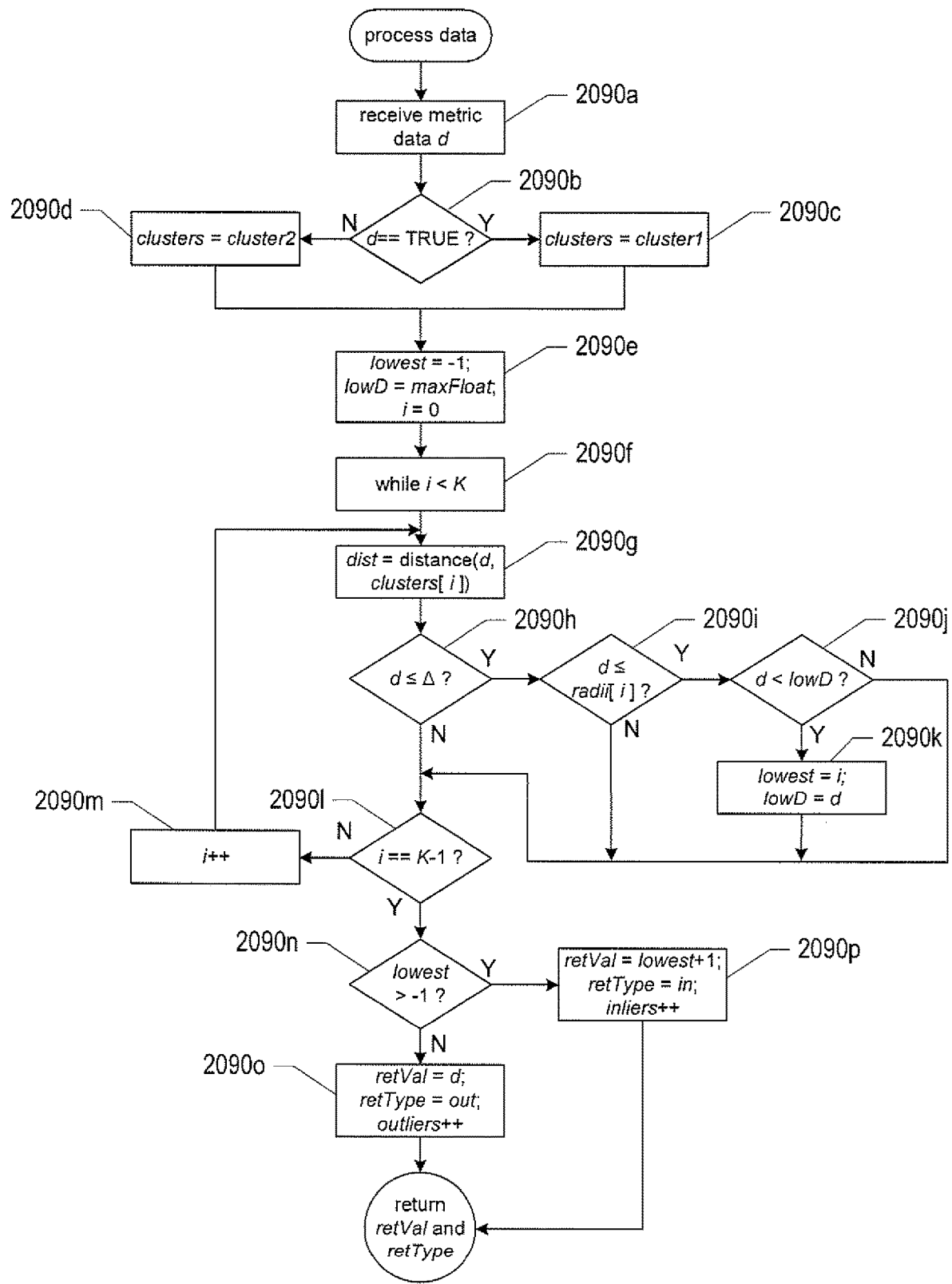

FIG. 20F provides a control-flow diagram for the routine "process data," called in step 2076 of FIG. 20E. In step 2090a, the routine "process data" receives a multidimensional data point, or metric data d. In steps 2090b-d, the local reference variable clusters is set to reference the cluster-center array currently storing the cluster centers used for cluster compression. In step 2090e, a local variable lowest is set to −1, a local variable lowD is set to a large floating-point value, and the loop variable i is set to 0. In the while-loop of steps 2090f-m, the distance between the currently handled multidimensional data point and the center of each cluster center is determined so that the currently considered multidimensional data point can be assigned to the cluster corresponding to the closest cluster center to the currently considered multidimensional data point. When there is no cluster to which the currently considered multidimensional data point can be assigned, as determined in step 2090n, the return value is set to the uncompressed multidimensional data point, the return type is set to out, and the variable outliers is incremented, in step 2090p. Otherwise, in step 2090p, the return value is set to the integer identifier for the cluster to which the multidimensional data point belongs, the return type is set in, and the variable inliers is incremented.

The present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed methods and systems. As mentioned above, a variety of different numerical values for the various parameters that control clustering, generation of a covering set, and determination of cluster membership, such as the cluster radii and the number of cluster centers, can be varied in different implementations to vary the ratio of outliers to inliers and to control the degree of cluster compression. Clustering methods other than K-means clustering can be employed in alternative implementations to generate a covering subset of multidimensional data points. The generation of a multidimensional metric-data set from two or more metric-data sets can be carried out by a variety of different alternative methods, as discussed above, which may or may not include normalization and timestamp shifting. In alternative implementations, multiple multidimensional metric-data sets may be concurrently continuously compressed as data is received by a data-collection, compression, and storage subsystem. As discussed above, a compressed multidimensional metric-data set can be uncompressed to generate a multidimensional metric-data set with less than a maximum specified distortion with respect to the original multidimensional metric data received by the data-collection, compression, and storage subsystem. Many common statistical methods and data-analysis methods can be applied to the uncompressed multidimensional metric-data set in order to identify anomalies, unexpected conditions or events, points in time at which alerts need to be generated, and for many other purposes.

The invention claimed is:

1. A metric-data collection-and-storage subsystem within a distributed computer system, the metric-data collection-and-storage subsystem comprising:
   one or more processors;
   one or more memories;
   one or more data-storage devices;
   one or more virtual machines instantiated by computer instructions stored in one or more of the one or more memories and executed by one or more of the one or more processors that together collect and store metric data by
      receiving two or more sequences of metric data,
      generating a corresponding sequence of multidimensional data points from the two or more sequences of metric data,
      generating a set of multidimensional-data-point clusters,
      cluster encoding the multidimensional data points by
         for each inlier multidimensional data point located within a threshold distance of a multidimensional-data-point center, encoding the inlier multidimensional data point by an indication of the multidimensional-data-point cluster within the multidimensional-data-point center, and
         encoding each of the remaining outlier multidimensional data points by a set of component values; and
      storing the cluster-encoded multidimensional data points in one or more of the one or more data-storage devices.

2. The metric-data collection-and-storage subsystem of claim 1 wherein the two or more sequences of metric data each comprises a sequence of metric-data points, each metric-data point representable as a timestamp/data-value pair.

3. The metric-data collection-and-storage subsystem of claim 2 wherein generating a corresponding sequence of multidimensional data points from the two or more sequences of metric data further comprises:
   temporally aligning the n sequences of metric data, where n is an integer equal to or greater than 2; and
   generating an n-dimensional data point from each set of n temporally aligned metric-data points.

4. The metric-data collection-and-storage subsystem of claim 3
   wherein each n-dimensional data point includes n components, each component corresponding to a different sequence of metric data.

5. The metric-data collection-and-storage subsystem of claim 4 wherein the corresponding sequence of multidimensional data points includes null entries, each representing a missing or incomplete multidimensional data point.

6. The metric-data collection-and-storage subsystem of claim 1 wherein generating a set of multidimensional-data-point clusters further comprises:
   determining a set of multidimensional-data-point clusters
      wherein each multidimensional data point in the generated sequence of multidimensional data points is included in at least one cluster,
      wherein each cluster has a central multidimensional data point closest to a cluster centroid, and
      wherein the number of clusters in the set of clusters is the smallest number of clusters found for a specified maximum distance between a cluster member and the central multidimensional data point of the cluster.

7. The metric-data collection-and-storage subsystem of claim 6 wherein determining a set of clusters that includes the multidimensional data points in the generated sequence of multidimensional data points further comprises:
   for each of a sequence of cluster numbers beginning with 1,
      determining a clustering with a currently considered number of clusters by iteratively adjusting the multidimensional data points selected as the central multidimensional data points of the clusters, and
      when each multidimensional data point in the generated sequence of multidimensional data points is a member of a cluster in the determined clustering and when the maximum distance of any cluster member to the central multidimensional data point of the cluster is less than or equal to a threshold distance in the determined clustering, selecting the determined clustering as the set of clusters that includes the multidimensional data points in the generated sequence of multidimensional data points.

8. The metric-data collection-and-storage subsystem of claim 1 wherein cluster encoding the multidimensional data points produces a container that includes a header that includes representations of component values for central multidimensional data points of the multidimensional-data-point clusters, cluster-encoded inlier multidimensional data points, each comprising an integer that indicates the cluster to which the inlier multidimensional data point is assigned, and representations of component values for the outlier inlier multidimensional data points.

9. The metric-data collection-and-storage subsystem of claim 8 wherein the container header additionally includes a timestamp and normalization information for one or more of the metric-data sequences.

10. The metric-data collection-and-storage subsystem of claim 1 wherein, following cluster encoding of the multidimensional data points, the cluster-encoded multidimensional data points are compressed by lossless data-compression prior to storing the doubly compressed multidimensional data points in one or more of the one or more data-storage devices.

11. A metric-data collection-and-storage subsystem within a distributed computer system, the metric-data collection-and-storage subsystem comprising:
   one or more processors;
   one or more memories;
   one or more data-storage devices;
   one or more virtual machines instantiated by computer instructions stored in one or more of the one or more memories and executed by one or more of the one or more processors that together collect and store metric data by
      collecting an initial set of metric-data data points from two or more sequences of metric data,
      generating a corresponding sequence of multidimensional data points from the initial set of metric-data data points,
      generating a set of multidimensional-data-point clusters, and
      repeatedly
         cluster encoding multidimensional data points generated from subsequently received metric-data data points
      until a ratio of outlier multidimensional data points to inlier multidimensional data points exceeds a threshold value.

12. The metric-data collection-and-storage subsystem of claim 11 wherein, when the ratio of outlier multidimensional data points to inlier multidimensional data points exceeds the threshold value, the metric-data collection-and-storage subsystem
   clusters a set of most recently received multidimensional data points to allow for cluster encoding of multidimensional data points generated from subsequently received metric-data data points; and
   losslessly compresses previously cluster encoded multidimensional data points for storage in one or more of the one or more data-storage devices.

13. The metric-data collection-and-storage subsystem of claim 11 wherein a multidimensional data point generated from subsequently received metric-data data points is cluster encoded by:
   determining whether the multidimensional data point is a member of a multidimensional-data-point cluster in the set of multidimensional-data-point clusters;
   when the multidimensional data point is a member of a multidimensional-data-point cluster in the set of multidimensional-data-point clusters,
      classifying the multidimensional data point as an inlier and encoding the multidimensional data point by an indication of the multidimensional-data-point cluster; and
   when the multidimensional data point is not a member of a multidimensional-data-point cluster in the set of multidimensional-data-point clusters,
      classifying the multidimensional data point as an outlier and encoding the multidimensional data point by representations of each component value of the multidimensional data point.

14. A physical data-storage device that stores a sequence of computer instructions that, when executed by one or more processors within one or more computer systems that each includes one or more processors, one or more memories, and one or more data-storage devices, control the one or more computer systems to:

receive a set of metric-data data points from two or more sequences of metric data;

generate a corresponding sequence of multidimensional data points from the set of metric-data data points, generate a set of multidimensional-data-point clusters by clustering the multidimensional data points, and cluster encode the multidimensional data points by for each inlier multidimensional data point located within a multidimensional-data-point cluster, encoding the inlier multidimensional data point by an indication of the multidimensional-data-point cluster, and encoding the remaining outlier multidimensional data points by, for each outlier multidimensional data point, a set of component-value representations; and storing the cluster-encoded multidimensional data points in one or more of the one or more data-storage devices.

15. The physical data-storage device of claim 14 wherein the two or more sequences of metric data each comprises a sequence of metric-data points, each metric-data point representable as a timestamp/data-value pair.

16. The physical data-storage device of claim 15 wherein generating a corresponding sequence of multidimensional data points from the two or more sequences of metric data further comprises:

temporally aligning the n sequences of metric data, where n is an integer equal to or greater than 2; and generating an n-dimensional data point from each set of n temporally aligned metric-data points, each n-dimensional data point including n components and each component corresponding to a different sequence of metric data.

17. The physical data-storage device of claim 14 wherein generating a set of multidimensional-data-point clusters further comprises:

determining a set of multidimensional-data-point clusters wherein each multidimensional data point in the generated sequence of multidimensional data points is included in at least one cluster, wherein each cluster has a central multidimensional data point closest to a cluster centroid, and wherein the number of clusters in the set of clusters is the smallest number of clusters found for a specified maximum distance between a cluster member and the central multidimensional data point of the cluster.

18. The physical data-storage device of claim 17 wherein determining a set of clusters that includes the multidimensional data points in the generated sequence of multidimensional data points further comprises:

for each of a sequence of cluster numbers beginning with 1, determining a clustering with a currently considered number of clusters by iteratively adjusting the multidimensional data points selected as the central multidimensional data points of the clusters, and when each multidimensional data point in the generated sequence of multidimensional data points is a member of a cluster in the determined clustering and when the maximum distance of any cluster member to the central multidimensional data point of the cluster is less than or equal to a threshold distance in the determined clustering, selecting the determined clustering as the set of clusters that includes the multidimensional data points in the generated sequence of multidimensional data points.

19. The physical data-storage device of claim 14 wherein, following cluster encoding of the multidimensional data points, the one or more computer systems are controlled to compress the cluster-encoded multidimensional data points by lossless data-compression prior to storing the doubly compressed multidimensional data points in one or more of the one or more data-storage devices.

20. The physical data-storage device of claim 14 wherein, following generation of the set of multidimensional-data-point clusters by clustering the multidimensional data points, multidimensional data points subsequently generated from subsequently received metric data are each cluster encoded using the generated set of multidimensional-data-point clusters.

* * * * *